United States Patent
Kremp et al.

(10) Patent No.: US 12,487,405 B2
(45) Date of Patent: Dec. 2, 2025

(54) METHODS AND APPARATUS FOR ALIGNING AND SPLICING OPTICAL FIBERS

(71) Applicant: OFS Fitel, LLC, Norcross, GA (US)

(72) Inventors: Tristan Kremp, Somerset, NJ (US); Yue Liang, Johns Creek, GA (US); Robert L Lingle, Johns Creek, GA (US)

(73) Assignee: OFS Fitel, LLC, Norcross, GA (US)

( * ) Notice: Subject to any disclaimer, the term of this patent is extended or adjusted under 35 U.S.C. 154(b) by 238 days.

(21) Appl. No.: 18/220,015

(22) Filed: Jul. 10, 2023

(65) Prior Publication Data

US 2024/0134121 A1 Apr. 25, 2024

Related U.S. Application Data

(63) Continuation of application No. 18/036,152, filed on May 9, 2023, which is a continuation-in-part of application No. PCT/US2021/062021, filed on Dec. 6, 2021.

(60) Provisional application No. 63/182,390, filed on Apr. 30, 2021, provisional application No. 63/122,861, filed on Dec. 8, 2020.

(51) Int. Cl.
   *G02B 6/255* (2006.01)
(52) U.S. Cl.
   CPC .................. *G02B 6/2555* (2013.01)
(58) Field of Classification Search
   None
   See application file for complete search history.

(56) References Cited

U.S. PATENT DOCUMENTS

| | | | |
|---|---|---|---|
| 4,087,155 A | 5/1978 | Deacon | |
| 6,266,472 B1 | 7/2001 | Norwood et al. | |
| 9,151,923 B2 | 10/2015 | Nielson et al. | |
| 9,164,234 B2 | 10/2015 | Feder et al. | |
| 9,213,134 B2 * | 12/2015 | Chen | G02B 6/02042 |
| 9,366,828 B2 | 6/2016 | Bradley | |
| 9,541,707 B2 * | 1/2017 | Saito | G02B 6/2555 |
| 10,620,372 B2 | 4/2020 | Matsui et al. | |
| 11,960,120 B2 * | 4/2024 | Ohzeki | G02B 6/02042 |
| 2005/0063664 A1 | 3/2005 | Huang | |
| 2011/0229085 A1 | 9/2011 | Bradley et al. | |
| 2011/0274435 A1 | 11/2011 | Fini et al. | |
| 2016/0033325 A1 | 2/2016 | Fusco et al. | |

(Continued)

*Primary Examiner* — Jerry Rahll

(57) ABSTRACT

A system of aligning concatenated sections of multicore optical fiber incorporates the capability of intentionally changing core assignments as part of the azimuthal alignment process. The intentional changing of core assignments, referred to as offset clocking, compensates for differences in properties of the individual core regions in a way that reduces variations between the spatial channels supported in the transmission system. The offset clocking technique can be used, e.g., to improve the attenuation (or other selected properties of the propagating signals). The offset clocking technique may be used to step through sequential changes core assignments at one or more splice locations (passive clocking) or identify a particular pairing of cores from one fiber section to the next (e.g., "good quality" core assigned to a "poor quality" signal exiting the first section) and rotate the fiber sections with respect to each other to achieve this particular core assignment.

18 Claims, 28 Drawing Sheets

(56) References Cited

U.S. PATENT DOCUMENTS

| | | | |
|---|---|---|---|
| 2016/0161673 A1* | 6/2016 | Hamaguchi | G02B 6/2553 |
| | | | 65/378 |
| 2018/0156986 A1 | 6/2018 | Lu et al. | |
| 2018/0321446 A1 | 11/2018 | Arao et al. | |
| 2018/0372954 A1* | 12/2018 | Matsui | G02B 6/4221 |
| 2022/0171130 A1* | 6/2022 | Zheng | G02B 6/02042 |

\* cited by examiner

FIG. 3
PRIOR ART
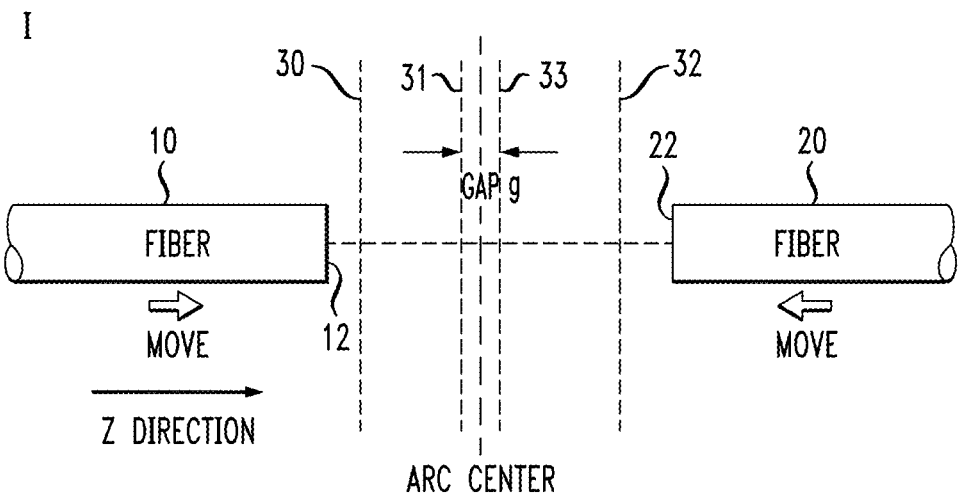
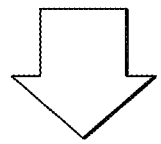
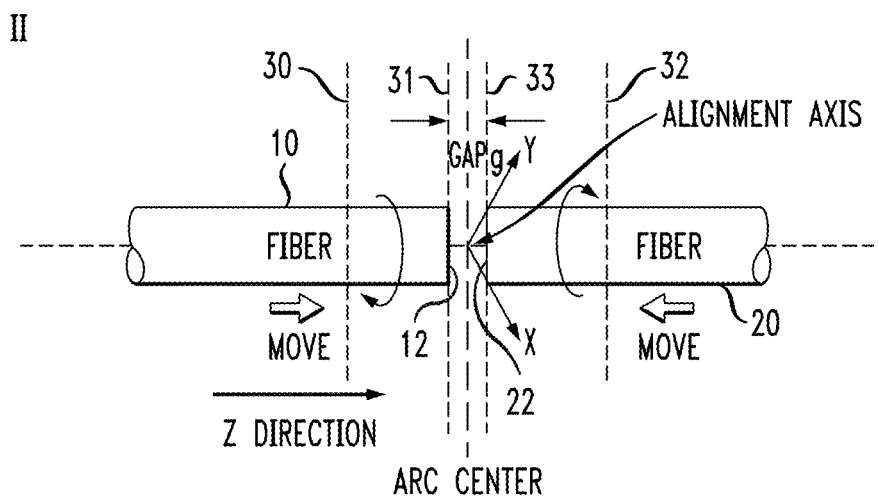

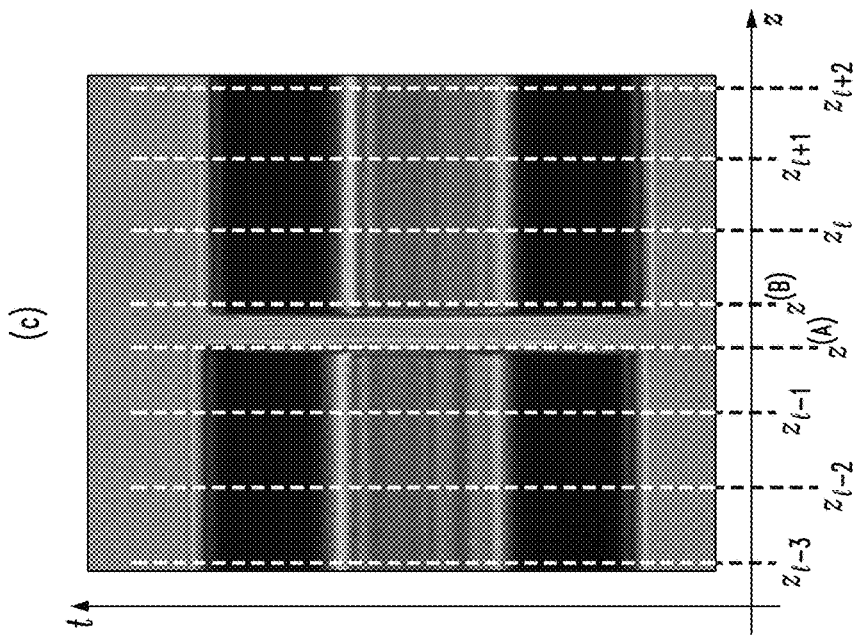
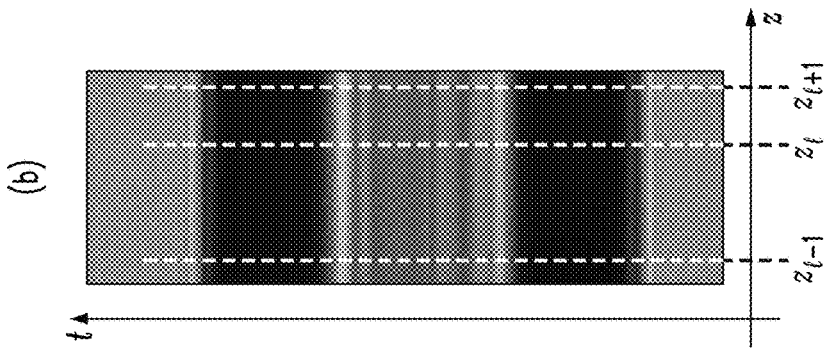
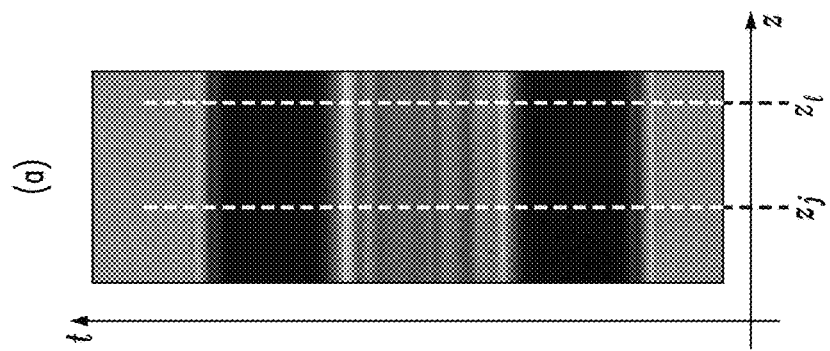
FIG. 13

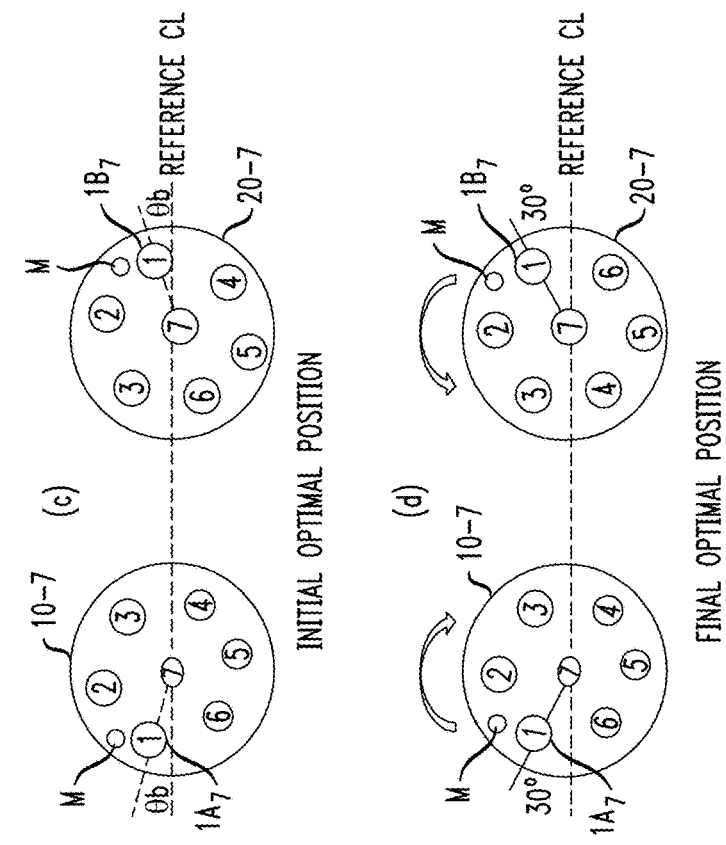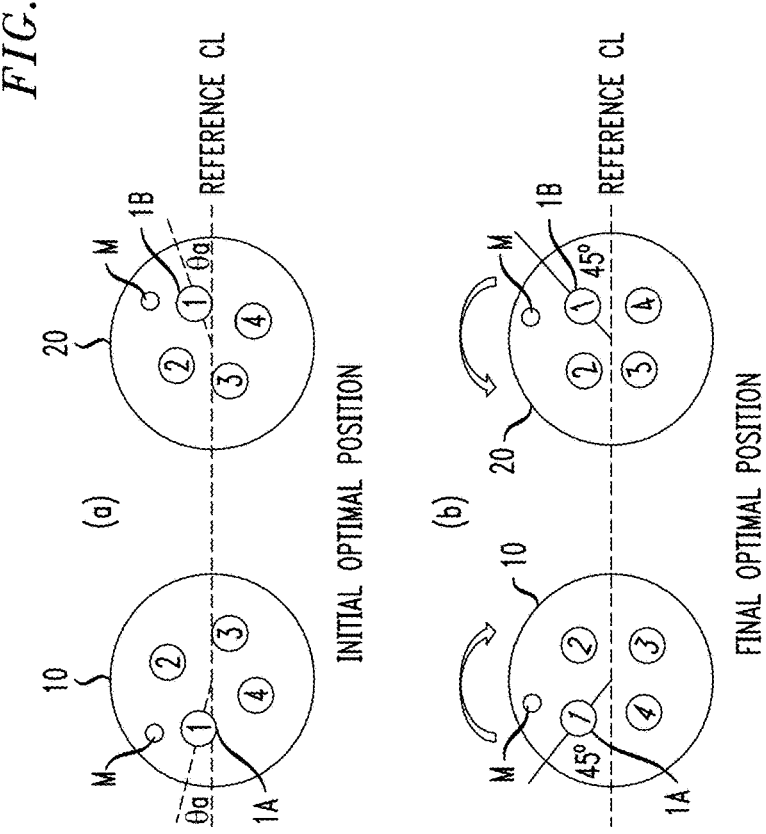
FIG. 26

METHODS AND APPARATUS FOR ALIGNING AND SPLICING OPTICAL FIBERS

CROSS-REFERENCE TO RELATED APPLICATIONS

This application is a continuation of U.S. patent application Ser. No. 18/036,152, filed May 9, 2023, which is a continuation-in-part of PCT/US2021/062021, which claims the benefit of priority from U.S. Provisional Application No. 63/122,861 filed Dec. 8, 2020, as well as U.S. Provisional Application No. 63/182,390 filed Apr. 30, 2021, where all applications are incorporated herein in their entirety.

TECHNICAL FIELD

The present invention relates generally to the field of optical fiber splicing and, more particularly, to methods and apparatus particularly well-suited for accurately joining together fibers that require azimuthal alignment (i.e., rotationally non-invariant optical fibers).

BACKGROUND OF THE INVENTION

Before coupling two optical fibers to one another such as by fusion splicing, the end faces of the fibers must be cleaved and aligned to confront one another so that the cores of the fibers can be fused to one another with negligible attenuation of signals that will pass between the fused cores. Most popular fusion splicers use a so-called profile alignment system (PAS) to effectuate the fiber alignment and fusing operations. In a PAS, two cameras are positioned to produce two side-view images of a confronting end region of each fiber, such that the views are taken at different angles in a plane normal to the fiber axis.

The relative transverse, i.e., x,y alignment of the two fiber ends is adjusted either automatically by the fusion splicer, or manually until the x and y-brightness profiles created by the PAS are substantially identical to one another, or, if the fibers are not substantially identical, until the profiles show a certain desired alignment. The endfaces of the fibers are advanced (z-direction) to abut one another, and the fibers including their cores are fused together by an electric arc discharge.

While this process provides accurate and economical fusion splicing of rotationally invariant fibers (equivalent to circularly symmetric fibers, e.g., a pair of single core fibers with substantially identical transverse geometries), automated alignment and splicing of any other types of fibers (or connectorizing such a fiber) is not as straightforward. That is, for fibers that are not rotationally invariant by design, the two fiber ends need to be azimuthally aligned with a degree of accuracy sufficient to minimize unwanted insertion loss and reflections or increase the polarization extinction ratio at the splice location that would otherwise arise if included core regions are misaligned. Moreover, while this is problematic for fibers that are intentionally formed to not exhibit rotational symmetry, fiber fabrication imperfections and fiber design variations between different manufacturers may as well create a situation where an alignment that is perfect for some transverse features or cores may be imperfect for other features or cores. For instance, if the two fiber ends that should be spliced or connectorized have the same core layout but are dissimilar in other ways, it may be impossible to align all their features within required tolerances.

FIG. 1 illustrates one example of such a pair of fibers that are rotationally non-invariant (because they are not circularly symmetric), rotationally asymmetric (because they have a marker that breaks the 90° symmetry) and dissimilar (because their marker locations are different). In other words, the fiber ends exhibit the same core layout, but the respective markers (used to identify a particular core as associated with a defined wavelength/channel) are misaligned if the cores are correctly aligned. FIG. 2 illustrates another example of rotationally non-invariant, asymmetric and dissimilar fibers. In this case, the fibers also have the same core layout, but one fiber uses a marker for channel identification and the other fiber uses a "flat" cladding (referred to as a D-shaped fiber at times) for channel identification. These are merely two of numerous types of rotationally non-invariant conditions that require careful consideration when attempting to azimuthally align a pair of fiber ends.

Prior art approaches to optimizing alignment between rotationally non-invariant fibers have attempted to align all included features, which at times results in trading misalignments of markers (or other asymmetries such as D-shapes) against misalignments of the cores, resulting in suboptimal insertion loss. Furthermore, the sensitivity of such a global approach to measurement imperfections (such as noise in the transverse images) may be quite large if the fibers are quasi-symmetric with only "small" features that break the symmetry, such as the offset markers shown in FIG. 1 or the use of D-shaped cladding, as shown in FIG. 2. The presence of these small differences may result in substantial misalignment errors such as channel misalignment in the case of multicore fibers, i.e., incorrectly aligning one channel (core) of one fiber to a different channel (core) of the other fiber.

In certain embodiments that utilize a concatenated arrangement of a large number of multicore fibers (for example, a long-haul transmission system), it has been found that the received signals delivered at the output of the system may exhibit different optical properties, associated with the properties of the multicore fiber itself (primarily with respect to the core regions, but not completely), as well as from core-to-core losses between adjacent sections of multicore fiber at each splice location, even when using the additive component alignment technique described above to achieve an optimum core-to-core alignment.

The splice loss is of particular concern in transmission systems that utilize multicore fiber with core regions of a relatively small mode field diameter (MFD), since the splice loss of these cores is usually more sensitive to misalignments (transverse and/or azimuthal) than the splice loss of a core with a larger MFD. More generally, differences among a set of cores within a given section of MCF may also result in the channels exhibiting different properties that ultimately result in the received signals having unintended variations (power level, delays, etc.). These differences between the cores in a section of MCF may take the form of slight differences in MFD (as a result of variations in fabrication processes, for example), inaccuracy of each core's general position (with respect to each other as well as with respect to the longitudinal axis of the transmission span), etc.

SUMMARY OF THE INVENTION

The needs remaining in the art are addressed by the present invention, which relates to the field of optical fiber splicing and, more particularly, to methods and apparatus particularly well-suited for accurately joining together rotationally non-invariant fibers (i.e., fibers where azimuthal alignment between transverse features is required).

In accordance with the principles of the present invention, an azimuthal alignment apparatus is proposed that is configured to perform alignment before bringing the fiber end faces into proximity of the arc discharge system used to perform fusion splicing. Preferably, the azimuthal alignment itself is performed by using an inventive "additive component" methodology that identifies the portions of the transverse geometry requiring substantially perfect azimuthal alignment (e.g., critical features such as core regions) and then selects the best azimuthal alignment option from the identified options based on best-fit of azimuthal asymmetries (such as markers, different cladding structures, etc.) to the set of optional alignments. Using this additive component azimuthal alignment concept, the inventive alignment methodology is able to determine if a given fiber is twisted (and is also able to define the twist rate) and is also able to determine both the absolute and relative of the fibers presented for alignment and splicing.

It is an aspect of the present invention that rotationally non-invariant fibers that have the wrong polarity relative to each other can be spliced and connectorized, regardless if the two fibers are otherwise identical in form.

Other embodiments of the present invention may be directed to compensating for apparatus limitations that may limit the ability to accurately align and splice together a pair of fibers with rotationally non-invariant geometries, even if the inventive alignment apparatus and additive component methodology are employed. In particular, apparatus limitations related to the properties of the motors used to move the fibers during alignment, arc fusion electrode arrangement, properties of the fiber endfaces themselves, and the like.

An exemplary embodiment of the present invention takes the form of a method of aligning a pair of optical fiber opposing endfaces (typically involving the alignment of a pair of rotationally non-invariant optical fibers) that comprises the steps of: defining a gap g associated with an optimal spacing between the opposing endfaces for a following splicing procedure; positioning the pair of opposing endfaces at a pair of initial set-up locations that are spaced apart by a distance greater than the optimal gap g; while at the initial set-up locations, performing transverse and azimuthal alignment of the pair of opposing endfaces; and, lastly, moving the aligned pair of optical fiber endfaces into a pair of final set-up locations that are separated by the optimal gap spacing g.

A particular implementation of this embodiment or, alternatively, another embodiment, is specifically directed to performing an azimuthal alignment that includes the steps of: obtaining intensity profiles of the pair of rotationally non-invariant optical fibers at a plurality of spaced-apart locations, the intensity profiles created by rotating each fiber in increments of determined amounts and measuring the intensity at a plurality of transverse positions at each incremental angle rotation; and performing an additive component analysis of the obtained intensity profiles comprising an accuracy component of critical features requiring alignment and a selection component of secondary features, the accuracy component generating a set of possible alignment configurations and the selection component used to identify an optimum alignment configuration from the set of possible alignment configurations, the optimum alignment configuration defined as an optimal azimuthal angle through which one fiber is rotated with respect to the other to achieve azimuthal alignment of all critical features; and rotating a selected optical fiber by the optimal azimuthal angle, obtaining azimuthal alignment of the pair of rotationally non-invariant optical fibers.

Yet another embodiment of the present invention may take the form of an apparatus for providing alignment of a pair of rotationally non-invariant optical fibers, the apparatus comprising: an illumination source for directing light toward the pair of rotationally non-invariant optical fibers; a lensing system disposed beyond the illuminated pair of rotationally non-invariant optical fibers; a camera system for capturing and storing intensity profiles of the pair of rotationally non-invariant optical fibers; and a controlled movement system coupled to the pair of optical fibers and the camera system, the controlled movement system configured to: initially position the opposing endfaces of the pair of rotationally non-invariant optical fibers at a pair of initial set-up locations, the pair of initial set-up locations spaced apart by a distance greater than a gap g associated with a subsequent splicing process; perform transverse and rotational movements of the opposing endfaces to obtain alignment; and move the aligned endfaces into a pair of final set-up locations used for the subsequent splicing process.

A particular implementation of the above apparatus embodiment or, alternatively, another apparatus embodiment that is particularly directed to performing azimuthal alignment includes a processing module configured to perform an additive component analysis of the obtained intensity profiles comprising an accuracy component of critical features requiring alignment and a selection component of secondary features, the accuracy component generating a set of possible alignment configurations and the selection component used to identify an optimum alignment configuration from the set of possible alignment configurations, the optimum alignment configuration defined as an optimal azimuthal angle through which one fiber is rotated with respect to the other to achieve azimuthal alignment of all critical features, wherein the controlled movement system is used to rotate a selected optical fiber by the optimal azimuthal angle, obtaining azimuthal alignment of the pair of rotationally non-invariant optical fibers.

Yet another embodiment is particularly directed to splicing together several lengths of multicore optical fiber (as used in the formation of a long-haul transmission span, for example), where the azimuthal alignment between sections of multicore fiber includes an additional step of intentionally changing the assignment of the cores used to carry the propagating signals through a next section of multicore fiber. The changing of core assignments may be based on the optical properties present at the splice location (e.g., by knowing poor/good signal quality, poor/good core properties, etc.). Alternatively, the intentional change in core assignments may be instituted by an offset clocking technique, where an incremental type of change in core assignment is used to reduce accumulated differences in signal properties in a span of several sections of multicore fiber.

A particular methodology related to an intentional change in core assignments may be used in a transmission system having a plurality of multicore optical fibers (MCFs) concatenated together at a set of splice locations to transmit a set of separate optical signals between an input and an output. Each MCF itself is defined as having a plurality of at least $C_{total}$ individual core regions and the methodology for joining the plurality of MCFs comprises: determining $M_{equiv}$ ways of aligning the plurality of at least $C_{total}$ individual cores in a first MCF of the plurality of MCFs with individual cores in a second MCF of the plurality of MCFs, where an integer multiple of $360°/M_{equiv}$ defines a clocking angle;

identifying a designated core for use as a reference core in the first MCF and the second MCF; determining a core-to-core alignment position between the first MCF and the second MCF; and rotating the first and second MCFs relative to each other through a combination of the determined alignment position and the clocking angle to change designated core assignments for the set of optical signals propagating through the second MCF.

Related to the above-described method of intentionally changing core assignments is an embodiment of an optical fiber transmission system comprising a plurality of concatenated sections of multicore optical fiber. Each fiber includes a marker identifying a designated core assignment, where at one or more splicing locations between adjacent sections of multicore optical fiber there are $M_{equiv}$ ways of aligning the individual core regions therebetween. The disclosed invention includes orienting adjacent multicore optical fiber sections such that there is an offset clocking rotation of an integer multiple of $360°/M_{equiv}$ at the splicing location combined with a core-to-core alignment of the designated cores.

In another embodiment, a transmission system is proposed that utilizes changes in core assignment along concatenated sections of multicore optical fiber, where each section of multicore optical fiber includes a plurality of at least $C_{total}$ offset core regions used to support the transmission of a plurality of separate optical signals, with a marker included in each section in proximity to a selected core region as a reference point. In this case, one or more sections of multicore optical fiber are rotated to intentionally change core assignments with respect to the plurality of separate optical signals.

Other and further aspects and embodiments of the present invention will become apparent during the course of the following discussion and by reference to the accompanying drawings.

BRIEF DESCRIPTION OF THE DRAWINGS

Referring now to the drawings, where like numerals represent like parts in several views:

FIG. 3 includes a set of diagrams illustrating a prior art approach to aligning fiber ends prior to performing arc discharge fusion;

FIG. 8(a) is a side-view projection along the x-axis direction and FIG. 8(b) is a side-view projection along the orthogonal y-axis direction;

FIG. 13 illustrates sets of collected image data as used for different purposes in accordance with the principles of the present invention, where the data displayed in FIG. 13(a) is associated with a pair of different longitudinal positions within the same fiber and can be used to determine a "twist rate" (e.g., for a polarization-maintaining or multicore fiber where the stress rods or core regions are helically wound around a central axis during formation, regardless if the winding was intentionally or unintentionally), FIG. 13(b) is also associated with determining twist rate, in this case using a set of three separation longitudinal locations to expand the data set used in the determination; and FIG. 13(c) shows an example where a pair of fibers is to be azimuthally aligned and a set of three different longitudinal positions are used to collect data for each fiber;

FIG. 16(a) illustrates an end view of a given fiber and FIG. 16(b) is a view of a "flipped" version of the fiber in FIG. 16(a), showing the changes in positions of various features attributed to a fiber exhibiting polarity;

FIG. 26 illustrates a technique for improving the temperature uniformity experienced by core regions in the two-electrode system of FIG. 24, where in this case the aligned fibers are rotated prior to beginning the fusion process so that at least one pair of core regions to be joined are positioned along the center line of the discharge;

FIG. 30(b) shows the same pair of fibers now being re-cleaved to show an acceptable relative cleave angle;

DETAILED DESCRIPTION

For the purposes of the present invention, a fiber is referred to as "rotationally invariant" if it is circularly symmetric, i.e., if it has continuous symmetry, i.e., it maps onto itself while being rotated by an arbitrary azimuthal angle. In this case, all its material properties (refractive index etc.) are independent of the azimuthal angle $\vartheta$. An example is a single-core fiber whose core is perfectly circular and centered in the center of a perfectly circular cladding. The refractive index profile of both core and cladding is allowed to vary radially, though.

A fiber is referred to as "rotationally non-invariant" if it is not rotationally invariant. Thus, rotationally non-invariant fibers are defined as those fibers whose transverse geometry or structure, which includes the refractive index profile of cores and cladding as well as other material parameters such as loss or gain (imaginary part of the refractive index) or elastic modulus or stress profile and the like, depends on the azimuthal angle, i.e., fibers that are not circularly symmetric. Examples are a single-core fiber with a D-shaped cladding or any multicore fiber. Some rotationally non-invariant fibers may still be rotationally symmetric.

A fiber is "rotationally symmetric" if it has a discrete rotational symmetry, i.e., if it maps onto itself ("looks the same") after rotation by a certain azimuthal angle (partial turn). An example is a polarization-maintaining fiber with two identical stress rods spaced 180° apart that have the same radial distance from the center of the core, or a fiber having four identical cores that are spaced 90° apart and have the same distance from the fiber axis.

A fiber is "rotationally asymmetric" if it is not rotationally symmetric. Thus, rotationally asymmetric fibers are fibers whose transverse structure is neither rotationally invariant nor periodic with a period of less than 360°. Examples are fibers whose rotational symmetry is broken intentionally (e.g., as in FIGS. 1,2 and 16-18 by addition of a marker, D-shaped cladding, or the like) or unintentionally (e.g., by fabrication imperfections of the positions and/or refractive index profiles of the individual cores). It is to be understood that references to "refractive index profiles" are considered to be exemplary of one type of material parameter that may exhibit differences from one fiber to the other in a manner that results in asymmetry between the fibers.

Figure 2:
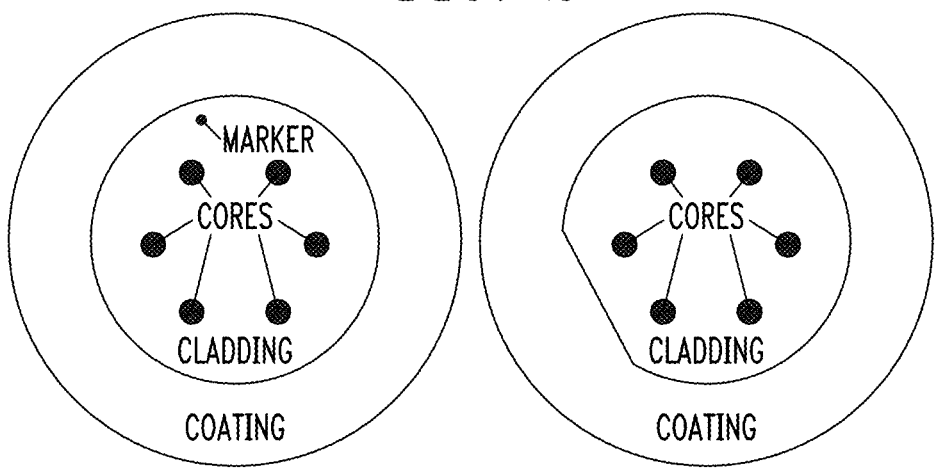
FIG. 2 depicts another example of rotationally non-invariant fibers, in this case comprising an arrangement where one fiber uses a marker and the other uses a "flat" formed on a portion of the cladding to denote the location of a specific core region.
Figure 17:
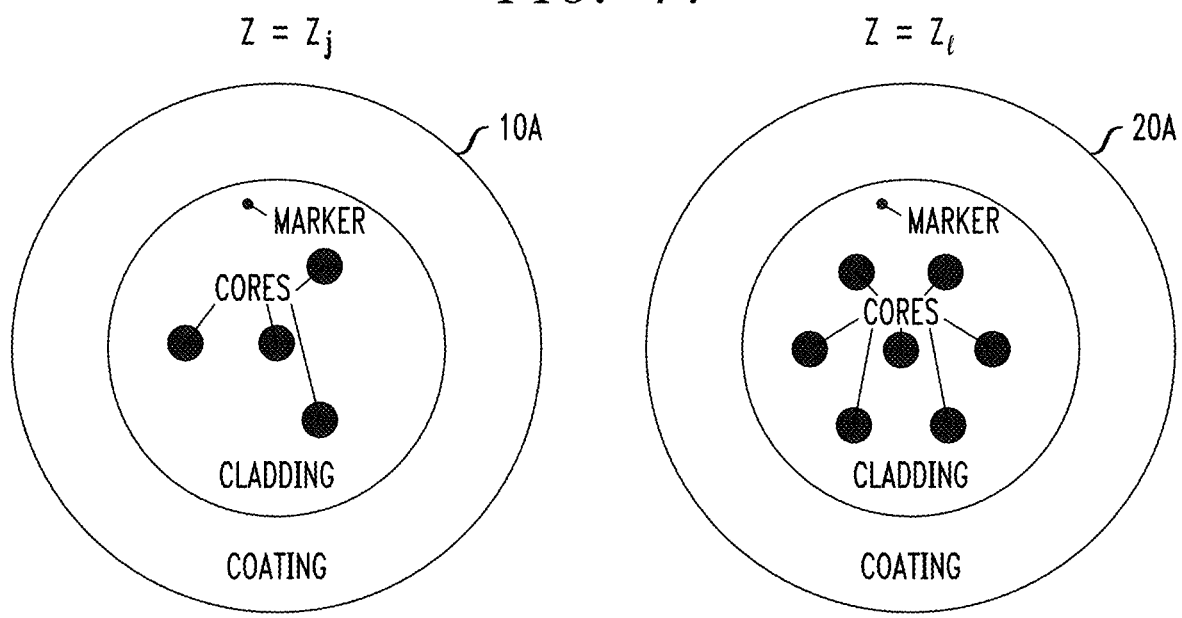
FIG. 17 illustrates a pair of dissimilar fiber ends having different numbers and layouts of fiber cores.
Figure 18:
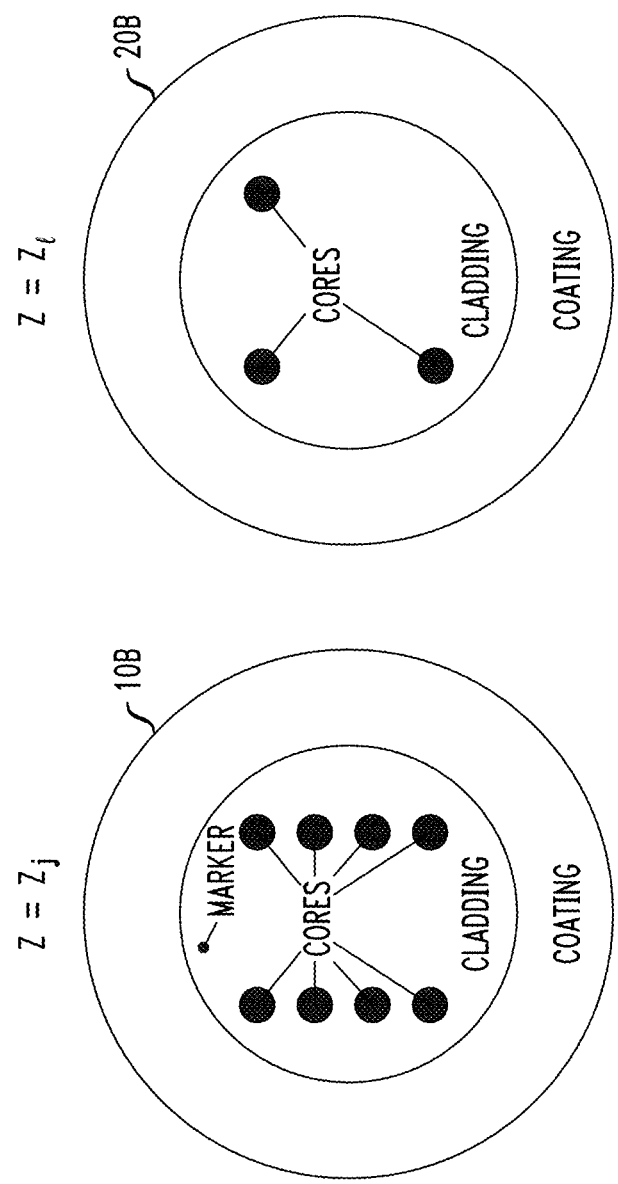
FIG. 18 illustrates another pair of dissimilar fiber ends having different core topologies and also needing azimuthal alignment.

Two fibers are referred to as "dissimilar" if there exists no azimuthal alignment angle for which all transverse features of the two fiber ends can be perfectly aligned. Examples are fibers that have markers at different locations, or different numbers of cores, and fibers that have other intentional or unintentional breaks in rotational symmetry, e.g., slightly different core locations or refractive index profiles, see. FIGS. 2, 17 and 18. Another example is the case of two identical fibers that are not rotationally symmetric (e.g., a fiber with a marker intended to break the symmetry) and that have the wrong relative polarity, i.e., the markers are misaligned if the cores are aligned and vice versa.

Figure 16:
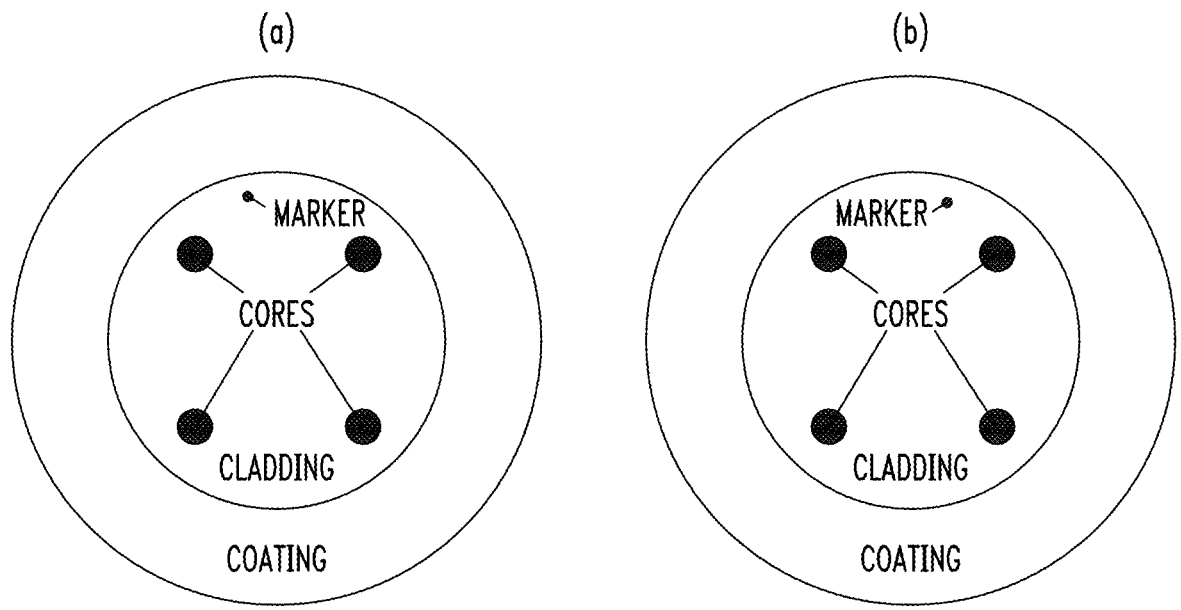
FIG. 16 illustrates the concept of fiber polarity, where

The polarity of a fiber is a binary piece of information with only two possible values, e.g., 1 and −1, that can be defined by the location of an asymmetry (e.g., marker or D-shape) relative to, e.g., the closest core, or, more generally, relative to the rotationally symmetric transverse features, see FIG. 16.

The various alignment procedures discussed below are described and illustrated in the situation of aligning one fiber to another, it is to be understood that the various alignment techniques and procedures are just as relevant for the case of aligning a fiber to a connector component, such as a fiber in a ferrule (or any other suitable means of terminating the fiber) during an assembly process. In either case, the various features in the transverse geometry of the fiber need to be aligned with similar features in the other element, whether the "other element" is a fiber or a connector component. This understanding is also carried into any claims directed to the alignment aspects of the present invention, where various steps that identify "a pair of optical fibers" are considered as applying just the same to "an optical fiber and an associated connector."

In contrast to the alignment aspects of the present invention, those aspects specifically directed to "splicing" together fibers (e.g., fusion splicing) are by their nature limited to the situations where a pair of fiber ends are to be joined together.

FIG. 3 contains a diagrammatic illustration of a typical prior art technique that may be used to align a pair of fiber endfaces prior to splicing the fibers together. Here, a pair of optical fibers 10 and 20 is presented for alignment and splicing. Initial preparation steps are performed so that fiber 10 includes a cleaved, cleaned endface 12 and fiber 20 includes a similarly prepared endface 22. The fibers are moved along the z-axis direction toward each other, as indicated by the horizontal arrows in FIG. 3 and perhaps controlled with translational motors, with their movements paused at a first pair of set-up locations 30, 32, as shown in Diagram I of FIG. 3. This initial movement is typically performed relatively quickly and does not require for endfaces 12, 22 to exactly align with locations 30, 32. At this point, measurements are made to determine, with a significant degree of precision, the distance between each endface 12, 22 and a second pair of set-up locations 31, 33.

Set-up locations 31, 33 are associated with creating the optimum gap spacing g that achieves the desired fusion of endfaces 12 and 22 when joined together using a conventional arc discharge fusion apparatus. For the sake of discussion, it is presumed that endface 12 is positioned a distance $z_a$ from set-up location 31 and endface 22 is positioned a distance $z_b$ from set-up location 33 (where $z_a$ and $z_b$ may be different amounts). From these measured values, a proper number of motor pulses required to present the endfaces precisely at set-up locations 31, 33 is calculated, and each endface is slowly moved into position, as shown in Diagram II of FIG. 3. The fibers are then aligned in the x and y (i.e., transverse) directions, typically using a Profile Alignment System (PAS) as mentioned above and well-known in the art.

Figure 4:
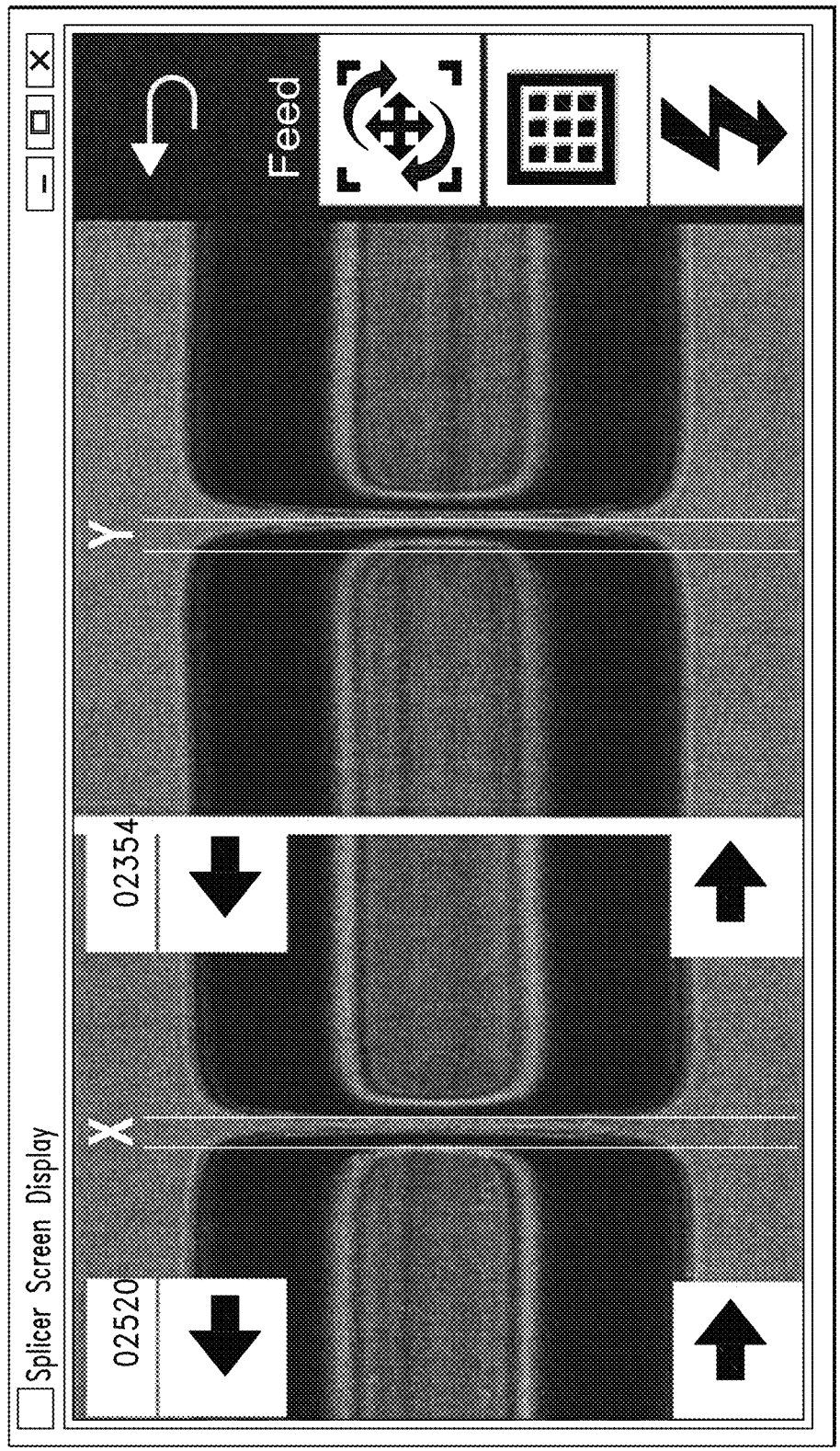
FIG. 4 is a photographic reproduction of image data associated with the prior art approach of FIG. 3, particularly illustrating the presence of burnback between mating fiber ends as a result of unwanted movement of the fiber ends subsequent to reaching the optimum fusion positions.

While sufficient for splicing together rotationally invariant (i.e., circularly symmetric) fibers, the use of only x,y alignment is not sufficient to guarantee a proper alignment of any type of rotationally non-invariant fibers (e.g., fibers that exhibit rotationally non-invariant transverse geometries, refractive index (or other material parameter) differences, etc., regardless if they are dissimilar or not). As a result, these fibers must also go through an azimuthal alignment process, i.e., a $\vartheta$-rotation of one fiber with respect to the other until their respective features are aligned. It has been found, however, that the rotational movement required for this alignment step is likely to cause unwanted longitudinal movement of the endfaces away from the final (critical) set-up locations 31,33, where the gap g between set-up locations 31, 33 is a known value associated with the desired optimum spacing between fiber endfaces during an arc fusion splicing process. While the movements may be relatively small, they are enough to the gap spacing and thus result in misalignment, burnback, etc. FIG. 4 is a display provided by a prior art PAS system, illustrating the presence of "burnback" (along both the x and y directions) attributed to slight movements of fiber endfaces from their critical fusion splicing positions after performing a rotational alignment.

Figure 5:
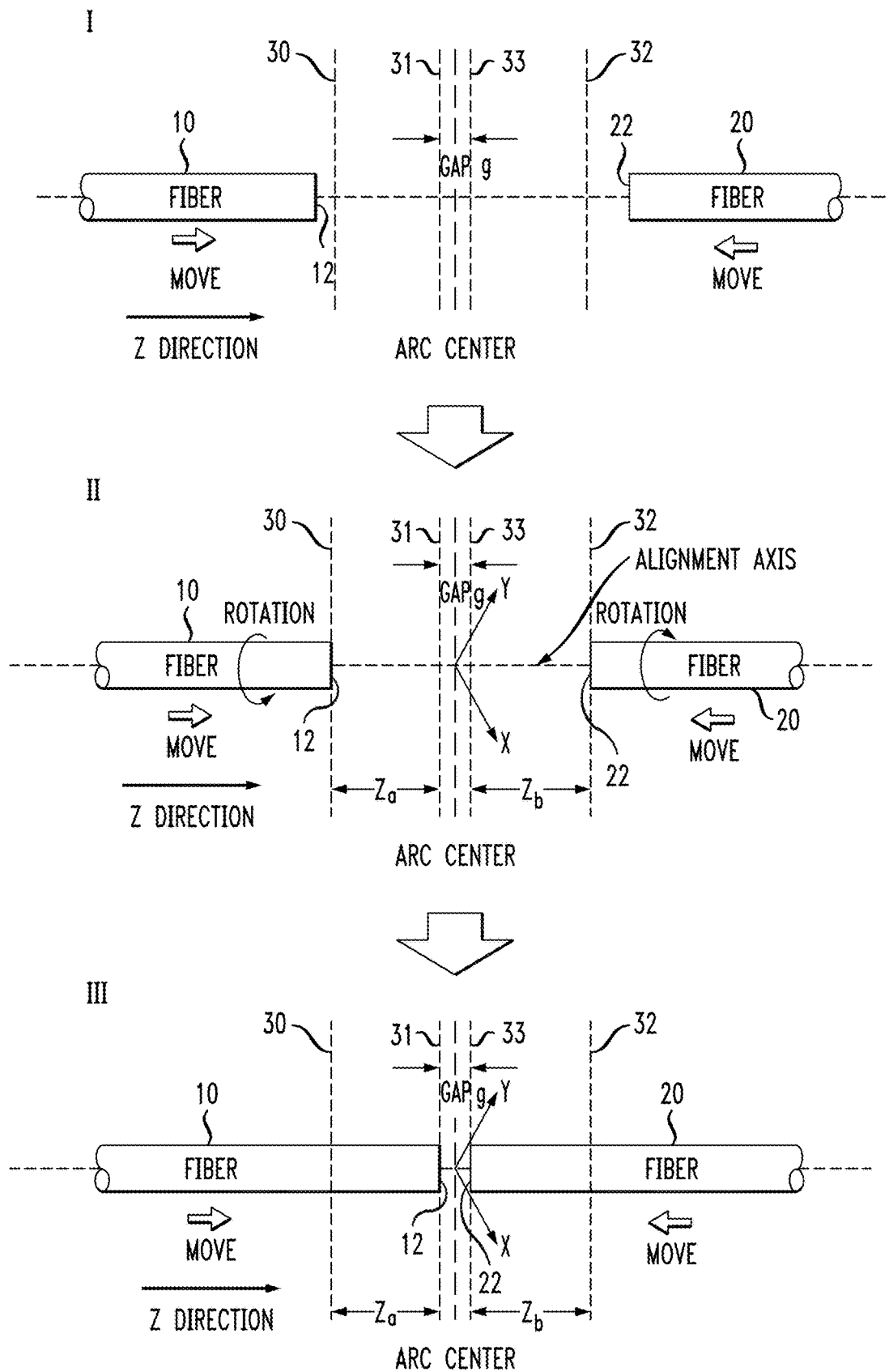
FIG. 5 includes a set of diagrams associated with the inventive approach to aligning optical fibers (particularly, fibers that require azimuthal alignment), showing the step of performing alignment prior to presenting the fiber ends at the optimum fusion positions.

FIG. 5 illustrates an exemplary two-step alignment methodology in accordance with the principles of the present invention that addresses the misalignment problems present in the prior art alignment and splicing procedures. The inventive process as outlined in FIG. 5 is also based upon using pairs of set-up locations, but differs from the prior art with respect to the procedural sequence of performing alignment and moving the fibers. Diagram I of FIG. 5 is essentially the same as diagram I of FIG. 3, using the same initial steps to begin an alignment and splicing operation. However, as shown by Diagram II in FIG. 5, the alignment procedure is then performed while endfaces 12, 22 are still positioned at initial set-up locations 30, 32. In particular, fibers 10, 20 are first aligned along the x and y axes, typically by employing the same PAS system as described above. Following the x,y alignment, the fibers are rotated about the z-axis direction until azimuthal alignment of the mating core region(s) (or other critical features) is achieved.

In performing the azimuthal alignment, each fiber 10, 20 is rotated about the "alignment axis" (i.e., the z-axis direction), with the PAS camera system used to collect image data at incrementally different angles of rotation $\vartheta$ useful in performing azimuthal alignment. It is not required for fibers 10, 20 to have come to complete stops at locations 30, 32 in order to begin recording the image data. Additionally, the angular increments of rotation applied to the fibers do not necessarily have to be equidistant, as long as the image data and angular position of the respective fibers are paired together as part of the recorded information. The total range of rotational motion may preferably be at least 360°, but again may also be less than a full rotation, such as if images from multiple cameras are being combined. For example, if an x-view camera and a y-view camera are mounted orthogonal to each other, a complete 360° scan can be accomplished by rotating the fibers through a 270° arc and combining the image data from both cameras.

Continuing with the description of FIG. 5, the collected image data is used to rotate one fiber with respect to the other until azimuthal alignment of transmitting core regions (for example) is achieved. As mentioned above, and in contrast to the prior art methodology, this azimuthal alignment is accomplished while the fiber endfaces 12, 22 are still at the initial set-up locations 30, 32. If necessary, the additional distances the fibers must travel to arrive at the preferred arc fusion set-up locations 31, 33 may be taken into account when performing the final longitudinal adjustment.

Once alignment has been achieved, the longitudinal spacing between fully-aligned fiber endfaces 12, 22 and final set-up locations 31, 33 is measured. In accordance with the principles of the present invention, this measurement is performed only after complete alignment has been achieved (i.e., both transverse (x,y) and azimuthal ($\vartheta$)) since the movements of the fibers required to provide alignment, particularly the rotational movement required for performing azimuthal alignment, inevitably results in slightly altering the position of endfaces 12, 22 with respect to initial set-up locations 30, 32.

Shown in Diagram III, and similar to the final step prior art procedure, endfaces 12, 22 are slowly moved longitudinally (via motor pulses, for example) until reaching final set-up locations 31, 33. A final check of the transverse x,y alignment may be performed at this point, but there is no need to again azimuthally rotate either of the fibers.

Once properly aligned and positioned at final set-up locations 31, 33, any suitable fusion splicing process may be used to join the two aligned fiber endfaces 12, 22. As mentioned above, the gap g between set-up locations 31, 33 is selected in accordance with an optimum arc center for fusion splicing. Various additional features that complement this two-step alignment and fusion splicing process are considered below as additional features of the inventive principles. Prior to describing these features as associated with the apparatus utilized within the two-step alignment or the fusion splicing apparatus, an exemplary alignment process particularly well-suited for use with rotationally non-invariant optical fibers, as may be embodied within the principles of the present invention, is described in the following paragraphs.

Figure 14:
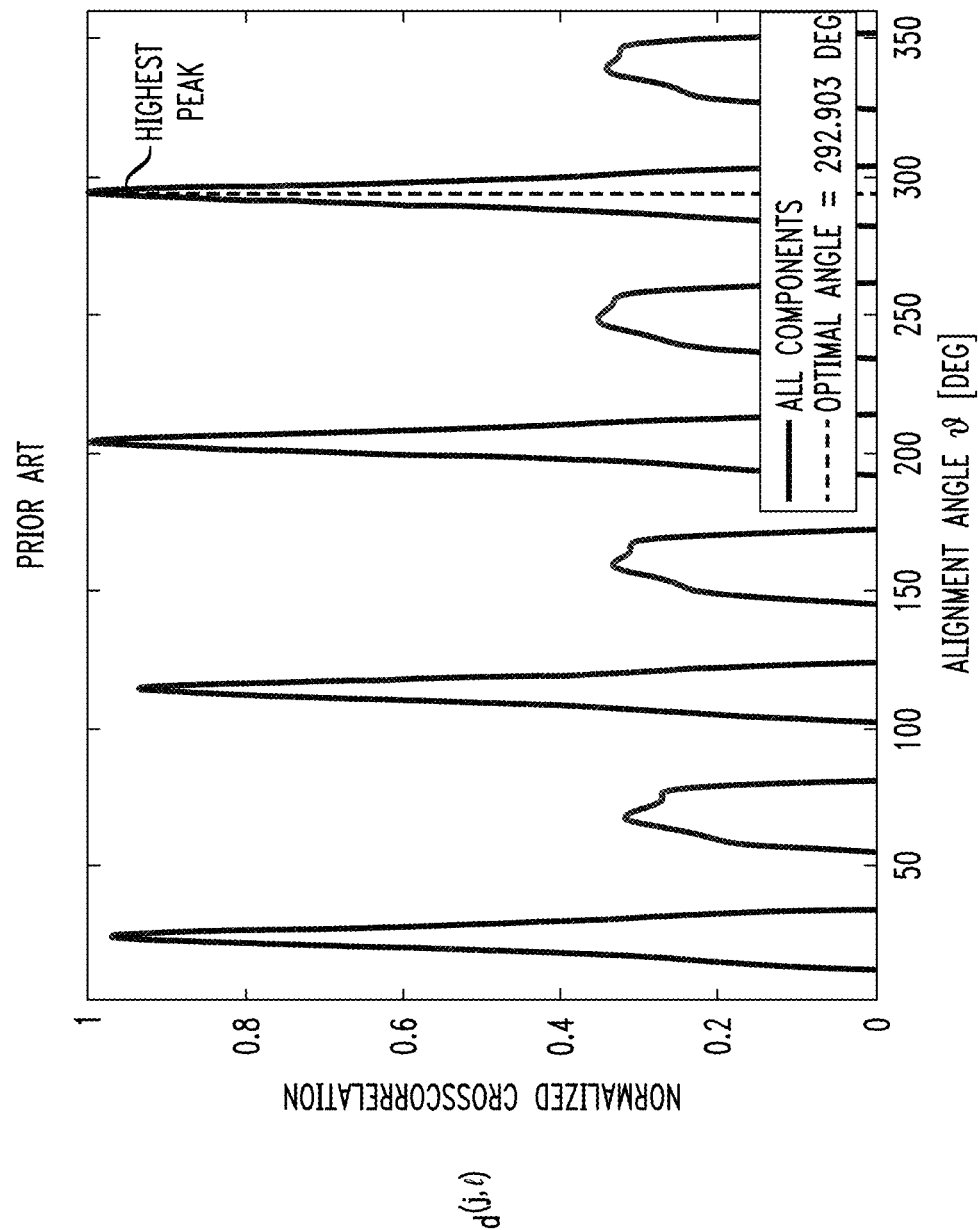
FIG. 14 is a plot of "global" cross-correlation data from a fiber pair as used in the prior art.

As mentioned above, while there are a few prior art algorithmic-based techniques for performing azimuthal alignment of rotationally asymmetric fibers, they tend to try to obtain a global solution of aligning each "feature" in one fiber with a like "feature" in the other, without attempting to distinguish between the importance of some features (such as core regions, which are considered as critical features) with respect to other features (such as markers, which are considered as secondary features). As a result, when attempting to align dissimilar fibers or fibers with the wrong relative polarity, these prior art solutions often end up trading misalignment of the markers (or other asymmetries such as a slight offset in marker location or D-shape location) against misalignments of the cores, resulting in sub-optimal insertion loss. Furthermore, prior-art algorithms tend to have a low tolerance for noise (camera noise, motor inaccuracies, etc.) in the sense that they may easily confuse cores as shown in the example of FIG. 14, where choosing the highest peak, i.e., the azimuthal alignment with the highest global cross-correlation, leads to an alignment of the wrong cores.

In accordance with the principles of the present invention, the problems associated with prior art azimuthal alignment techniques are addressed by separating the azimuthal structure of the fiber into two additive components. The first component (referred to hereinafter as the "accuracy component") is associated with those critical features of the transverse geometry that need to be perfectly aligned azimuthally (such as the core regions in a pair of multicore fibers), while the second component (referred to as the "selection component") comprises essentially everything else (as discussed below, certain irrelevant information such as a DC component may be disregarded without impacting the result). As will be described in detail below, the selection component is used to identify the "best" azimuthal alignment option out of a set of several possible azimuthal alignment options presented by the accuracy component. Examples of fibers that require a precise azimuthal alignment include, but are not limited to, multicore fibers, polarization-maintaining fibers, or fibers with an azimuthal cladding profile such as star-shaped fibers, etc. In the case of a multicore fiber, the accuracy component comprises the cores, while the selection component comprises azimuthal asymmetries, including markers, D-shapes and asymmetries of the core geometry, intended or unintended, e.g., the local core displacement due to a D-shaped cladding.

Figure 6:
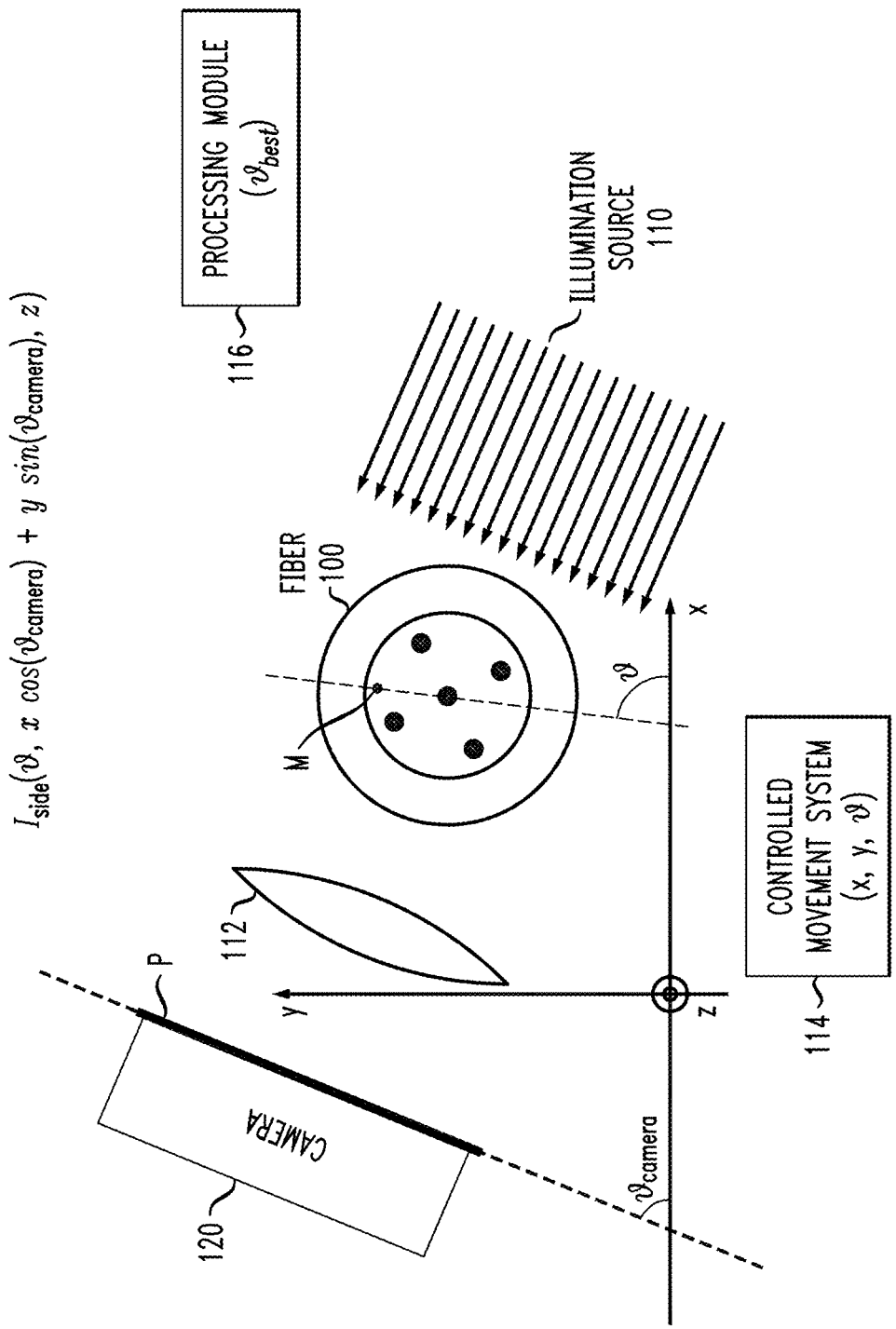
FIG. 6 is a simplified diagram of an arrangement using for obtaining side-view intensity data used to achieve azimuthal alignment between rotationally non-invariant fibers.

A schematic diagram of an exemplary arrangement useful for collecting the image data required to perform azimuthal alignment is shown in FIG. 6. In particular, FIG. 6 illustrates the arrangement associated with performing side-view imaging of a given fiber. The orientation $\vartheta$ of a fiber 100 is defined in the diagram by a line that connects the center of fiber 100 and one other point in its cross section with respect to the x-axis as shown. Here, the marker M is used as the second point, but it is to be understood that a core or any other transverse feature or point may just as well be used.

The arrangement of FIG. 6 also includes an illumination source 110 (which may comprise a LED or similar source) that directs its output through the side of fiber 100. The light passing through fiber 100 is then focused (via lensing system 112) along a camera plane P, with the side-view projection intensity recorded by an associated camera 120. The direction of the incoming illumination from light source 110 does not necessarily need to be exactly perpendicular to the camera plane P, but it needs to change by the same amount as the camera 120 if $\vartheta_{camera}$ changes.

Continuing with the description of the schematic diagram of FIG. 6, the z-axis direction (perpendicular to the drawing plane of FIG. 6) is defined as the longitudinal coordinate along the fiber, and x and y are the transverse cartesian coordinates (in the drawing plane of FIG. 6) perpendicular to the fiber axis, maintaining the same dimensional definitions as used above. In this side-view imaging case, the camera plane P is parallel to fiber 100, i.e., it is spanned by the coordinates z and $t_{side}$, wherein $t_{side}$ is a linear combination $t_{side}(x,y)=x \cos(\vartheta_{camera})+y \sin(\vartheta_{camera})$ of x and y that depends on the azimuthal angle $\vartheta_{camera}$ (in unit radian) between the camera plane and the x-axis.

For the sake of completeness, the arrangement of FIG. 6 also includes a controlled movement system 114 and a processing module 116. As will be discussed in detail below, controlled movement 114 is utilized to rotate each fiber through the azimuthal arc required to collect of the intensity data. Processing module 116 is configured to perform the necessary mathematical analysis for obtaining the desired alignment of the fibers.

The side-view projection intensity $I_{side}(\vartheta,t_{side},z)$ depends not only on the camera pixel location ($t_{side}$,z), but also on the current azimuthal orientation $\vartheta$ (in unit radian) of the fiber that is being imaged. Thus, if the entire setup is rotated, i.e., both the fiber and the camera plane (including the illumination) by an equal amount, the image in the camera does not change, i.e., $I_{side}(\vartheta,t_{side},z)=I_{side}(\vartheta-\vartheta_{camera},x,z)$ If $|\cos(\vartheta_{camera})|=1$, the camera displays the "x-view" (see FIG. 8(a)), and if $|\sin(\vartheta_{camera})|=1$, the camera displays the "y-view" (see FIG. 8(b)). We choose the same orientation of the azimuthal angle $\vartheta$ and the same z-axis for both fibers in the splicer. Hence, the z-axis points from one of the two fiber ends to be spliced to the other, see FIG. 8. Furthermore, if both fibers are rotated by the same amount $\vartheta$, then their relative alignment is unchanged. Similarly, rotating the left fiber by $\vartheta$ has the same effect on their relative orientation as rotating the right fiber by $-\vartheta$.

Figure 7:
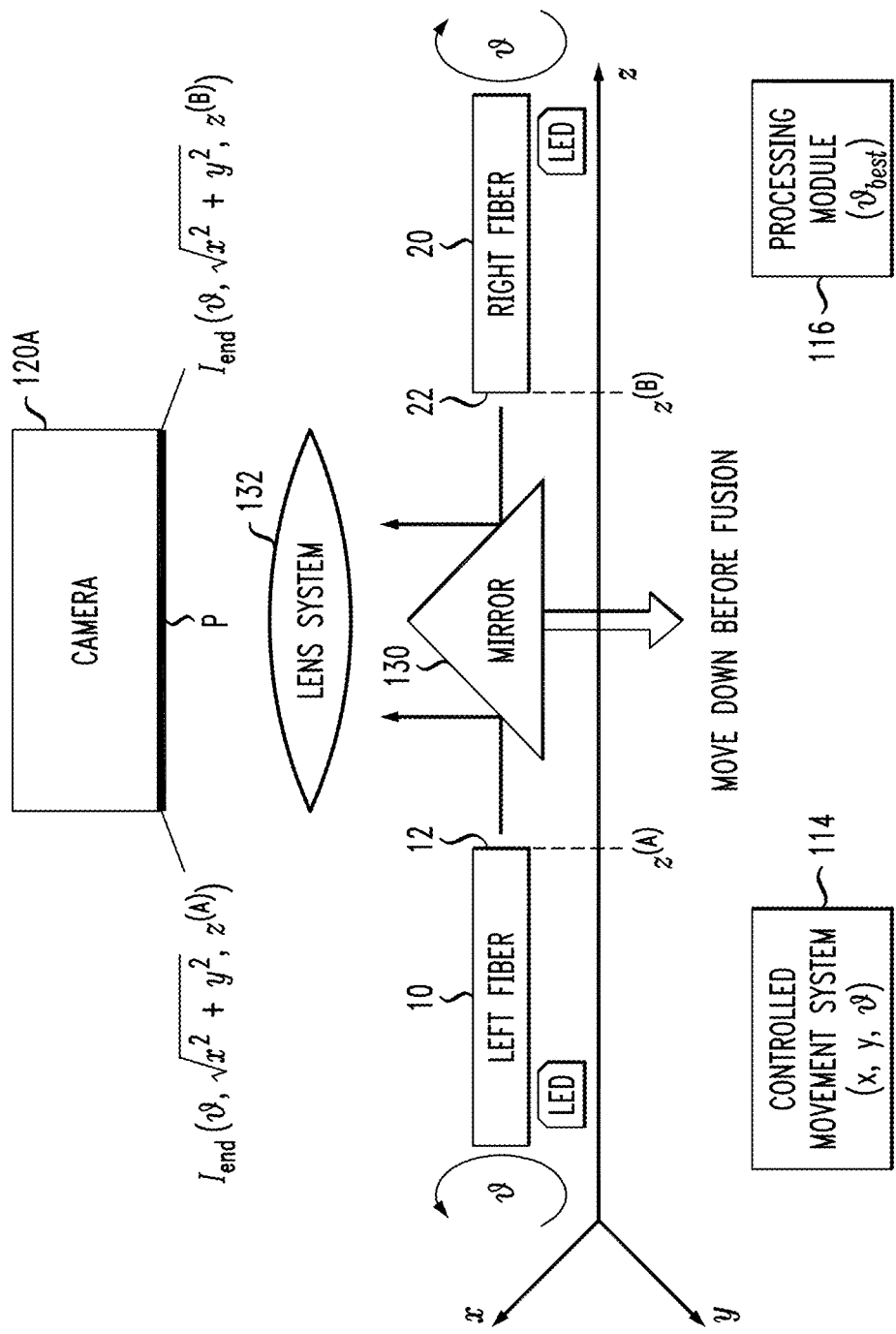
FIG. 7 is a simplified diagram of an arrangement using for obtaining end-view intensity data in combination with the collected side-view intensity data to achieve azimuthal alignment between rotationally non-invariant fibers.

In the end-view case, as shown in FIG. 7, the camera plane is parallel to the (x,y)-plane. The end-view intensity is denoted as $I_{end}(\vartheta,r,z)$, with the nonnegative radial coordinate $r=\sqrt{x^2+y^2}$ ("nonnegative" can include zero, while "positive" does not). This end-view intensity can either be measured directly with an arrangement such as shown in FIG. 7, or computed from a number of side-view projections using algorithms such as computed tomography (CT) with a straight or fan-beam Radon transform. In the exemplary direct end-view measurement method approach as shown in FIG. 7, an additional camera 120A is positioned as shown with respect to fibers 10 and 20. A prism mirror 130 is positioned (temporarily) in gap g between endfaces 12 and 22. Fibers 10 and 12 are illuminated in the manner discussed above in association with FIG. 6, and the light exiting at endfaces 12 and 22 will impinge turning mirror 130 and be redirected through a lens system 132 and thereafter reach camera 120A. Controlled movement system 114 and processing module 116 are used in a similar manner to obtain the necessary end-view intensity data and perform the analysis useful in reaching an optimum alignment of endfaces 12 and 22. To cover both side-view and end-view with a single notation, the generalized transverse coordinate t is used for either $t_{side}$ or r, depending on the view case:

$$I(\vartheta, t, z) = \begin{cases} I_{side}(\vartheta, t, z), & t = x\cos(\vartheta_{camera}) + y\sin(\vartheta_{camera}), \text{ side-view}, \\ I_{end}(\vartheta, t, z), & t = \sqrt{x^2 + y^2}, \text{ end-view}. \end{cases} \quad (1)$$

This common coordinate system is used for all locations z along the longitudinal axis of the system even if the different locations are at opposing ends of different fibers. Hence, in the example of two opposing fiber ends that face each other, the positive z-axis is pointing out of one fiber endface and pointing inwards at the opposing fiber endface. Alternatively, if two different coordinate systems for the two opposing fiber endfaces were permitted such that their positive z-axis always points out of the respective fiber, the signs of the azimuthal angles $\vartheta$ between the two fibers would need to be flipped to account for opposing directional definitions.

Figure 8:
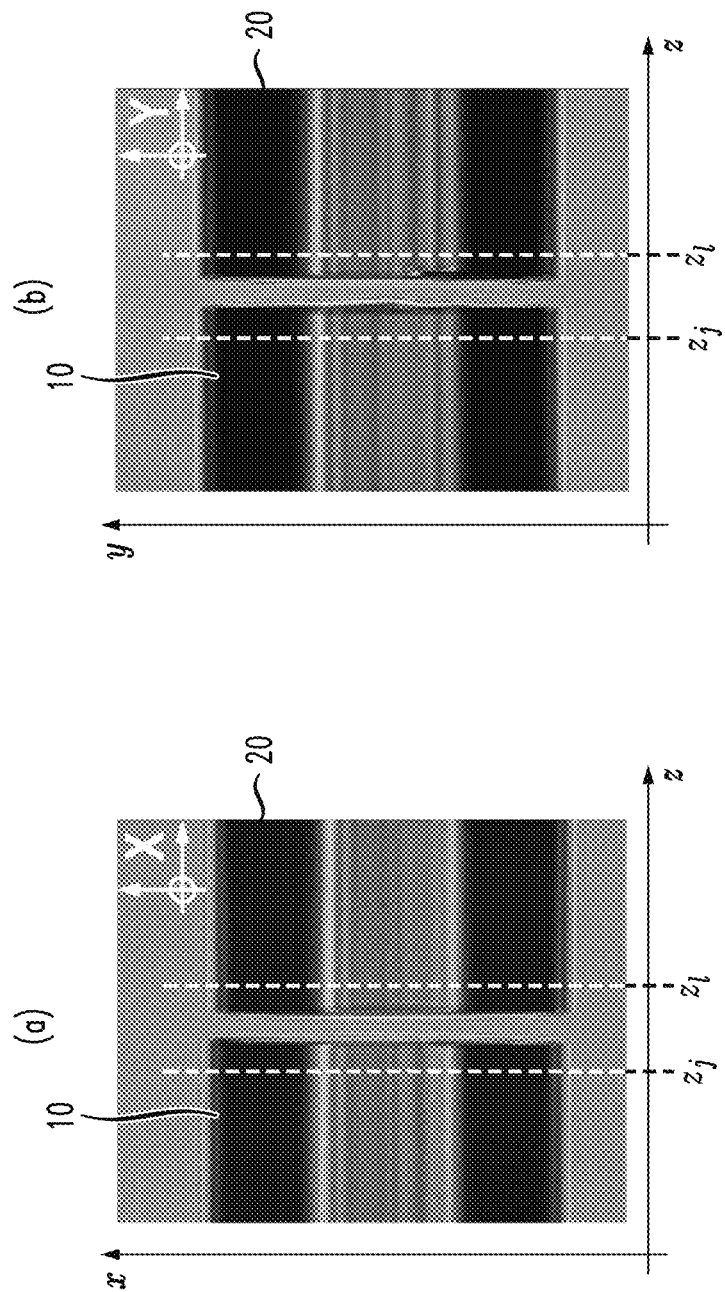
FIG. 8 illustrates exemplary side-view projections obtained by the system as shown in FIG. 6, where

For the following azimuthal alignment computations, the originally continuous variables $\vartheta, t, z$ will take on discrete values associated with the specific locations where digital images are to be recorded; namely, by choosing N azimuthal angles $\vartheta_n$ around the fiber axis, K transverse positions $t_k$ through the thickness of the fiber, and L longitudinal locations $z_l$ along the length of the fiber. These three sets of numbers do not need to be equispaced, i.e., differences between neighboring points are allowed to vary. The total numbers N, K, L are nonnegative integers, using the counting indices n=1, k=1, . . . , K, l=1, . . . , L. In the following, the longitudinal location may occasionally be written as $z_j$ or $z_k$ instead of $z_l$, if multiple longitudinal locations appear in the same context, such as when collecting image data from a pair of fibers that are to be aligned and spliced together. For example, the side-view projections of FIG. 8 illustrate the use of multiple longitudinal locations for image data collection, in particular a first longitudinal location $z_j$ at fiber 10 and a second longitudinal location $z_k$ at fiber 20. As noted above, FIG. 8(a) is an x-view side projection, showing the respective longitudinal locations $z_j$ and $z_k$ of fibers 10 and 20, and FIG. 8(b) is a y-view side projection of the same fiber pair.

To also discretize the side-view projection intensity $I_{side}$ ($\vartheta, t_{side}, z$), L so-called "sinogram" matrices $S^{(l)}$ of dimension N×K are defined, where each of these matrices represents the intensity at $z=z_l$ along a discretized transverse line $t_1 \ldots t_K$ while the associated fiber is being rotated through all of the defined N discrete rotation angles. In FIG. 8, we have L=2 longitudinal locations; namely, $z=z_j$ and $z=z_k$, and the alignment analysis is thus based upon a pair of sinogram matrices $S^{(j)}$ and $S^{(k)}$.

Figure 1:
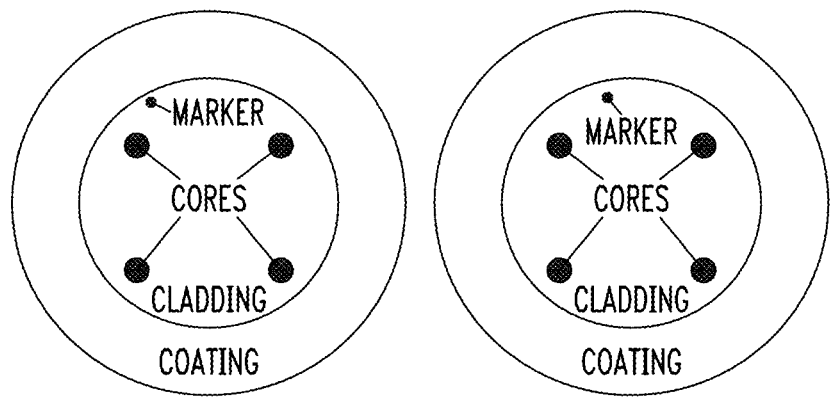
FIG. 1 depicts an example of rotationally non-invariant fibers that may be presented for alignment and splicing (here, having the same core layout, but different marker locations)
Figure 9:
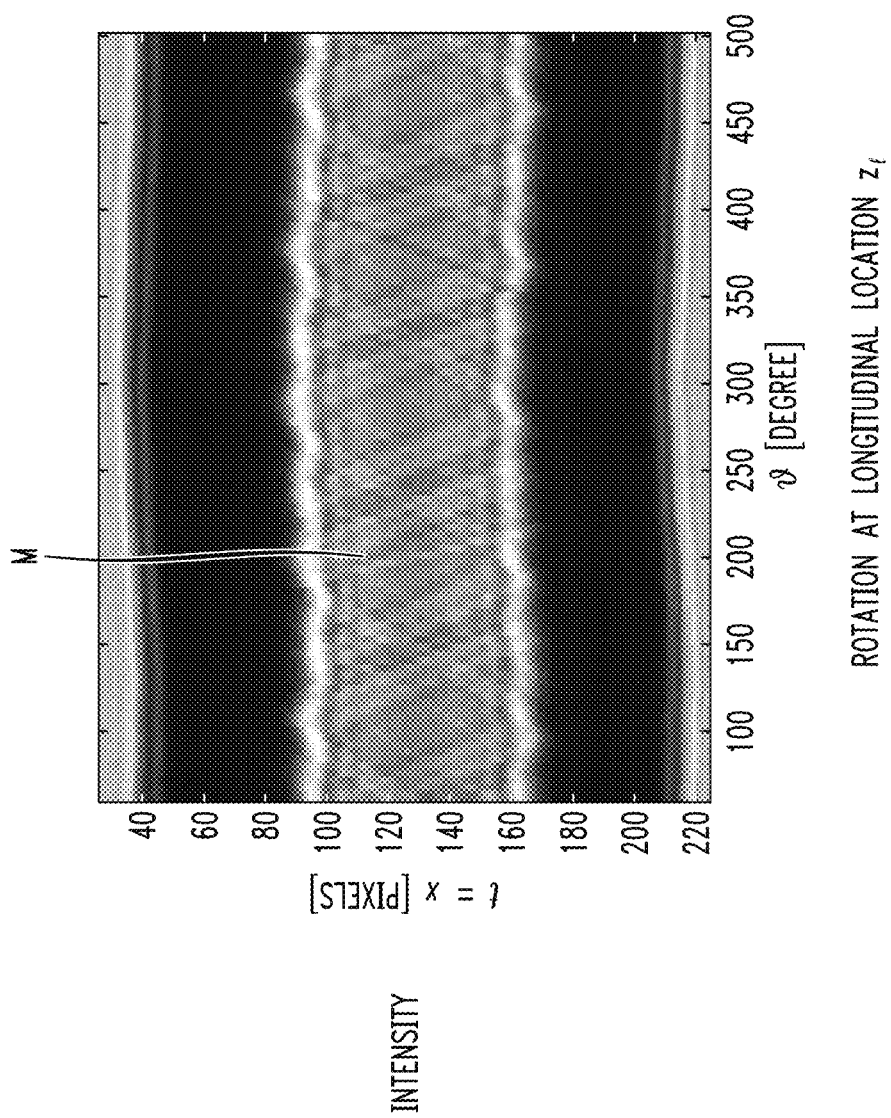
FIG. 9 illustrates image data collected at a fixed longitudinal location (i.e., at a fixed location along the z-axis direction), the data collected for a number N of different rotation angles and a number K of different transverse positions through the fiber.
Figure 10:
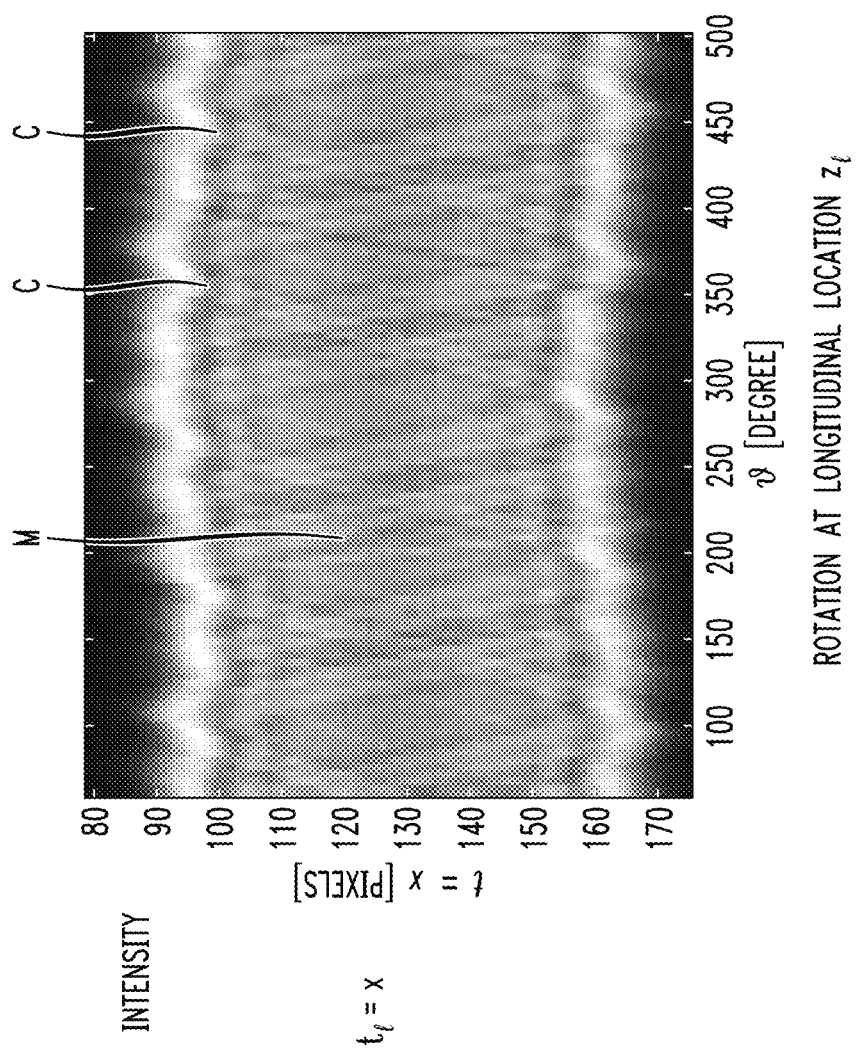
FIG. 10 is a close-up view of a portion of the data illustrated in FIG. 10.

FIG. 9 shows an example of the intensity at a fixed longitudinal location $z=z_l$ as a function of the rotation angle $\vartheta$ and the transverse coordinate t=x for the case of an x-view of a multicore fiber as in FIG. 1. After zooming in on the inner transverse region that shows the details of the transverse structure of any cores and/or markers and/or cladding shapes, the relevant intensity area is shown in FIG. 10, which illustrates the structure that spans transverse pixel locations between 80 and 175. The curved shape of FIG. 10, which becomes most obvious around pixel locations 90 and 160, may be caused by an unwanted skewness of the fiber and/or any other unwanted imperfections that may arise during the rotational scan of the fiber. After numerically straightening this curved shape and after restriction to a single 360° wide angle interval, the resulting corrected intensity $I(\vartheta_n, x_k, z_l)$ is shown in FIG. 11.

Figure 11:
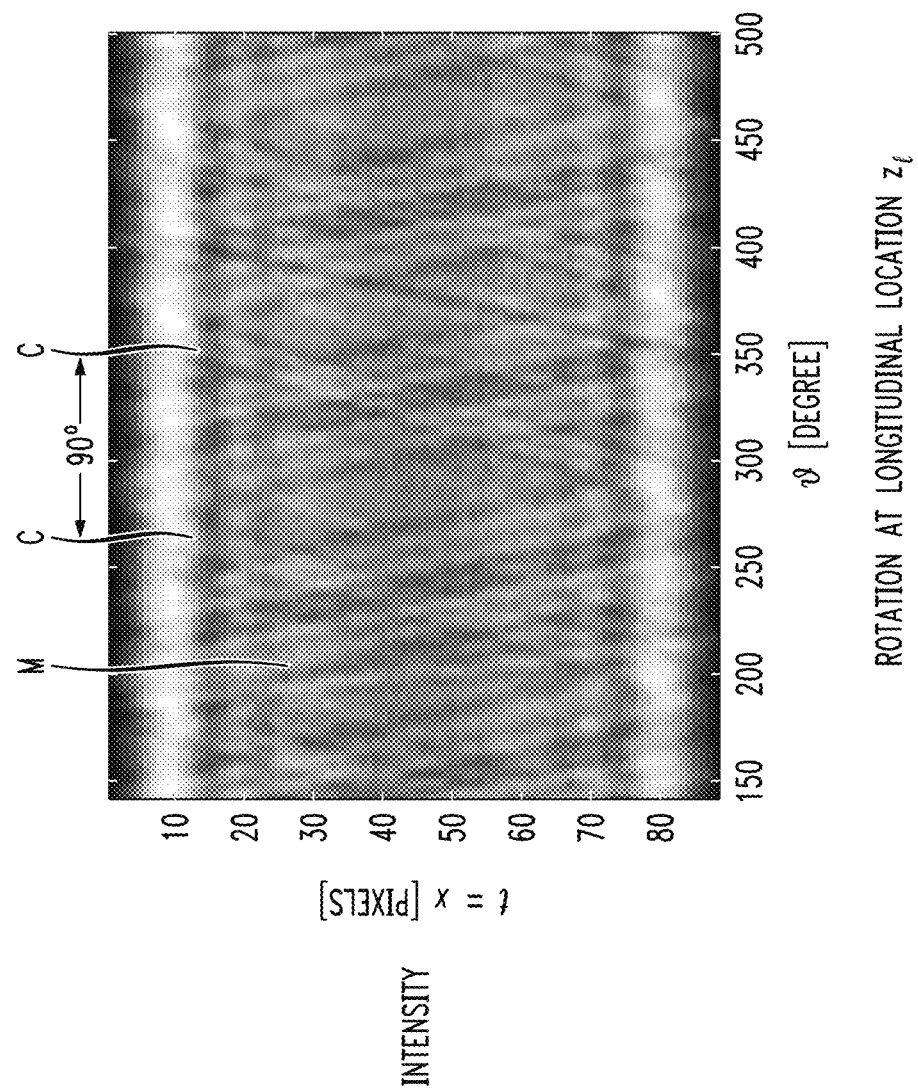
FIG. 11 is a re-characterized version of the data shown in FIG. 10, after applying numerical correction to compensate for unwanted fiber tilt, as well as other unwanted imperfections during the rotational scan of the fiber.
Figure 12:
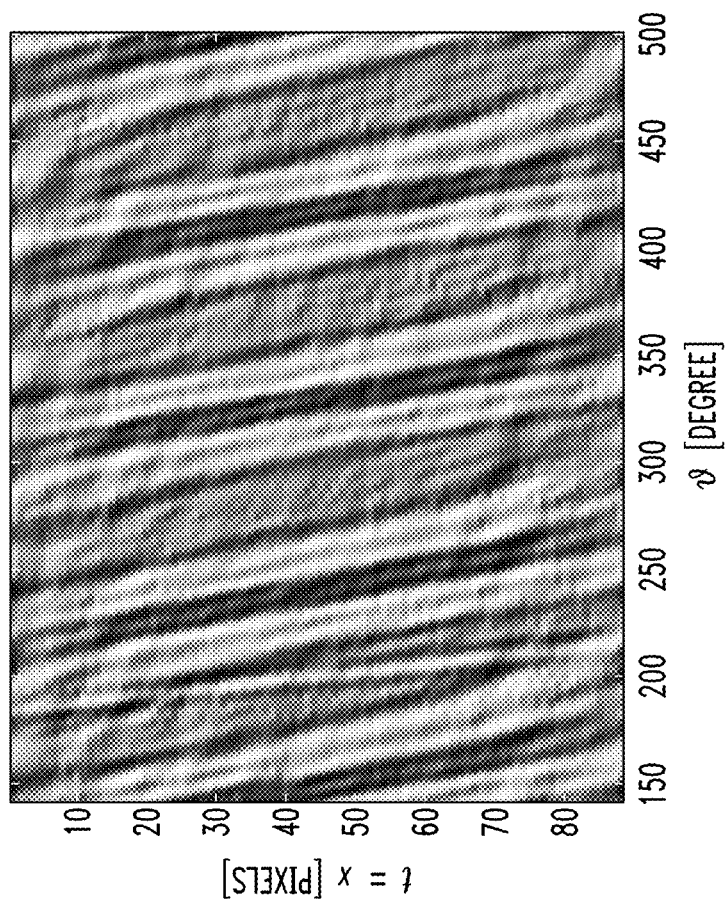
FIG. 12 is a plot of the data of FIG. 11 subsequent to the application of a transformation that filters out irrelevant spatial frequencies to improve the accuracy of the rotational alignment algorithm.

Beyond this numerical correction, a further data preprocessing step may be obtained by performing a filtering transformation, such as a two-dimensional fast Fourier transform (2D-FFT), to filter out certain spatial frequencies, e.g., those spatial frequencies that in FIGS. 9-11 correspond to slopes going from bottom left to top right, or to slopes going from bottom right to top left. FIG. 12 shows the improvement in the intensity data subsequent to applying this FFT filtering. Other approaches for filtering out irrelevant spatial frequencies may be applied as well. In general and based upon the information displayed in FIGS. 9-12, at each longitudinal location $z_l$, such a so-called discrete sinogram is mathematically represented by a matrix $S^{(l)}$ of dimension N×K whose entries $S_{n,k}^{(l)}$ are defined as:

$$S_{n,k}^{(l)} = I(\vartheta_n, t_k, z_l), n=1, \ldots, N, k=1, \ldots,$$
$$K, l=1, \ldots, L. \quad (2)$$

To achieve the analytically expected periodicity with period $2\pi=360°$ in the collected image data, even in presence of significant measurement noise and other imperfections, $I(\vartheta_n, t_k, z_l)$ may represent filtered measurement data. In this case, $I(\vartheta_n, t_k, z_l)$ may be, for example, the product of the measured data and a $\vartheta$-dependent filter function to ensure the $2\pi$-periodicity. If the dimensions N or K originally differed at the different locations $z_l$ for any technical reasons (e.g., because images were taken with different cameras, resolutions, foci or angular increments), then interpolation can be used to make these dimensions identical across all the different locations $z_l$.

At different discrete longitudinal locations $z_j \neq z_l$, the fiber properties do not need to be identical. Examples for fiber properties that may be different at different longitudinal positions $z_j \neq z_l$, regardless if $z_j$ and $z_l$ are located at different fibers or at the same fiber (i.e., we explicitly allow fibers whose properties change longitudinally), are fiber twist, polarity, the numbers, sizes and locations of cores, the positions, sizes and types of markers, cladding diameter, coating diameter, etc.

To avoid mathematical ambiguities, the azimuthal angles $\vartheta_n$ are assumed to be distinct even after applying the modulo-$2\pi$-command, i.e., mod($\vartheta_n, 2\pi$)$\neq$mod($\vartheta_m, 2\pi$) whenever n$\neq$m. In complex-valued notation with the imaginary unit i, this is equivalent to $e^{i\vartheta_n} \neq e^{i\vartheta_m}$ whenever n$\neq$m. As a result, a regular matrix F may be defined (inverse Fourier transform, nonuniform if the angles $\vartheta_n$ are not equispaced) of dimension N×N that has complex-valued entries $$F_{n,m} = \frac{1}{N} e^{i(m-1)\vartheta_n}, n, m = 1, \ldots, N. \quad (3)$$

Using the indexing convention from Eq. (3), the first column m=1 of the matrix F describes a zero angular frequency, i.e., the angle-invariant constant part. Since the matrix F is regular, the linear system $$F\tilde{S}^{(l)} = S^{(l)} \quad (4)$$

has a unique solution matrix $\tilde{S}^{(l)}$ of dimension N×K. For notational clarity, the tilde accent "˜" is used for Fourier domain quantities. The k-th column of the matrix $\tilde{S}^{(l)}$ contains the set of N discrete Fourier coefficients of the discrete sinogram $S^{(l)}$ at the transverse position $t_k$ and longitudinal location $z_l$. It is noted that that if F was not regular, for instance because the above distinctness assumption ($e^{i\vartheta_n} \neq e^{i\vartheta_m}$ whenever $n \neq m$) was not true, then Eq. (4) may be solved using the pseudoinverse of the matrix F.

To further simplify the following notation, the asterisk "*" is used to denote complex conjugate (without transposing) and the symbol "⊙" (\odot) for the element-wise (Hadamard) multiplication of two matrices of equal dimension. The element-wise product of the matrix $\tilde{S}^{(l)}$ (for example, associated with the image data of fiber 10 in FIG. 8, collected at $z=z_l$) and a complex-valued or real-valued matrix $\tilde{S}^{(j)}$ (e.g., associated with fiber 20 at $z=z_j$ in FIG. 8) of equal dimension N×K may be built using the following relation:

$$\tilde{D}^{(j,l)} = \tilde{S}^{(j)*} \odot \tilde{S}^{(l)}. \tag{5}$$

Thus, the complex-valued or real-valued matrix $\tilde{D}^{(j,l)}$ also has the dimension N×K. In order to maintain the physical integrity of the fiber endfaces, all transverse positions need to be subject to the same angular correction. Hence, the information from all transverse positions needs to be combined. Therefore, a suitable set of real-valued or complex-valued transverse weights $\{w_k\}_{k=1}^{K}$ is used (at least one of the $w_k$ needing to be nonzero) to build a weighted sum of all columns of the matrix $\tilde{D}^{(j,l)}$ and thus obtain a column vector $\tilde{d}^{(j,l)}$ with complex-valued entries $$\tilde{d}_n^{(j,l)} = \sum_{k=1}^{K} w_k \tilde{D}_{n,k}^{(j,l)}, n = 1, \ldots, N. \tag{6}$$

Finally, the Fourier transform from Eq. (4) is undone by applying the transformation matrix F:

$$d^{(j,l)} = F\tilde{d}^{(j,l)}. \tag{7}$$

One approach ("cross-correlation approach") for performing azimuthal alignment is based upon using this above-described cross-correlation, where the Fourier-domain sinogram $\tilde{S}^{(j)} = F^{-1} S^{(j)}$ is designated as fully representative of the projected image data. According to Fourier analysis well known to people skilled in the art, $\tilde{D}^{(j,l)}$ then contains the discrete Fourier coefficients of the cross-correlation of $S^{(j)}$ and $S^{(l)}$. Thus, if the weights are nonnegative (which implies that they are real-valued), i.e., $w_k \geq 0$ for all $k=1, \ldots, K$, then the entries $d_n^{(j,l)}$ of the N-dimensional vector $d^{(j,l)}$ in Eq. (7) represent a transverse-weighted cross-correlation of the two sinograms $S^{(j)}$ and $S^{(l)}$ that are taken at longitudinal locations $z_j$ and $z_l$ (e.g., along fibers 10 and 20 in FIG. 8), at the discrete angles $\vartheta_n$. Since both $S^{(j)}$ and $S^{(l)}$ are real-valued, $d^{(j,l)}$ is then real-valued as well. Thus, if $n_{best} \in \{1, \ldots, N\}$ is the index where the vector $d^{(j,l)}$ has its largest entry, i.e., $d_{n_{best}}^{(j,l)} \geq d_n^{(j,l)}$ for all $n=1, \ldots, N$, then the associated value $\vartheta_{best}^{(j,l)} = \vartheta_{n_{best}}$ is the angle by which the fiber cross section at $z=z_j$ needs to be rotated to achieve optimum (in the sense of being the best out of the N discrete angles $\vartheta_1, \ldots, \vartheta_N$) alignment with the fiber cross section at $z=z_l$. Equivalently, the fiber cross section at $z=z_l$ would need to be rotated by $-\vartheta_{best}^{(j,l)}$ for optimum alignment with the cross section at $z=z_j$.

In accordance with the principles of the present invention, another methodology for obtaining an optimum azimuthal alignment is referred to as the "subtractive" approach that was mentioned above in association with the discussion of FIGS. 9-12. In the case of this subtractive approach, the analysis is first done separately for the two longitudinal locations $z=z_j$ and $z=z_l$, resulting in two separate column vectors $d^{(j)}$ and $d^{(l)}$. Based on the formation of these separate column vectors, a separate "best" alignment angle is determined for each vector, defined as $\vartheta_{best}^{(j)}$ and $\vartheta_{best}^{(l)}$. Following this determination, the one alignment is subtracted from the other to yield the relative angle $$\vartheta_{best}^{(j,l)} = \vartheta_{best}^{(l)} - \vartheta_{best}^{(j)} \tag{8}$$

that is used in the alignment system to adjust the position of one fiber relative to the other and achieve optimum azimuthal alignment. In the following, the determination of $d^{(l)}$ for the subtractive approach is described, where it is to be noted that $d^{(j)}$ can be similarly determined while exchanging the indices l and j.

To determine $d^{(l)}$ for the subtractive approach using the notation from Eqs. (5) to (7), a matrix $\tilde{S}^{(j)}$ is chosen in Eq. (5) with entries $\tilde{S}_{n,k}^{(j)} = a_k$ and arbitrary nonzero real-valued or complex-valued numbers $a_k \neq 0$ for $k=1, \ldots, K$, i.e., a matrix $\tilde{S}^{(j)}$ whose rows are all identical, with weights $w_k$ in Eq. (6) are chosen to satisfy the equation $w_k a_k^* = w_{k-1} a^*_{k-1} e^{i\gamma_{slope}}$ for $k=2, \ldots, K$ with a real-valued number $\gamma_{slope}$. Since this is mathematically equivalent to choosing a j-independent unity matrix $\tilde{S}^{(j)} = I$, the superscript "j" of the vector $d^{(j,l)}$ in Eq. (7) can be omitted, i.e., $d_n^{(j,l)} = d_n^{(l)}$ is valid without loss of generality in the case of the subtractive approach. In other words, in the subtractive approach, the weights $w_k$ are chosen such that neighboring columns (corresponding to neighboring transverse positions $t_k$ in Eq. (2)) of the matrix $\tilde{S}^{(l)}$ in Eq. (6) are added with relative phase shifts of $\gamma_{slope}$ radians.

According to Fourier analysis well known to people skilled in the art, this means that the entries $d_n^{(l)}$ of the N-dimensional vector $d^{(j,l)} = d^{(l)}$ in Eq. (7) represent sums of shifted copies of the columns of the discrete sinogram $S^{(l)}$ from Eq. (2), effectively summing up the entries of $S^{(l)}$ along a direction that has the slope $\gamma_{slope}$. The reason for doing the transverse summation along a certain direction becomes obvious in the side-view sinogram example shown in FIGS. 9-12. Characteristic features that arise from the presence of cores or markers or cladding shapes etc. show up as tilted lines, and not as exactly vertical lines. Moreover, the steepness (slope) of those tilted lines increases with an increasing distance of that particular transverse feature from the axis of rotation, which should be identical to the fiber axis. Therefore, the optimum $\gamma_{slope}$ depends on the transverse location of the feature whose signal is to be detected. For instance, since the marker is placed further away from the fiber axis than the cores in the fiber cross section (see FIG. 1), the slope of the marker M at the azimuthal angle $\vartheta = 200°$ in the sinograms in FIGS. 9 to 12 is steeper than the slope of the four cores C that appear after every 90°. Hence, different values of $\gamma_{slope}$ may be used for cores and markers. The extreme case $\gamma_{slope} = 0$ corresponds to a simple transverse summation along lines $\vartheta = const$ in the sinograms, which is appropriate for end-view images, but not for side-view sinograms where it would be the limit of infinite transverse distance of a feature from the fiber axis. While the slopes are being explicitly addressed by the value of $\gamma_{slope}$ in the subtractive approach, this is not necessary in the cross-correlation approach, where the slopes at the different locations $z_j$ and $z_l$ implicitly (automatically) cancel each other out due to the complex conjugate of the matrix $\tilde{S}^{(j)*}$ in Eq. (5).

In both side-view and end-view, the determination of $\vartheta_{best}^{(l)}$ from $d^{(l)}$ (and $\vartheta_{best}^{(j)}$ from $d^{(j)}$ in the subtractive approach is similar to Eqs. (9)-(11) below and will be discussed there in detail.

Summarizing, the subtractive approach analyzes individual sinograms (instead of pairs of sinograms as in the case of the cross-correlation approach) first and later subtracts the resulting angles as shown in Eq. (8). Due to the slope-induced phase shifts between neighboring transverse positions in the sinogram, the summation weights are defined to include a relative phase shift so that the summation occurs along the sloping lines and properly accumulates information associated with a defined longitudinal location.

For both the cross-correlation and subtractive approaches, to further improve the accuracy of the angle $\vartheta_{best}^{(j,l)}$, interpolation (e.g., sinc, spline or polynomial interpolation including quadratic, cubic etc.) can be used to obtain a function $d^{(j,l)}(\vartheta)$ from the discrete sets $d_n^{(j,l)}$ and $\vartheta_n$ for $n=1, \ldots, N$. In this case, $\vartheta_{best}^{(j,l)} = \mathrm{argmax}_{\vartheta \in [0,2\pi)} (d^{(j,l)}(\vartheta))$ is used, i.e., $\vartheta_{best}^{(j,l)}$ is then the angle where the function $d^{(j,l)}(\vartheta)$ has its maximum.

The results from the cross-correlation and subtractive approaches may also be combined, e.g., by using the accuracy component from the cross-correlation approach with the selection component from the subtractive approach or vice versa. Another way of combining both approaches would be an average of their two accuracy components and their two selection components.

Having knowledge of the optimum alignment angle $\vartheta_{best}^{(j,l)}$ between the fiber cross sections at $z=z_j$ and $z=z_l$ has multiple applications. If $z_j$ and $z_l$ are located at or near the ends of two fibers that are to be spliced together or connectorized, then the computed value $\vartheta_{best}^{(j,l)}$ is the azimuthal angle by which the fiber at $z_j$ needs to be rotated prior to splicing or connectorization (or, equivalently, rotate the fiber at $z_l$ by $-\vartheta_{best}^{(j,l)}$). Alternatively, if $z_j$ and $z_l$ are located within a single fiber, the collected digital image data may be used to determine internal fiber properties, such as an intentional or unintentional twist rate, e.g., if a transverse feature such as one or more offset cores, stress rods or other features are disposed in a helical pattern along the length of the fiber. In particular, the measured twist rate of this fiber is defined as $$\frac{\vartheta_{best}^{(j,l)}}{2\pi(z_l - z_j)}$$

between these locations $z_j$ and $z_l$. For example, if $z_l-z_j=2$ mm and $\vartheta_{best}^{(j,l)}=0.628$ rad, the measured twist rate is 49.975/m between these locations $z_j$ and $z_l$. At other locations along the fiber or fibers, the measured twist rate can be different, for instance, if the twist rate varies (intentionally or not) during fiber draw. FIG. 13(a) illustrates an example of collecting image data at two separate locations within the same fiber, thus allowing for the twist rate of the included core regions to be determined.

If measurements at more than two longitudinal locations $z_j$ and $z_l$ are available, i.e., L>2 in Eq. (2), then linear or nonlinear least-squares fitting or linear regression or other numerical methods may be used to further improve the accuracy of the alignment angle computation. FIG. 13(b) illustrates the situation where three separate longitudinal locations are used for image data collection, denoted as $z_{l-1}$, $z_l$, and $z_{l+1}$. In this case, a line $\vartheta_{fit}(z)=\vartheta_{fit,0}+a_{fit}z$ can be fit to the data $(z_l, \Sigma_{k=1}^{l-1} \vartheta_{best}^{(k,k+1)})$ using all available locations along a single fiber, resulting in a measured twist rate $$\frac{a_{fit}}{2\pi}.$$

Extending the use of multiple measurements within each fiber of a pair of fibers to be joined (as shown in FIG. 13(c)) and combining two fitting lines $\vartheta_{fit}^{(A)}(z)$ and $\vartheta_{fit}^{(B)}(z)$ for these fibers provides an optimum alignment angle by solving $\vartheta_{best}^{(A,B)} = \vartheta_{fit,0}^{(B)} + a_{fit}^{(B)} z^{(B)} - \vartheta_{fit,0}^{(A)} - a_{fit}^{(A)} z^{(A)}$, if $z^{(A)}$ and $z^{(B)}$ are the locations of their respective ends. Instead of a straight line, i.e., a fit of degree $d_{fit}=1$, a higher-order fit (parabolic, cubic, quartic, etc., in general of degree $d_{fit} \geq 1$) can be used as well for the twist rate if there are at least $d_{fit}+1$ locations $z_l$ along the particular single fiber. Regardless of the choice of $d_{fit}$, the twist rates in the two fibers are thus first determined separately, and then used to compute the optimum alignment angle. More broadly speaking, the collected image data may be used to determine both the twist rate and the optimum azimuthal alignment angle as long as a sufficient number of longitudinal locations are used in the data gathering phase. There is, of course, a trade-off between the processing required for transferring and analyzing a large data set and the level of accuracy required for determining twist rate and/or alignment angle. Selected applications may benefit from the collection of data from a large number of separate longitudinal locations, while other applications may be sufficiently configured using only a set of one to three locations (for example) from each fiber.

Alternatively, the twist rates and optimum alignment angle can be determined simultaneously for both fibers by a single system of linear equations. In this case, there is one equation for each pair of longitudinal locations in this system of equations. If there are totally $L=L_L+L_R$ longitudinal locations $z_l$ along both fibers (e.g., $L_L$ locations along the left fiber and $L_R$ along the right fiber), then there are $$L\frac{(L-1)}{2} = \binom{L}{2}$$

(usually pronounced "L choose 2") equations in said linear system. The unknowns in this system are the twist rates of the two fibers (or, more generally, their expansion coefficients in the case of a higher-order fit $d_{fit}>1$) and the optimum alignment angle $\vartheta_{best}^{(A,B)}$.

As mentioned above in the discussion of the prior art global algorithmic approach to azimuthal alignment, measurement noise and other imperfections may turn the global maximum of $d^{(j,l)}$ into a local maximum. In other words, if the cross-correlation vector $d^{(j,l)}$ has several peaks of approximately identical height, the wrong peak of the cross-correlation might be chosen if the data quality is not sufficiently high. An example of the misidentification of the proper alignment peak is shown in FIG. 14, where the highest peak of the cross-correlation $d^{(j,l)}$ is at 292.903°. Indeed, the proper selection would be the previous peak at 202.950°, as will be shown by utilizing the inventive additive component azimuthal alignment process of the present invention.

That is, in accordance with the principles of the present invention, a more robust azimuthal alignment algorithm is proposed that separates the cross-correlation vector $d^{(j,l)}$ (or the separate vectors $d^{(i)}$ and $d^{(j)}$ in the case of the subtractive approach, but here all using the common notation $d^{(j,l)}$ for simplicity) into two additive components: the "accuracy component" $d_{acc}^{(j,l)}$ that captures those parts of the transverse geometry that should be perfectly aligned azimuthally, and the "selection component" $d_{sel}^{(j,l)}$ that comprises everything else (with perhaps the exception of DC components and/or irrelevant high frequency components) and is used in accordance with the teachings of the present invention to select one of several possible azimuthal alignment options of the accuracy component. Thus, Eq. (7) becomes $$d^{(j,l)} = d_{acc}^{(j,l)} + d_{sel}^{(j,l)} = \underbrace{F\tilde{d}_{acc}^{(j,l)}}_{d_{acc}^{(j,l)}} + \underbrace{F\tilde{d}_{sel}^{(j,l)}}_{d_{sel}^{(j,l)}} = F\underbrace{(\tilde{d}_{acc}^{(j,l)} + \tilde{d}_{sel}^{(j,l)})}_{\tilde{d}^{(j,l)}} = F\tilde{d}^{(j,l)}. \quad (9)$$

While shown strictly as a sum of two components, it is to be understood that besides the accuracy component and the selection component, there may be additional data (e.g., in the form of a DC (average) component and/or irrelevant fundamental or high-frequency components) that result in the summation of $d_{acc}^{(j,l)} + d_{sel}^{(j,l)}$ differing from $d^{(j,l)}$ without impact on the results of the alignment process. Clearly, variations in the additive component approach that ignore various irrelevant components that may not fall expressly within the definition as shown in Eq. (9) are considered as falling within the scope of the present invention.

If there are $M_{equiv}$ nominally indistinguishable and equivalent ways of orienting the cores (excluding any markers or other asymmetries), e.g., $M_{equiv}=4$ in the case of a pair of four-core fibers shown in FIGS. 1 and 2 (however, as shown below, $M_{equiv}$ is in general not necessarily identical to the total number of cores or the number of outer cores of the fibers), then one way of performing the separation in Eq. (9) is by separating azimuthal frequencies according to $$\tilde{d}_{acc\ n}^{(j,l)} = \begin{cases} \tilde{d}_n^{(j,l)}, & n \in I_{acc}, \\ 0, & \text{otherwise}. \end{cases} \quad (10)$$

In other words, each entry of the vector $\tilde{d}_{acc}^{(j,l)}$ is either zero or identical to the same entry of the original vector $\tilde{d}^{(j,l)}$, depending on whether this entry is part of an index set $I_{acc}$. One way of defining the index set $I_{acc}$ is using the characteristic azimuthal frequency $M_{equiv}$ and its harmonics, i.e., $$I_{acc} = \left\{ n: n = 1 + \text{mod}(mM_{equiv}, N), m \in \mathbb{Z}, \left| m + \frac{1}{4M_{equiv}} \right| \leq \frac{N - \frac{1}{2}}{2M_{equiv}} \right\}. \quad (11)$$

In Eq. (11), the modulo command "mod" is necessary to correctly convert the integer number m, which is from the set $\mathbb{Z}$ of integers and can therefore be negative, to the positive integer indices n that is used for indexing the entries in the vector $\tilde{d}_{acc}^{(j,l)}$ in Eq. (10). The inequality at the end of Eq. (11) is necessary to avoid aliasing.

Figure 15:
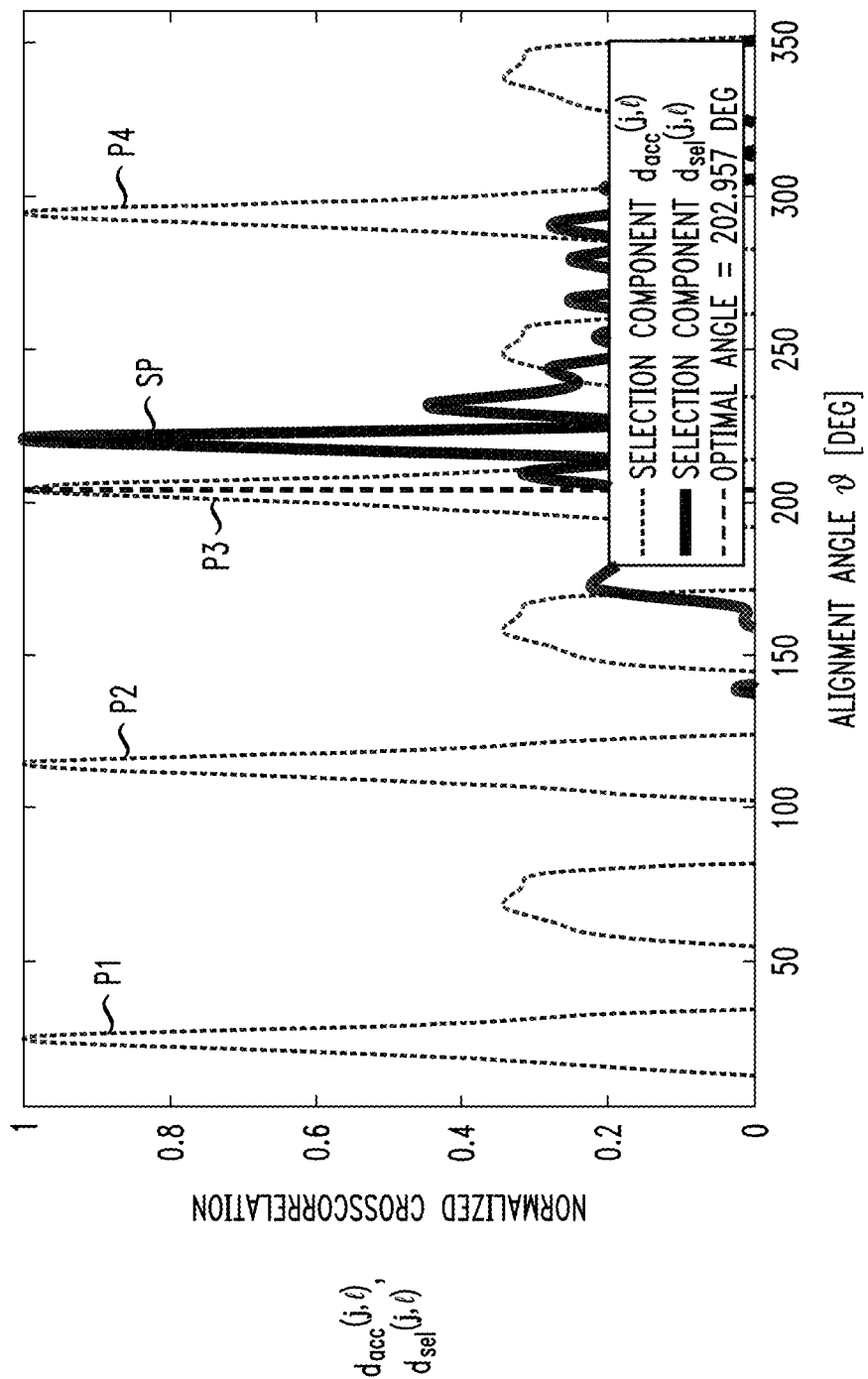
FIG. 15 contains plots of cross-correlation data using the additive component approach to azimuthal alignment in accordance with the present invention, illustrating a set of peaks associated with cross-correlation of critical features that require accurate alignment, as well as secondary peak(s) associated with remaining features in the transverse geometry of the fiber.

Choosing $\tilde{d}_{acc}^{(j,l)}$ from Eqs. (10) and (11), the accuracy component $d_{acc}^{(j,l)}$, exhibits $M_{equiv}$ equivalent peaks of identical height, shown as peaks P1, P2, P3, and P4 in the plot of FIG. 15. Out of these $M_{equiv}$ candidates for the best alignment angle $\vartheta_{best}^{(j,l)}$, the one that is closest to the highest peak SP of the selection component $d_{sel}^{(j,l)}$ (after taking into account the $2\pi$-periodicity) is identified as the "proper" alignment angle. An example of the proper selection of peak P3 is also shown in FIG. 15, and the correctness of the achieved alignment using this peak (associated with optimum angle $\vartheta_{best}^{(j,l)}=202.957°$ has been experimentally confirmed. In contrast, the unseparated cross-correlation $d^{(j,l)}$ shown in FIG. 14 suggests the wrong peak at 292.903° as discussed above.

In the case of the above-described subtractive approach, the algorithm described by Eqs. (9)-(11) is separately performed for $d^{(j,l)}=d^{(j)}$ and $d^{(j,l)}=d^{(l)}$. Furthermore, the accuracy and selection components can be taken from different runs that used different values of $\gamma_{slope}$. For example, a certain value $\gamma_{slope,acc}$ may be optimum for the accuracy component, while a different $\gamma_{slope,sel}$ may be optimum for the selection component. Thus, using the accuracy component from the particular run that used $\gamma_{slope,acc}$, with the selection component from the particular run (which may be the same run or a different run) that used $\gamma_{slope,sel}$ may improve the accuracy and reliability of the overall algorithm in comparison to using accuracy and selection components from a single run with a single value of $\gamma_{slope}$. The optimum values of $\gamma_{slope,acc}$ and $\gamma_{slope,sel}$, respectively, may be found by a 2D-FFT of the side-view sinogram $S^{(l)}$ and $S^{(j)}$, as mentioned above in association with FIG. 12, followed by the maximization of $d_{acc}^{(j,l)}$ and $d_{sel}^{(j,l)}$, respectively. This procedure results in separate angles $\vartheta_{best}^{(j)}$ and $\vartheta_{best}^{(l)}$ that are then subtracted according to $\vartheta_{best}^{(j,l)}=\vartheta_{best}^{(l)}-\vartheta_{best}^{(j)}$ in Eq. (8) to arrive at the final alignment result.

While there is an infinite amount of possible azimuthal alignment orientations when inserting a single fiber into a splicer or connector, there are only two possible longitudinal orientations, corresponding to the question which of the two ends of the fiber should be inserted into the splicer or connector. By pulling a fiber out of the splicer or connector, and then re-inserting its other end, the polarity of this fiber is flipped with respect to the observer plane (which is perpendicular to the fiber axis z and usually located in the splicer or connector). Hence, the polarity of a fiber is a binary piece of information with only two possible values that may be named "0" and "1", "−1" and "1", "positive" and "negative", "in" and "out", "in" and "ex", "up" and "down", etc. If the transverse (cross-sectional) geometry of the fiber is mirror-symmetric (also referred to as reflection-symmetric or mirror-reflection-symmetric) with respect to any straight line within the cross section, then both polarities are indistinguishable.

When splicing or connectorizing two fibers that do not have such a perfect mirror-symmetry, e.g., fibers with asymmetries such as markers, a D-shaped cladding, or an asymmetric core layout, etc., the relative polarity of the two fibers matters. The simplest example is a single non-mirror-symmetric fiber that is cut into two pieces, with one of the resulting pieces being "flipped" around, resulting in presenting an end view that is not identical to the pre-cut version. This is illustrated by the example in FIG. 16, showing both ends of a fiber, i.e., before and after flipping, as observed from the outside, e.g., by a human technician. If all cross-sectional features of the fiber end shown in FIG. 16(*a*) can be perfectly aligned with another fiber (not shown, but identical to FIG. 16(*a*)) in the splicer, then at least one cross-sectional feature of the other fiber end (i.e., after flipping) shown the FIG. 16(*b*) cannot be aligned with said other fiber in the splicer, because it is not mirror-symmetric. In this case shown in FIG. 16 of a multicore fiber including a marker to identify a specific channel, the marker cannot be perfectly aligned between the original and the flipped fiber, if the cores are perfectly aligned.

In a cartesian coordinate system, flipping a fiber means flipping the sign of the longitudinal coordinate z and the sign of one transverse coordinate (x, y or any linear combination of both). In cylinder coordinates, it means flipping the sign of z and the sign of the angle 503836. By applying these mathematical transformations to the measured sinograms in Eq. (2), the sinograms $S^{(l),flipped}$ of a flipped fiber can be predicted without additional measurements according to $$S_{n,k}^{(l),flipped} = \begin{cases} S_{N+1-n,K+1-K}^{(l)} & \text{if side - view} \\ S_{N+1-n,k}^{(l)} & \text{if end - view} \end{cases}, \quad (12)$$

$$n = 1, \ldots, N, k = 1, \ldots, K.$$

Replacing $S^{(l)}$ in Eqs. (4) to (10) by $S^{(l),flipped}$, the following relation is obtained:

$$F\tilde{S}^{(l),flipped} = S^{(l),flipped}, \quad (13)$$

$$\tilde{D}^{(j,l),flipped} = \tilde{S}^{(j)} * \odot \tilde{S}^{(l),flipped}, \quad (14)$$

where it is important to flip only one of the two sinograms. Thus, $$\tilde{d}_n^{(j,l),flipped} = \sum_{k=1}^{K} w_k \tilde{D}_{n,k}^{(j,l),flipped}, n = 1, \ldots, N. \quad (15)$$

and $$d^{(j,l),flipped} = \underbrace{F\tilde{d}_{acc}^{(j,l),flipped}}_{d_{acc}^{(j,l),flipped}} + \underbrace{F\tilde{d}_{sel}^{(j,l),flipped}}_{d_{sel}^{(j,l),flipped}} = F\tilde{d}^{(j,l),flipped}, \text{ where} \quad (16)$$

$$\tilde{d}_{acc}^{(j,l),flipped}{}_n = \begin{cases} \tilde{d}_n^{(j,l),flipped}, & n \in I_{acc}, \\ 0, & \text{otherwise}. \end{cases} \quad (17)$$

Similar to using $d^{(j,l)}$ to compute the optimum rotation angle $\vartheta_{best}^{(j,l)}$ by which the fiber cross section at $z=z_j$ needs to be rotated to achieve optimum alignment with the fiber cross section at $z=z_l$ as described above, $d^{(j,l),flipped}$ is used to compute the optimum rotation angle $\vartheta_{best}^{(j,l),flipped}$ by which the fiber cross section at $z=z_j$ needs to be rotated to achieve optimum alignment with the flipped fiber cross section at $z=z_l$. Replacing j by 1 in Eqs. (12) to (17) results in $\tilde{D}^{(l,l),flipped} = \tilde{S}^{(l)*} \odot \tilde{S}^{(l),flipped}$ and $d^{(l,l),flipped}$, from which $\vartheta^{(l,l),flipped}$ can be similarly computed. It then follows that the difference $$\vartheta_{best,2}^{(j,l)} = \vartheta_{best}^{(j,l),flipped} - \vartheta_{best}^{(l,l),flipped}, \quad (18)$$

is computed as an alternative to $\vartheta_{best}^{(j,l)}$. With this information, it can then be determined if the polarity of one of the fibers needs to be flipped before proceeding with the fusion splicing operation.

That is, the two fibers to be spliced or connectorized already have the correct relative polarity if the optimal alignments for $d_{sel}^{(j,l)}$ and $d_{acc}^{(j,l)}$ differ less than the optimal alignments of $d_{sel,2}^{(j,l)}$ and $d_{acc,2}^{(j,l)}$. In other words, the relative polarity is correct if flipping one of the two fibers increases the angular distance between the highest peak of the selection component and the closest of the $N_{equiv}$ peaks of the accuracy component. It is to be noted that instead of flipping at $z=z_l$, the fiber may as well have been flipped at $z=z_j$, but not both.

Importantly, the flipping described by Eqs. (12) to (18) to determine the relative polarity is useful only when using a cross-correlation technique for achieving azimuthal alignment, but not in the case of the subtractive approach. In the latter case, each of the two angles on the right hand side of Eq. (18) is already a difference of two angles according to $\vartheta_{best,2}^{(j,l)} = \vartheta_{best}^{(l),flipped} - \vartheta_{best}^{(j)} - (\vartheta_{best}^{(l),flipped} - \vartheta_{best}^{(l)}) = \vartheta_{best}^{(l)} - \vartheta_{best}^{(j)} = \vartheta_{best}^{(j,l)}$, i.e., the flipping (when done correctly as described above) will not have any impact on the results from the subtractive approach for determining azimuthal alignment. This does not mean that the subtractive approach cannot determine the relative polarity. Instead, it only means that flipping is neither required nor useful when applying the subtractive technique to achieve azimuthal alignment.

However, the subtractive approach is very useful in determining the absolute polarity of a fiber, which can be determined by the sign of the angular distance of the highest peak of the selection component (of $S^{(l)}$ instead of $\tilde{d}^{(j,l)}$, because absolute polarity does not need any comparison with another z-location) and the closest (taking the $2\pi$-periodicity into account) of the $M_{equiv}$ peaks of the accuracy component. For instance, if this angular distance is positive, the fiber has "positive" absolute polarity if it is the left fiber, and it has "negative" absolute polarity if it is the right fiber (this is because we chose the same z-axis and azimuthal orientation for both fibers). If this angular distance is negative, the absolute polarity is "negative" if it is the left fiber and it is "positive" if it is the right fiber. If this distance is zero, the fiber has no asymmetries and the absolute polarity is therefore undefined. If the product of the two absolute polarities is negative, then the relative polarity of both fibers is correct.

The inventive additive component methodology is also useful in obtaining the proper alignment between fibers that exhibit significant differences in their critical features, such as different numbers of core regions in the fibers that need to be aligned. FIG. 17 illustrates this scenario, where a first fiber 10A is to be properly aligned with a second fiber 20A. First fiber 10A is shown as comprising a set of three offset cores that are positioned 120° apart, with a marker MA as shown. Second fiber 20A is shown as comprising a set of six offset cores that are positioned 60° apart, and including a marker MB. The view of first fiber 10A is presumed to be a cross section at a longitudinal location $z=z_j$, and the view of second fiber 20A is presumed to be a cross section at a longitudinal location $z=z_l$. In this case, when preparing the cross-correlation data for analysis, the value for $M_{equiv}$ in Eqs. (10) and (11) is defined as the larger number of equivalent orientations at both locations. For the example of FIG. 17, there are $M_{equiv}=6$ equivalent alignments. FIG. 18 illustrates another example of using a pair of fibers with different core layouts. Here, a first fiber 10B is shown as having an arrangement of eight cores positioned in two parallel rows of four cores each (the illustration of first fiber 10B associated with a cross section view at $z=z_j$). Fiber 10B is thus defined as having two equivalent orientations at this location. If the fiber cross section at $z=z_j$ has three cores spaced 90° apart, as shown for fiber 20B in FIG. 18, then there are four equivalent orientations at this location. Hence, when aligning these two rotationally non-invariant fibers 10B and 20B, there are $M_{equiv}=4$ equivalent azimuthal alignments.

While in general the spacing between adjacent measurement points $\vartheta_n$, $t_k$ and $z_l$ in Eq. (2) may vary, in the special case of equidistant azimuthal angles $$\vartheta_n = \vartheta_1 + (n-1)\underbrace{\frac{2\pi}{N}}_{=\Delta\vartheta}, n = 1, \ldots, N, \quad (18)$$

the elements of the matrix F defined in Eq. (3) become $$F_{n,m} = \underbrace{\frac{1}{N} e^{i(m-1)\left(\vartheta_1 + \frac{2\pi(n-1)}{N}\right)}}_{=IFFT_{n,m}} = \underbrace{\frac{1}{N} e^{i2\pi\frac{(n-1)(m-1)}{N}}}_{=IFFT_{n,m}} \underbrace{e^{i(m-1)\vartheta_1}}_{=\Theta_{m,m}}, \quad (19)$$

$n, m = 1, \ldots, N.$

In this case, the matrix F from Eq. (3) is the product of a uniform discrete inverse Fourier transform (IDFT) matrix that can be efficiently applied with the Inverse Fast Fourier Transform (IFFT) algorithm, and a unitary diagonal matrix $\Theta=(\Theta^\dagger)^{-1}=(\Theta^*)^{-1}$. As an example, Eq. (7) becomes $$d^{(j,l)}=IFFT(\Theta \tilde{d}^{(j,l)}). \quad (20)$$

Similarly, the inverse matrix $F^{-1}$ can be efficiently computed with a Fast Fourier Transform (FFT). When applied to a matrix, the FFT and IFFT discussed here are one-dimensional transformations that separately transform the individual columns, in agreement with the IDFT matrix element definition in Eq. (19). As an example, Eq. (4) becomes $$\tilde{S}^{(l)}=F^{-1}S^{(l)}=\Theta^{-1}FFT(S^{(l)}). \quad (21)$$

This option of using the highly efficient FFT and IFFT algorithms applies for all appearances of the matrix F and its inverse $F^{-1}$, provided that the equidistance condition Eq. (18) is valid.

It is noted that that the choice of the first angle $\vartheta_1$ in Eq. (18), and thus the matrix $\Theta$ in Eqs. (20) and (21), is completely irrelevant for the following mathematical reasons: The matrix $\tilde{D}^{(j,l)}$ in Eq. (5) is independent of $\Theta$ due to $\Theta^{-1*}=\Theta$ and $\tilde{D}^{(j,l)}=\tilde{S}^{(j)*}\odot\tilde{S}^{(l)}=(\Theta \ FFT(S^{(j)})^*)\odot(\Theta^{-1}FFT(S^{(l)}))=FFT(S^{(j)})^*\odot(\Theta\Theta^{-1}FFT(S^{(l)}))=FFT(S^{(j)})^*\odot \ FFT(S^{(l)})$, where the fact that diagonal matrices can be moved from one side of the element-wise product "$\odot$" to its other side without changing the result is used. Due to Eq. (6), the vector $d^{(j,l)}$ in Eq. (20) is then also independent of $\Theta$. Finally, since a Fourier transform relates a linear phase with a constant shift, the matrix $\Theta$ in Eq. (20) shifts the cross-correlation $d^{(j,l)}$ by the amount $\vartheta_1$. Hence, a plot of the discrete values $d_n^{(j,l)}$ vs. the discrete angles $\vartheta_n$ always looks exactly the same regardless what value is chosen for the first angle $\vartheta_1$. Without loss of generality, it may be assumed that $\vartheta_1=0$, which leads to a unit matrix $\Theta=I$ that is trivial and can be omitted in all computations.

The computation of Eqs. (20) and (21) can be further simplified and accelerated by taking advantage of the fact that $S^{(j)}$, $S^{(l)}$ and $d^{(j,l)}$ are real-valued. Therefore, the entries $\tilde{S}_n^{(l)}$ of the matrix $\tilde{S}^{(l)}$ in Eq. (22) satisfy the symmetry property (without loss of generality assuming $\Theta=I$) $\tilde{S}_{n,k}^{(l)}=\tilde{S}_{1+mod(1-n,N),k}^{(l)*}$ for n=1, . . . , N and k=1, . . . , K.

Summarizing, when performing alignment and splicing of fibers having rotationally non-invariant transverse geometries, then any features that break the ab initio rotational symmetry, e.g., markers or D-shaped-cladding, are only used as an indicator to identify which of the multiple possible core alignments is the correct one. For the actual exact computation of the best rotational alignment angle, the asymmetric features are ignored. This is achieved by separating the azimuthal dependence of the transverse geometry into two additive components. The first component ("accuracy component") captures those features of the transverse geometry that should be accurately aligned azimuthally, while the second component ("selection component") comprises everything else and is being used to select one of the several options from the multiplicity of accurate azimuthal alignments of the accuracy component. In the case of a multicore fiber, the accuracy component usually comprises the cores, while the selection component comprises azimuthal asymmetries, including markers, D-shaped cladding etc.

Rotational asymmetries such as markers or a D-shaped cladding are necessary to identify the orientation of otherwise rotationally symmetric fibers, see for example, FIGS. 1,2, and 16-18. On the other hand, such asymmetries can have a negative impact on other desirable properties of the fiber such as low loss, low crosstalk between cores, cost-efficient manufacturability, etc. Hence, if the marker is too small or does not provide sufficient contrast (of the refractive index and/or other material properties), it may be hard to identify the fiber orientation from side-view or end-view images, even with the best methods presented here. If the marker is too big or provides too much contrast, it may negatively affect other desirable fiber properties. Hence, there is an optimum marker design that provides the best tradeoff between both effects.

The component-separation-based methods presented here can be used to find this optimum marker design. In one embodiment, the marker size and/or refractive index contrast are minimized, and/or the marker distance from the cores maximized, under the constraint that the selection component needs to have at least a certain specificity, which may be quantified by a suitable functional (scalar number). For example, a certain predefined threshold value needs to be smaller than a functional defined as the ratio of the highest and second-highest peak of the selection component (see the solid line in FIG. 15), or defined as the normalized ratio of the highest peak and the root-mean-squared of the entire selection component $d_{sel}^{(j,l)}$, or defined as said normalized ratio (inf-norm divided by 2-norm) of the selection component divided by the similar ratio (again inf-norm divided by 2-norm) of the accuracy component, or any defined as any real-valued power of said quantities, etc.

In another embodiment, instead of using a fixed required threshold for a functional of the selection component, simulations of said other desirable fiber properties may be simulated or measured, and a suitable weighted combination (which can be linear or nonlinear) may be built from all these quantified properties (including a functional of the selection component), and this function is either experimentally or numerically maximized over all possible allowed variations of the marker properties and/or other fiber properties.

The component-separation-based methods presented here can also be used to find the optimum fiber design to maximize the marker visibility. In one embodiment, the core locations and/or cladding diameter and/or cladding non-circularity and/or coating diameter are optimized such that, for a given marker size and/or location and/or refractive index contrast, a functional of the selection component is maximized to achieve the highest possible specificity of the marker (and all other asymmetries). For example, we may maximize a functional defined as the ratio of the highest and second-highest peak of the selection component (see the solid line in FIG. 15), or defined as the normalized ratio of the highest peak and the root-mean-squared of the entire selection component $d_{sel}^{(j,l)}$, or defined as said normalized ratio (inf-norm divided by 2-norm) of the selection component divided by the similar ratio (again inf-norm divided by 2-norm) of the accuracy component, or defined as any real-valued power of said quantities, etc.

In another embodiment, instead of keeping some marker properties fixed and optimizing the fiber, we allow all marker properties and fiber properties to vary, and instead have a constraint that is a function of all these properties combined, e.g., total manufacturing cost, or total development time. A functional of the selection component is maximized to achieve highest possible specificity of the marker (and all other asymmetries). For example, we may maximize a functional defined as the ratio of the highest and second-highest peak of the selection component (see the solid line in FIG. 15), or defined as the normalized ratio of the highest peak and the root-mean-squared of the entire selection component $d_{sel}^{(j,l)}$, or defined as said normalized ratio (inf-norm divided by 2-norm) of the selection component divided by the similar ratio (again inf-norm divided by 2-norm) of the accuracy component, or defined as any real-valued power of said quantities, etc.

In performing further evaluations of the actual mechanical elements used to perform the transverse (x,y) and azimuthal (ϑ) alignments at the initial set-up location (such as points 30, 32 as shown in FIG. 5), it has been found that further improvements may be provided by taking into consideration the mechanical variables that may be present. In particular, the following discussion is directed to mechanical variables associated with the motors that are used to perform the actual rotation of the fibers.

Motors always have backlashes, as they have components with finite elastic moduli that can slightly deform during operation, no matter how precisely they are built. There is no exception in the motors used to perform the aligning and fusion splicing operations of optical fibers, unless the motors are configured to exhibit uni-directional rotation, e.g., endlessly rotating clockwise (or counterclockwise). Thus, other than this limited case of uni-directional rotation, the motors typically take the form of reversible motors and will exhibit backlash that needs to be accounted for in order to ensure the accuracy of the collected image data. In particular, backlash may result in inaccurate alignment results, even if the above-described additive component azimuthal alignment process is used. It is recalled that the process used to collect image data involves the rotation of both fibers through a defined angular sector. If there is any motor backlash at the starting point of the data collection, the gathered data is skewed by the backlash interval and imparts an unwanted offset to the collected data.

Figure 19:
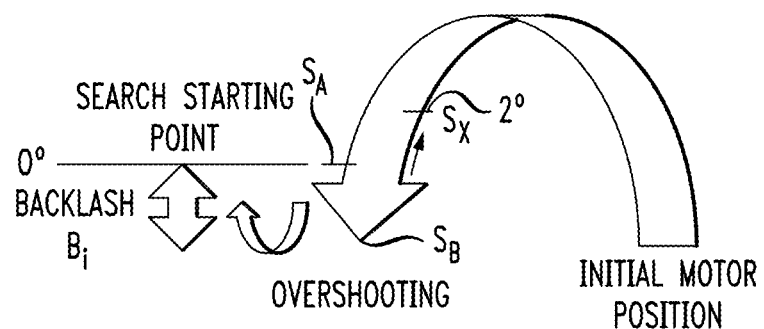
FIG. 19 is a simplified diagram illustrating an arrangement that compensates for rotational motor backlash that may be present when a motor is initially energized to rotate a given fiber through a series of angles during the collection of image data.

In accordance with the principles of the present invention, this initial motor backlash problem may be overcome in at least two different ways. First, as shown in FIG. 19, overshooting the motor's pre-defined position for data collection can be implemented. Inasmuch as a precise value for a given motor's backlash may not be known, overshooting by an amount greater than an anticipated value is sufficient. An overshoot in the starting point is shown as $S_B$ in FIG. 19. If the data collection is clockwise, the motor energized to rotate counterclockwise to reach this point, then reversing the rotation direction of the motor to being the clockwise rotation of the fiber. If the data collection is counterclockwise, the motor is energized to rotate clockwise to reach this point, then reversing the rotation direction of the motor to being the counterclockwise rotation of the fiber. Thus, any problems associated with backlash will have been overcome by the time the fiber rotation has reached the defined starting point $S_A$ for data gathering. Using this approach, the motor's rotation may start without any backlash impact and data contamination is avoided.

Alternatively, instead of pre-setting the motor (and thus, the attached fiber) to begin rotation before reaching starting point $S_A$, the process may be configured to ignore an initial set of data that is gathered (say, along an arc from azimuthal position $S_A$ to an azimuthal position $S_X$). Thus, by ignoring the initially gathered data that may be impacted by motor backlash, data contamination is avoided. For example and with respect to FIG. 19, if the motor backlash is known to be no greater than about 2°, then instead of using $S_A$ as the starting point for data gathering (defined as 0°), the relevant data to be used in the above-described alignment calculations should begin to be collected at a location that is +2° from $S_A$, here shown to be $S_X$.

Of course, these techniques for overcoming initial data collection backlash should be applied to data collection for both fibers. If different motors are used to rotate each fiber, is it also possible that there may be different backlash intervals associated with each motor being used. As long as the image data associated with a backlash interval is ignored, the collected data is accurate and may be used to determine the optimum positioning of both fibers for alignment.

Figure 20:
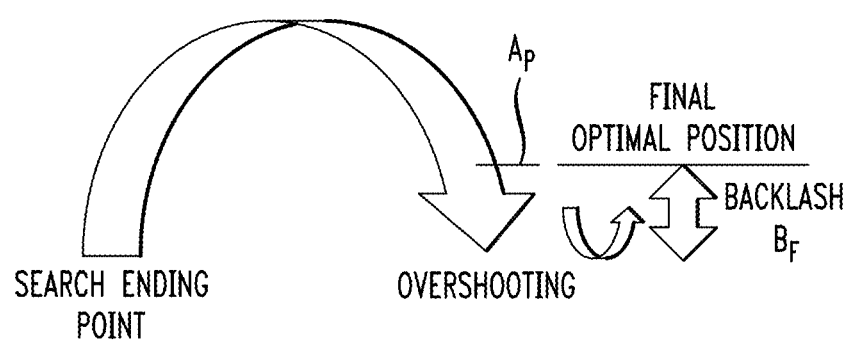
FIG. 20 is a simplified diagram illustrating an arrangement that compensates for rotational motor backlash in a following step of moving (rotating) one fiber end to achieve azimuthal alignment.

It stands to reason that the fiber rotation activity used at the end of the alignment process to move a selected fiber through a determined optimum angle to achieve azimuthal alignment may suffer from backlash as well (again, unless using a motor that allows endless uni-directional rotation). FIG. 20 illustrates this scenario, and illustrates a motor backlash interval $B_F$ that is associated with this point in the process. In order to accommodate backlash during the final azimuthal alignment, the fiber under rotation is intentionally rotated through an angle larger than the value determined proper for alignment. Again, presuming that a selected interval $B_F$ is greater than any typical amount of backlash that is contemplated, the fiber is rotated through at least this additional amount. The motor's operation is then reversed and the fiber is rotated back into the optimal angular position (denoted as $A_P$ in FIG. 20). By overshooting the motor's rotational final suggested point by more than the motor backlash value (before reversing the rotational direction), and then rotating the fiber back to the final point, the motor is able to settle into the optimal position without any backlash impact.

Therefore, as long as the motor needs to reverse movement to reach the optimal position, either for initiating data collection or moving a given fiber into a final azimuthally-aligned position, it is important to recognize the presence of motor backlash and adjust the individual steps of the process accordingly. However, if the motor can rotate endlessly, the optimal position may be reached without changing direction. In this case, the overshoot operation is not necessary.

Figure 21:
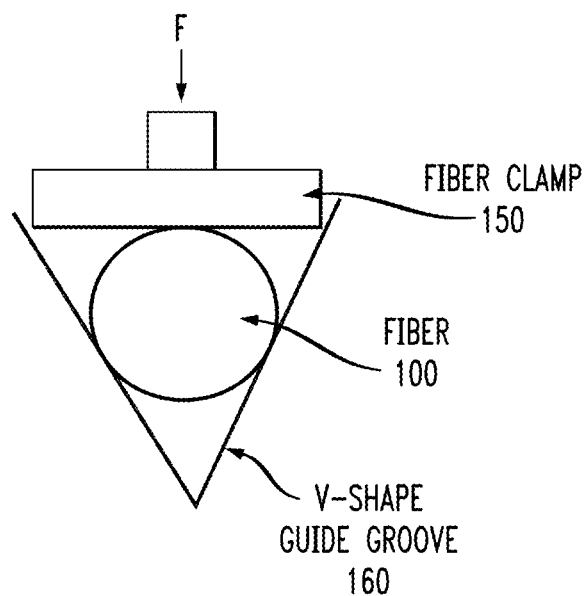
FIG. 21 is a cross-sectional view of a fiber as positioned within an alignment apparatus that utilizes a V-groove structure in combination with a clamp to hold the fiber in place.

Another mechanical factor present in the apparatus used for aligning and splicing fibers is friction; namely, the frictional force that is created from the fiber clamp and V-groove arrangement guide that is typically used to support a fiber in a known position within the apparatus. FIG. 21 shows, in a simplified form, a cross-sectional view of optical fiber 100 as held in place within a V-groove structure 160. A fiber clamp 150 is positioned over V-groove 160 and is lowered to contact fiber 100 and hold it in place. The force F that is applied to fiber 100 by clamp 150 is typically equivalent to a few hundred grams. In situations and/or systems where rotation of the fibers is not required, e.g., in the case of rotationally invariant fiber, it is desired for the fibers to remain as stationary as possible and the application of force from clamp 150 is configured for this purpose. However, in order to achieve azimuthal alignment of rotationally non-invariant fibers in accordance with the principles of the present invention, it is required for the fibers to be rotated; both to collect image data and then to move one fiber through the angle required for azimuthal alignment. The conventional clamp force has been found to introduce a frictional force that impedes the ability to properly rotate the fibers.

Friction exists as long as there is pressure on the fiber, and according to the relation $F_f \leq c_f F_n$ where $F_f$ is the force of friction, $c_f$ is the coefficient of friction, and $F_n$ is the normal force (dependent on, but not necessarily identical to, the force F applied by clamp 150). Thus, it is proposed that in order to minimize the frictional forces that impact fiber rotation, the forces applied to the fiber clamp 150 be reduced to essentially zero for any of the process steps involving fiber rotation. During the initial x, y alignment procedures (such as described above), clamp 150 maintains an applied pressure to ensure the stability of fiber 100 within V-groove 160 during the directional alignments. Once the following azimuthal alignment process is initiated, clamp 150 is lifted enough to lose contact with fiber 100, thus substantially eliminating the application of any clamp force to fiber 100. The raising of clamp 150 in this manner thus allows fiber 100 to be rotated through all of the angular positions for image data collection (which may involve a complete rotational scan range of 360° or more). It is presumed that once the final azimuthal alignment is achieved, clamp 150 may again be lowered to a position that will apply a force sufficient to hold fiber 100 in position within V-groove 160 until after the fusion splicing process has been completed.

Figure 22:
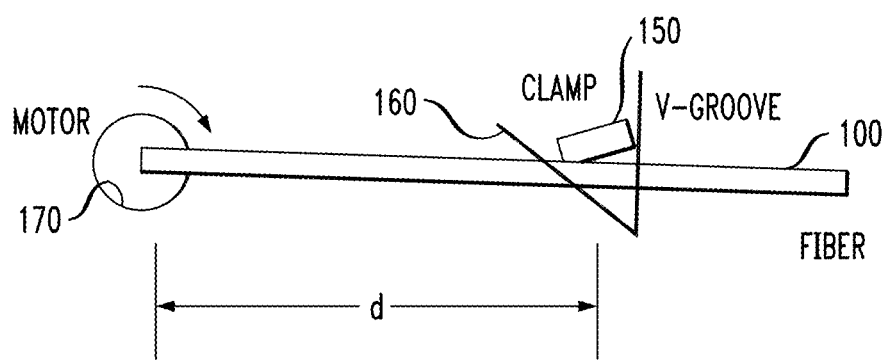
FIG. 22 illustrates a particular arrangement of the elements as shown in FIG. 21 in combination with a motor used for fiber rotation, illustrating the presence of the motor's torque arm as related to overcoming the friction between the fiber, V-groove, and clamp.

FIG. 22 illustrates a particular arrangement of V-groove 160 and fiber clamp 150 with a motor 170 that is being used to impart the rotational movement to fiber 100. Instead of (or in addition to) reducing the force on clamp 150, motor 170 may be positioned as close as possible to V-groove 160 and thereby utilize the motor's torque to overcome the frictional force. In conventional systems, rotation motor 170 is positioned a distance d of at least 15 mm away from the supported fiber and, as a result, when rotating fiber 100 there is a slight "twist" that occurs before the frictional force is overcome. It is thus proposed that by intentionally locating motor 170 at a position as close to V-groove 160 as possible, a sufficient torque may be created that the frictional force is irrelevant. Depending on the particular physical design of the aligner system, it may be possible to locate motor 170 to a position that is less than about 10 mm from V-groove 160, which has been found sufficient to essentially eliminate this twisting problem (for fibers with cladding diameter of approximately 125 μm).

Figure 23:
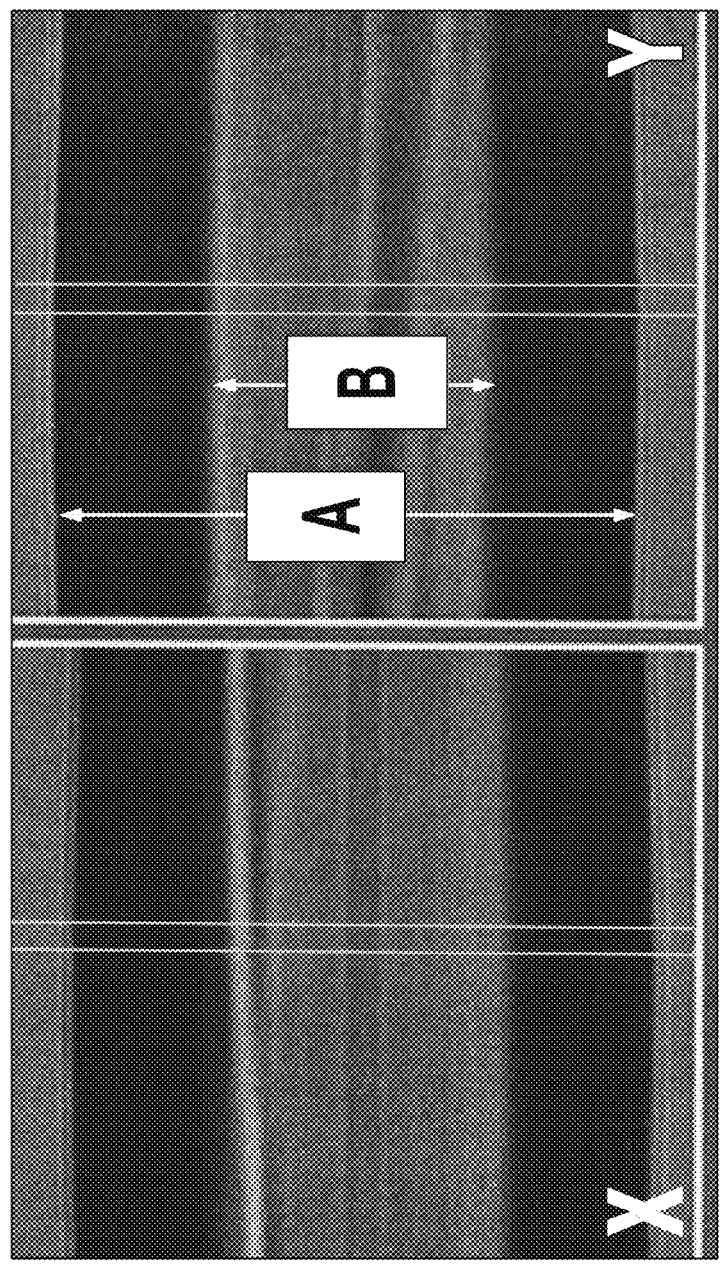
FIG. 23 is a diagram that defines the parameter of "focus percentage" as may be used to improve the clarity of the image data captured for intensity projections of the fibers being aligned.

Yet another component of the apparatus that may be adjusted in accordance with the principles of the present invention is the focus depth of the camera system utilized to collect the digital images necessary to achieve alignment. In particular, it has been found that a different depth of focus is preferred for collecting the image data associated with azimuthal alignment than when performing the transverse x, y fiber alignments. Referring to the diagram of FIG. 23, the parameter "focus percentage" (referred to below as "focus %") is defined as B/A·100%. In most systems, the user is able to control the focus % by using the zoom-in/out lens. The x,y alignment is associated with obtaining the "best match" between the values of "A" for both fibers and, therefore, using a sharp focus (i.e., a relatively small focus % value, indicative of B<<A) delivers a preferred view and allows for a precise x,y alignment to be obtained. On the other hand, azimuthal alignment is based on illumination of various interior features, as discussed above, and therefore benefits from a relatively high focus percentage (i.e., B somewhat less than A). The higher focus % (also referred to as a "loose focus") provides a better view of the interior of the fiber and provides higher resolution images of the individual core regions within the fiber.

Therefore, to make both the transverse and azimuthal alignments as precise as possible, a focus adjustment process is proposed. Since the transverse alignment is performed first, the camera is configured in a low focus % mode and sharp edges on the images allow for a precise transverse alignment (in the x,y directions) to be performed. Once the transverse alignment is achieved, the depth of focus for the camera is changed to a high focus % mode for performing azimuthal alignment, specifically delineating the various internal fiber features with the detail required for image capture as the fibers are rotated. Once azimuthal alignment is achieved, the camera focus may be returned to the default low focus % mode.

Figure 24:
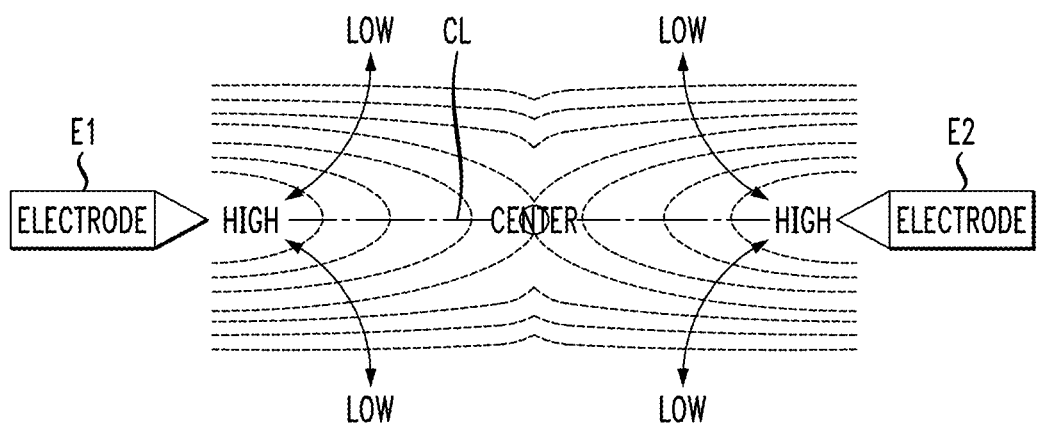
FIG. 24 is a simplified depiction of a conventional prior art two-electrode arc discharge system that is used to perform fusion splicing.

Turning to the process of joining together two fibers, most systems are based upon fusing the endfaces of the fibers together in an arc fusion apparatus, which typically comprises a pair of electrodes, such as electrodes E1, E2 shown in the depiction of a prior art system in FIG. 24. FIG. 24 also shows the arc discharge created by electrodes E1, E2 and an arc center line CL in alignment with the electrode pair. A diagram of an exemplary thermal gradient associated with this two-electrode system is also shown in FIG. 24.

Figure 25:
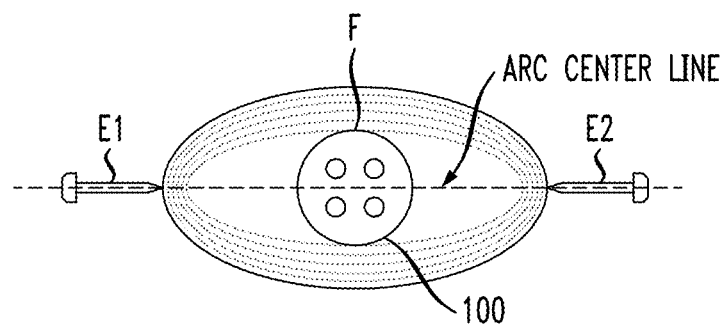
FIG. 25 illustrates a cross section of a fusion region associated with the system of FIG. 24, showing a cross section of a multicore fiber within the discharge region.

A cross section of a "fusion" region created by this two-electrode system is shown in prior art FIG. 25. A cross section of a typical multicore fiber F is also shown in this view, illustrating the separation between the individual cores and arc center line CL. A drawback of this prior art type of two-electrode system is that its heat distribution is very narrow, with the temperature within the discharge changing sharply within a distance of only a few microns from the arc center line CL. Referring to both FIGS. 24 and 25, the temperature gradient associated with this approach thus presents a problem when performing fusion splicing on rotationally non-invariant fibers (such as the illustrated multicore fiber F), since the various critical features to be joined (such as off-set, aligned core regions) are likely to be positioned in different regions within the temperature gradient (see FIG. 24). The thermal gradient associated with the prior art two-electrode system is therefore likely to introduce uneven and poor splice loss.

One option to overcome this problem, in accordance with the teaching of the present invention, is to re-orient the aligned pair of fibers with respect to the arc center line CL such that the temperature gradient across all critical features is minimized (thus optimizing the fusion conditions and avoiding splice loss). FIG. 26 is useful in understanding this aspect of the present invention. FIG. 26(a) shows an initial "pre-fusion" optimal positioning of aligned fibers 10, 20, in this case comprising a pair of four-core multicore fibers that have been azimuthally aligned using the additive component methodology described above. Here, for example, fiber 20 may have been rotated through an angle $\vartheta_{best}^{(A,B)}$ so that an identified first core region 1A of fiber 10 at its end (tip) location $z^{(A)}$ is precisely aligned to a first core region 1B of fiber 20 at its end (tip) location $z^{(B)}$ (maintaining channel assignment integrity by using a marker M), with the remaining cores also matching accordingly. This particular alignment process has resulted in the paired core regions 1A, 1B being positioned at an angle $\theta_a$ with respect to the center line. Without any other adjustments, the positioning as shown in FIG. 26(a) would be that presented to the two-electrode fusion splicer apparatus. The relative position of each of these cores with respect to the arc center line CL is shown and it is clear that the temperature gradient associated with the two-electrode apparatus would result in fiber core regions 1 and 3 experiencing a higher fusion temperature than core regions 2 and 4.

To address this temperature non-uniformity problem, it is proposed to further rotate both fibers through an additional amount (prior to initiating the fusion splicing process) that yields the lowest temperature gradient across the critical features that are being fused together. FIG. 26(b) illustrates this inventive step for fibers 10, 20 as discussed above. In the case of a four-core fiber, it is understood that a configuration where all cores are positioned at substantially the same distance d from the arc center line CL will experience the least temperature differential between the cores. Thus, once the positioning as shown in FIG. 26(a) is obtained, fiber 10 is rotated so that core region 1A is positioned at an angle of 45° with respect to the arc center line CL, so as to compensate for the non-uniform heat distribution associated with a two-electrode electrode system. In the particular example as shown in FIG. 26(b), where angle $\theta_a$ of a selected core (1A) was the initial optimal position (as determined using the additive component alignment process, for example), fiber 10 is rotated until core region 1A is positioned at an angle $\theta_{fusion}=45°$ (e.g., rotated clockwise by $(\theta_{fusion}-\theta_a)=45°-\theta_a$). In order to maintain proper alignment and channel assignment, fiber 20 is accordingly rotated counterclockwise by the optimum position angle, $(\theta_{fusion}-\theta_a)=45°-\theta_a$.

FIGS. 26(c) and (d) illustrate this same methodology of improving temperature uniformity across a plurality of paired core regions that are to be spliced together. FIG. 26(c) illustrates a typical pair of seven-core fibers 10-7, 20-7 as oriented in their "final" aligned position achieved by using the additive component methodology of the present invention. Here, first core regions $1A_7$ and $1B_7$ are shown as positioned at an angle of $\theta_b$ with respect to center line CL.

For this arrangement of six equispaced core regions surrounding a central core region, it is proposed that the optimum minimization of temperature differences experienced during fusion is obtained when a paired set of core regions (e.g., $1A_7$ and $1B_7$) are rotated through an amount such that their final, optimal position is at $\theta_{fusion}=30°$ with respect to the arc center line CL. This result is shown in FIG. 26(d).

The two examples shown in FIG. 26 are merely illustrative of the application of position adjust of aligned pairs of fibers such that the temperature gradient across the critical regions of the fibers is minimized during the arc discharge fusion process. Differences in fiber core topology may result in different positions associated with minimal temperature differences. Additionally, the examples discussed above are associated with the use of a prior art two-electrode discharge system. The same principles with respect to achieving an optimal "final" position prior to initiating the fusion process may be used with a three-electrode system (as discussed below), as well as systems incorporating other techniques in combination with the two-electrode system (such as adding electrode vibration). As long as the fusion apparatus is known to create a temperature gradient across its arc discharge, the gradient may be compensated for by intentionally positioning the fibers to minimize its effects, as described above.

One way to determine the angle by which both fibers need to be rotated to achieve the final optimal position that minimizes the temperature gradient is using the accuracy and selection components from Eq. (9) in the case of the subtractive approach, because the subtractive approach provides information about the absolute angular position of a fiber end. For example, if the desired final angular position (e.g., to minimize temperature gradients across all cores) of one of the cores is at $\vartheta_{fusion}$, and the accuracy component $d_{acc}^{(left)}$ of, say, the left fiber end in Eq. (9) has one of its $M_{equiv}$ equivalent peaks at the angle $\vartheta_{peak,acc}^{(left)}$, then this fiber end needs to be rotated by $\vartheta_{fusion}-\vartheta_{peak,acc}^{(left)}+m2\pi/M_{equiv}$. If there is no preference regarding which of the cores this should be, then m can be any integer number (of course including negative integer numbers), e.g., m=0 for simplicity. Otherwise, if there is a preference regarding which exact one of the cores should be at the position $\vartheta_{fusion}$, e.g., to minimize the variance of the splice loss for each core across all splices), then the preferable integer number $m \in \mathbb{Z}$ can be determined by the selection component: If the core that is closest to the marker is supposed to have the final position $\vartheta_{fusion}+m_{fusion}2\pi/M_{equiv}$, were $m_{fusion}$ is a given integer number, and if the selection component $d_{sel}^{(left)}$ in Eq. (9) of, say, the left fiber end, has its peaks at the angle $\vartheta_{peak,sel}^{(left)}$, then this fiber end needs to be rotated by $\vartheta_{best}^{(left)}=\vartheta_{fusion}-\vartheta_{peak,acc}^{(left)}+(M_{fusion}-m_{peak,acc}^{(left)})2\pi/M_{equiv}$, where $$m_{peak,acc}^{(left)} = \text{round}\left(\frac{(\vartheta_{peak,sel}^{(left)} - \vartheta_{peak,acc}^{(left)})M_{equiv}}{2\pi}\right)$$

is the number of the peak (of the accuracy component) that is closest to the peak of the selection component, and "round" describes the rounding operation to the closest integer. Similarly, the right fiber end needs to be rotated $\vartheta_{best}^{(right)}=\vartheta_{fusion}-\vartheta_{peak,acc}^{(right)}+(m_{fusion}-m_{peak,acc}^{(right)})2\pi/M_{equiv}$, where $$m_{peak,acc}^{(right)} = \text{round}\left(\frac{(\vartheta_{peak,sel}^{(right)} - \vartheta_{peak,acc}^{(right)})M_{equiv}}{2\pi}\right).$$

Alternatively, the left fiber can be used as the fiber to be rotated by $\vartheta_{best}^{(A,B)}$ (or only the right fiber by $-\vartheta_{best}^{(A,B)}$) to optimize their relative alignment, and then rotate both fibers together by $\vartheta_{best}^{(left)}-\vartheta_{best}^{(A,B)}$ (or $\vartheta_{best}^{(right)}+\vartheta_{best}^{(A,B)}$).

Figure 27:
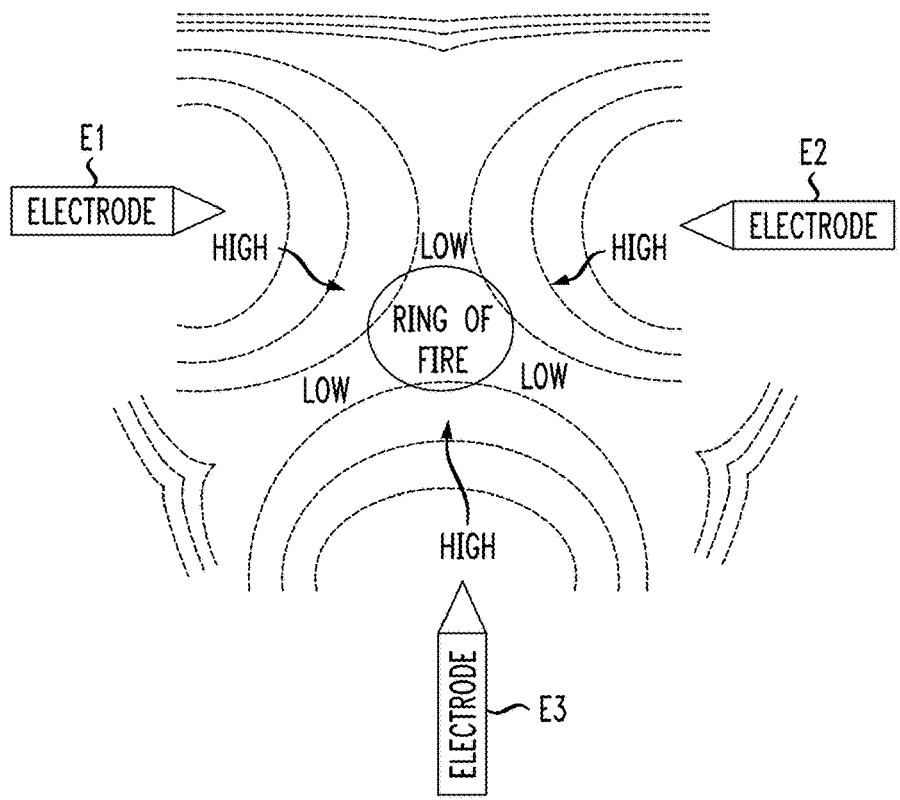
FIG. 27 is a simplified depiction of a three-electrode arc discharge system used in accordance with the present invention to achieve improved temperature uniformity within the discharge region.
Figure 28:
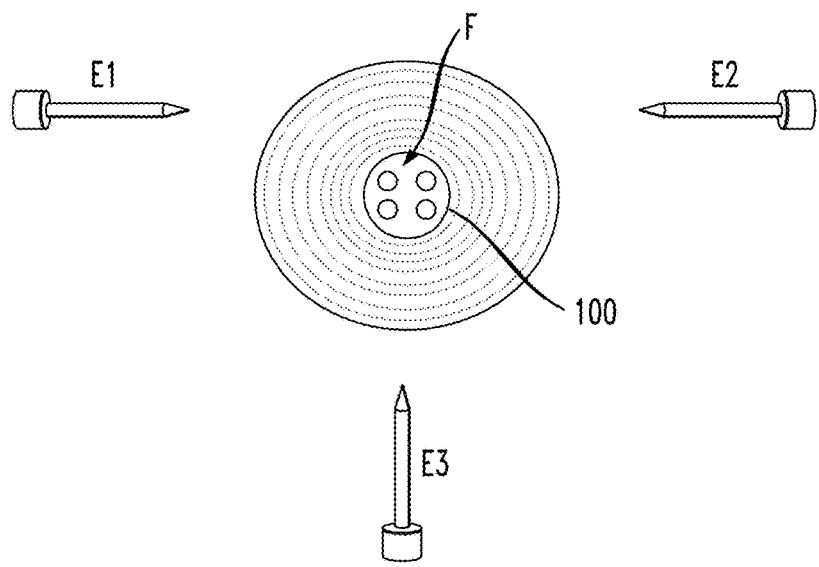
FIG. 28 is a cross section of a fusion region for the system of FIG. 26, showing the improvement in temperature uniformity in comparison to FIG. 25.

Temperature nonuniformity in the arc discharge may also be addressed by modifying the apparatus itself, such as by utilizing a three-electrode arc discharge system as shown in FIG. 27. In comparison to the two-electrode configuration of FIG. 24, the particular embodiment as shown in FIG. 27 includes a third electrode E3 that is positioned in relation to electrodes E1 and E2 so that the combination of their thermal gradients creates a "ring of fire" shape of the isotherms (i.e., lines of constant temperature). When using a three-electrode system to join multi-core fibers, such as exemplified by the view of the multicore fiber 100 shown in FIG. 28, each core will reside within this "ring of fire" environment during the fusion process, with little temperature variation between different cores. Moreover, if the core re-positioning as described above in association with FIG. 26 is applied to the three-electrode arrangement as shown in FIGS. 27 and 28, the temperature variation may be reduced even further. As a result, the splicing losses are very consistent across the cores and low losses are achievable. Moreover, inasmuch as a three-electrode configuration provides a more uniform temperature profile across the multiple cores, it is not necessary to adjust the final optimal position against a certain reference "zero" line (CL in FIG. 24) in most applications.

Other possible arc discharge systems include a four-electrode system and a variation of the two-electrode system that introduces electrode vibration to create a wider region of uniform temperature distribution. In each of these systems, the temperature uniformity is improved over the conventional two-electrode system and will thus achieve a better fusion joining of critical features.

Another factor to consider in achieving optimum fusion splicing of optical fibers is the process used to actually move the fiber endfaces toward each other while within the discharge area of the electrodes. It has been found that the act of pushing the fibers toward each other during the fusion process may deteriorate the core-to-core alignments and lead to higher levels of loss, since some cores may have better butting conditions than others due to the cleaving quality (discussed below), arc conditions (as discussed above), and the like. Therefore, in order minimize the impact of pushing on the final splicing loss, it has been determined that adding a final "pulling" action during the arc discharge process (after the pushing action) may be useful. It is thought a slight pulling of the joined fibers may reduce/relax the tension and strain on each core and achieve better, consistent splicing loss and may improve the splice strength as well.

Figure 29:
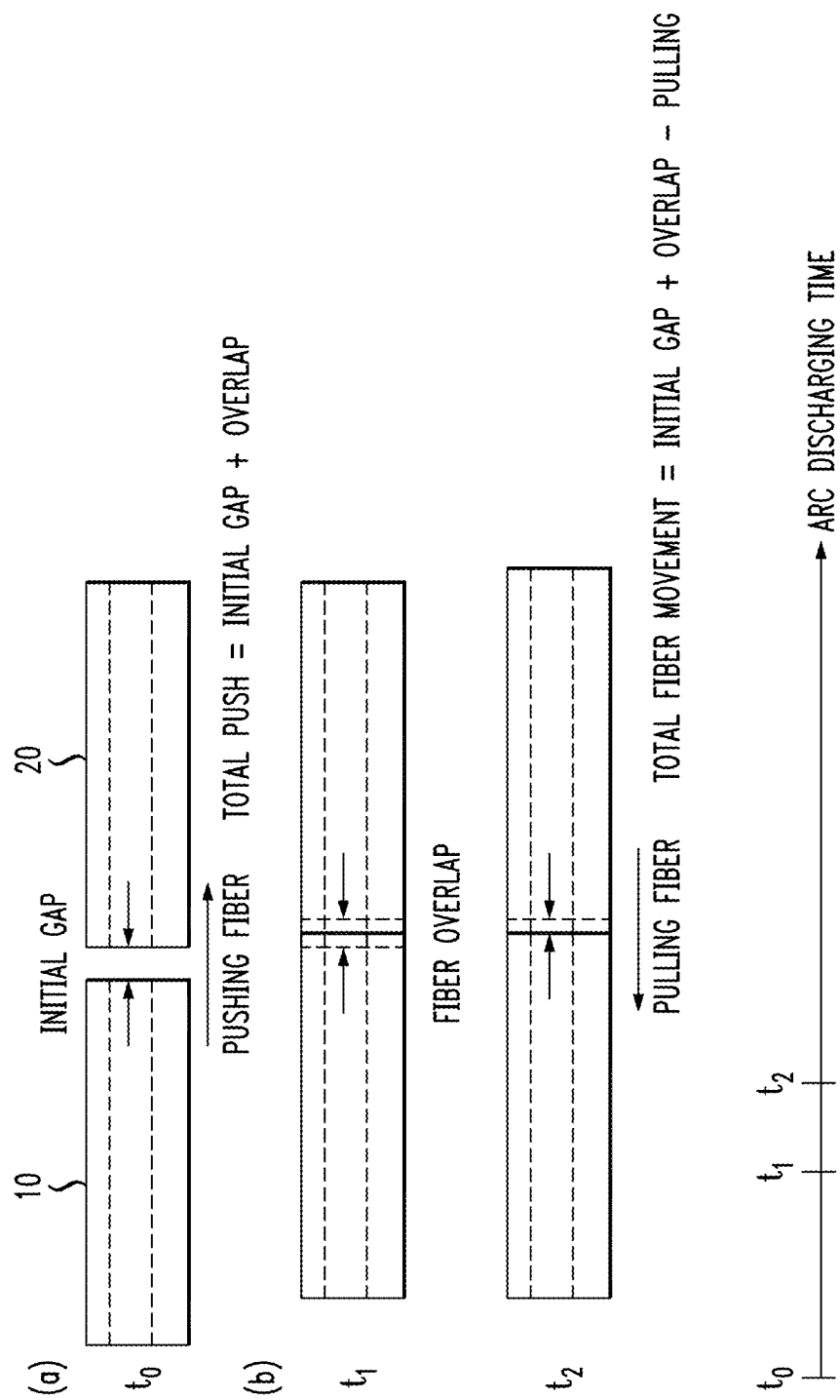
FIG. 29 includes a set of diagrams illustrating a novel "push-pull" fusion process that may be performed in accordance with the principles of the present invention to reduce tension/strain in the fusion region.

FIG. 29 includes a set of diagrams showing pushing/pulling fiber movements during an exemplary arc discharge fusion process. The fusion process is shown along a timeline, which includes three defined points in time $t_0$, $t_1$, and $t_2$. At time $t_0$, fibers 10 and 20 are moving toward each other, as shown in diagram (a) of FIG. 29. Here, fiber 10 is being pushed in the direction of fiber 20, where the timing interval associated with this step includes that required to pass through both the initial gap interval g and a desired "overlap" that is typically used to ensure an actual physical joining of the fiber endfaces. The completion of this overlap step is shown in diagram (b) as occurring at a time $t_1$. In accordance with this push/pull technique of the present invention, once overlap is achieved, fiber 10 is then slightly pulled in the opposite direction, as shown in diagram (c), to back off of the overlap to a degree and allow the fibers to settle in the fused arrangement at completion time $t_2$. It is to be understood that this push/pull technique is performed while the arc is still discharging.

Figure 30:
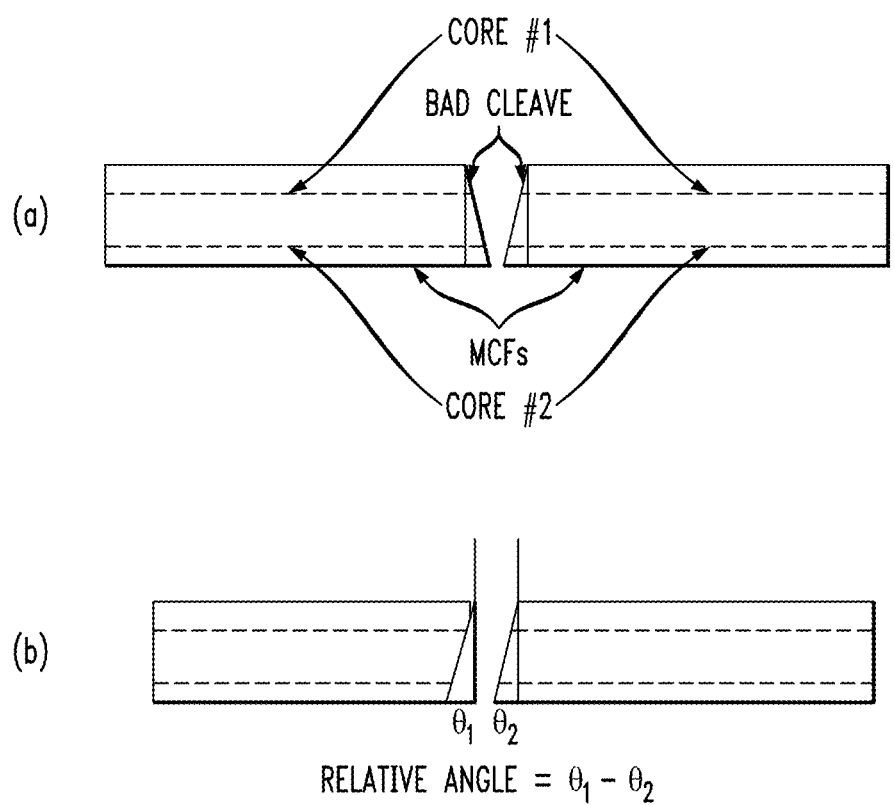
FIG. 30 contains diagrams illustrating the impact of cleave angle on the formation of an optimum fusion region, FIG. 30(a) showing exaggerated cleaving angles that are beyond a preferred amount

Lastly, it is also important to understand the effects of the initial fiber preparation on the quality of a fusion splice between a pair of optical fibers. For example, it has been found that the cleaving angle used to prepare the fiber endface has a significant impact on the properties of the fusion splice. Indeed, a preferred cleaving angle for rotationally non-invariant fibers should be no greater than 0.5° for an individual fiber, or a relative angle no greater than 1.0° for the fiber pair. FIG. 30(a) is a simplified view showing the presentation of a pair of fibers with exaggerated cleaving angles beyond this preferred limit. With a bad cleaving angle, the butting time and arc condition for each core during the arc discharging process is different, and as a result, the splicing loss varies and is not consistent. Thus, before continuing with the alignment and splicing procedures, the fibers should be cleaved again so as to exhibit a relative angle of less than 1.0°, as shown in FIG. 30(b).

The techniques of the present invention are useful in a variety of different applications, including the situation where a relatively long transmission span is created by splicing together several lengths of rotationally non-invariant optical fiber in a concatenated configuration. The signals traveling along different cores of a multicore fiber (MCF) typically experience different amounts of attenuation, dispersion, delay, signal crosstalk, and the like, as a result of unavoidable differences in the properties of the different cores (e.g., core area, refractive index profile, dopant concentrations, Rayleigh scattering, etc.). As a result, the transmitted signals may arrive at a receiver with different power levels, delays, and the like.

For example, a long-haul communication system may be formed by splicing together several lengths of MCF between an input terminal location and an output terminal location, each core supporting the propagation of a different optical signal. The spatial displacement of the core regions within the optical fiber is then used at times to describe the set of channels as "spatial channels". In the case where several lengths of MCF are spliced together to form a transmission span, there inevitably arise variations in channel attenuation between the individual cores, the significance in variations likely to increase with the number of sections used to create a span. Other types of variations between the channels may also be present in a long-haul transmission span including, but not limited to, polarization mode dispersion, chromatic dispersion, optical nonlinearity, signal crosstalk, latency, etc.

The differences between the signal paths (channels) arise from the properties of the multicore fiber itself (primarily with respect to the core regions, but not completely), as well as from core-to-core losses between adjacent sections of multicore fiber at each splice location, even when using the additive component alignment technique described above to achieve an optimum core-to-core alignment. The splice loss is of particular concern in transmission systems that utilize multicore fiber with core regions of a relatively small mode field diameter (MFD), since the splice loss of these cores is usually more sensitive to misalignments (transverse and/or azimuthal) than the splice loss of a core with a larger MFD. More generally, differences among a set of cores within a given section of MCF may also result in the channels exhibiting different properties that ultimately result in the received signals having unintended variations (power level, delays, etc.). These differences between the cores in a section of MCF may take the form of slight differences in MFD (as a result of variations in fabrication processes, for example), inaccuracy of each core's general position (with respect to each other as well as with respect to the longitudinal axis of the transmission span), etc.

A technique is proposed to address problems associated with channel differences in long-haul systems using multiple, spliced together sections of MCF by intentionally changing core assignments for each spatial channel at one or more splice locations between the input and the output terminals of the system. The intentional changing of core assignments is referred to below as an offset clocking technique of compensating for differences in properties of the individual core regions in a way that reduces variations between the spatial channels supported in the transmission system.

The offset clocking technique can be used, e.g., to improve the attenuation (or polarization mode dispersion, chromatic dispersion, optical nonlinearity, signal crosstalk, latency, etc., or a combination of these properties) in a "worst" spatial channel (i.e., the spatial channel in which this property is found, or in which these properties are worse than in the other spatial channels). This usage scenario corresponds to a so-called miniMax (minimization of the maximum) or maxiMin (maximization of the minimum) optimization, depending on whether the considered physical property (attenuation, etc.) or properties is/are desired to be as small or as large as possible.

In this embodiment, for example, the properties of the individual cores within a new section of MCF to be added to the span may be evaluated in terms of performance results with respect to the conditions of signals exiting an in-place section of MCF. For example, if a signal within a defined spatial channel C (for example) is considerably more attenuated that the others propagating along the remaining spatial channels in that MCF, the new section of MCF may be intentionally oriented so that its core known to exhibit the "best" signal characteristics is positioned to receive the signal exiting spatial channel C.

Figure 31:
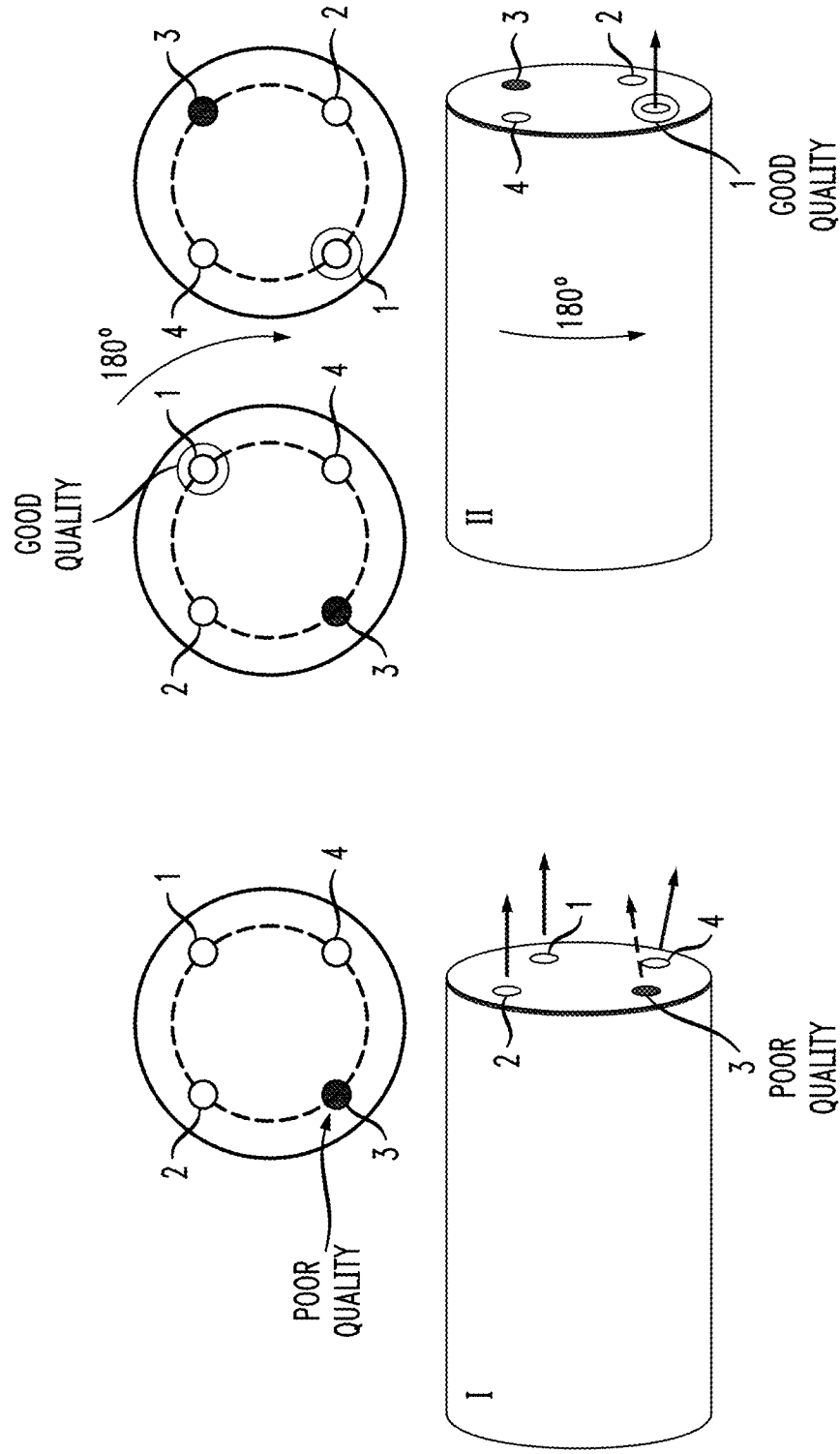
FIG. 31 illustrates an example use of differences in core properties to intentionally change core assignments at a splice location by rotating the presented endfaces through a combination of the determined azimuthal alignment angle and a "clocking angle" associated with a defined change in core assignment.

FIG. 31 illustrates this example, where core region 3 of the first section of MCF has been identified as providing the worst signal properties (e.g., poorest quality core region). The known characteristics of a second section of MCF (perhaps stored in a type of "clocking map") identify core 1 of this second section as being of good quality (e.g., lowest attenuation). Thus, the process of performing azimuthal alignment of the second section to the first section will intentionally change the core assignment for the spatial channel at this location from core 3 (in the first section of MCF) to core 1 in the second section of MCF. A clocking angle of 180° is designated for achieving this intentional change in core assignment. A similar evaluation of the signals exiting a given section of MCF and the core properties of a joining section of MCF can be determined at each splice location, with a core assignment selected that prevents signal degradation associated with static core assignments from accumulating along the span. This technique of intentional core assignment as illustrated in FIG. 31 and discussed above may be defined as an "active" (or dynamic) type of intentional core assignment, where the properties of the core regions at a given splice location are analyzed and the clocking offset of a newly-added section of MCF controlled to assign cores to specific channels to compensate for the condition of the signals exiting the previous section of MCF. As an alternative to using such an active core assignment based on properties from only a single section of MCF that precedes the splice location, it can also be based on the accumulated properties from all sections that precede the splice locations. For example, the active core assignment may be based on the degree of attenuation present in each of the optical signals at the splice location.

Another alternative is using the offset clocking technique to reduce the variation of one or several of these properties across only some or all of the channels. In particular, the use of intentional offset clocking from one length of multicore fiber to the next may allow for a given channel (spatial signal path) to rotate through different core assignments ("clock") as it propagates between the input and output terminals of a transmission span. In this type of passive offset clocking where the core assignments are intentionally changed without any regard to performance properties of the individual cores with respect to each other, the accumulated differences associated with core-to-core differences in optical properties, as well as core-to-core alignment, may be substantially reduced by a change in core assignment at splice locations along the transmission path. Preferably, the rotations are continued in the same direction from one length of multicore fiber to the next. That is, if the newly-added section of multicore fiber is rotated clockwise to perform the offset clocking, then all following sections are preferably rotated in the same direction (the same is true if the first rotation is counterclockwise). The change in core assignments may be performed at each splice location along the path, or at only one location, or anything in between. One example use of this offset clocking is in the case of spool-to-spool splicing of optical fiber cable for long-haul transmission applications, such as in submarine cable, where a change in core assignment may be made as each spool is added to the span. As long as a record is maintained of core assignments with respect to each spatial channel, an output terminal coupled to a final spool is able to direct each spatial channel to its intended destination.

In accordance with the teachings of the present invention, the offset clocking may be based on integer multiples of the azimuthal period value of $360°/M_{equiv}$ and referred to hereinafter as the "clocking angle", providing a known and controlled change in core assignment by imparting a defined clocking angle rotation to a newly-added fiber section prior to fusing the fibers together. As defined and described above, the variable "$M_{equiv}$" defines the number of possible alignments that can be created between a pair of rotationally non-invariant optical fibers.

More particularly, an intentional change in core assignment is incorporated with a standard azimuthal alignment procedure. After a determination of an azimuthal adjustment required to have core-to-core alignment of a newly-added fiber section with the previous section, an additional clocking angle rotation is added to the adjustment to accomplish the change in core assignments. It is to be understood that the initial core-to-core alignment may be performed in the manner described in detail above (and may also include one or more of the adjustments as discussed in association with FIGS. 19, 20, and 26-28). Said another way, it is proposed to intentionally change the core assignments with respect to the spatial channels such that either a dynamic assignment of a most appropriate core to mitigate the effects of propagation through a previous core (i.e., assigning a core with a least amount of attenuation to a spatial channel that has suffered the highest amount of attenuation in the previous section of MCF), or passively clock the core assignments at various splice locations such that all spatial channels experience a mix of different conditions as the signals propagate from the input to the output of the transmission span. It is contemplated that the mixing of conditions averages out differences in signal properties attributed to differences in the cores as manifested in different sections of multicore fiber. Additionally, the offset clocking technique may be applied to a selected section of MCF to correct for problems such as a mis-identification of the polarity (see discussed associated with FIG. 16) of a previously-joined section of MCF.

Figure 32:
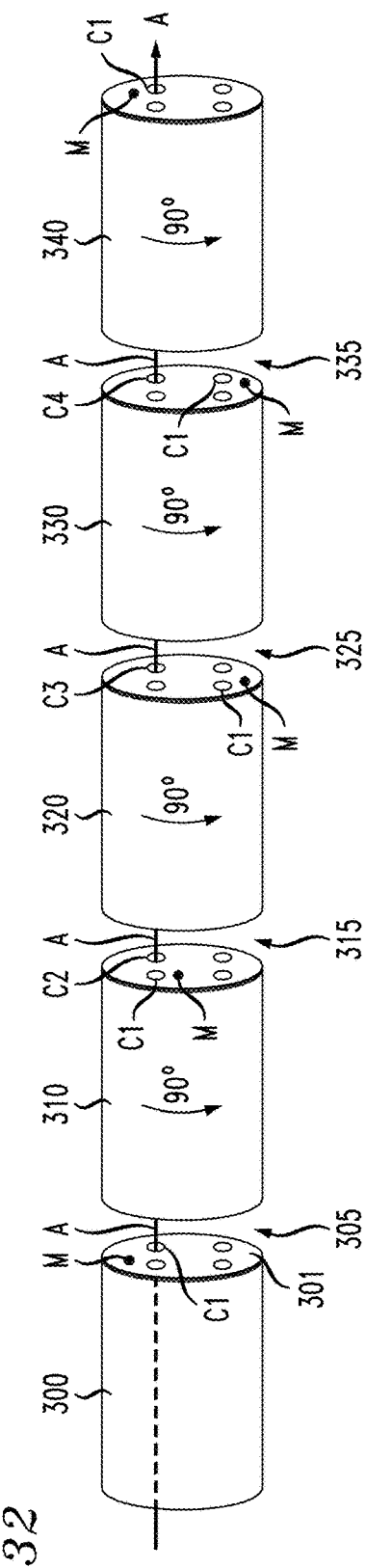
FIG. 32 shows the utilization of offset clocking along several sections of multicore optical fiber to change core assignments at various splice locations between the input and output of a transmission link.

FIG. 32 illustrates an example of a passive technique for applying offset clocking through several sections of multicore fiber (MCF) comprising a set of four offset cores (denoted as C1, C2, C3, and C4 in FIG. 32). The use of four-core fiber in the following discussion is exemplary only, for the purposes of aiding in the clarity of understanding this aspect of the present invention. It is to be understood that without the addition of offset clocking, each section of MCF would be added in a manner that retained the assignment of the same core (say, core C1) to the same channel (say, channel A) from the input to the output of the transmission link. As discussed below, offset clocking may be implemented in a manner that changes the core assignments for the set of channels to average out variations in attenuation from one channel to the next.

With particular reference to FIG. 32, a first splice location may align the cores in the manner described above (i.e., maintaining core assignment from one fiber to the next), with a following splice location rotating (clocking) the joining section of fiber through a combination of the required azimuthal adjustment and the clocking angle $360°/M_{equiv}$ to shift the propagation of a specific channel to a different core region within the multicore fiber. Presuming for the purposes of discussion that each joining section of multicore fiber has the same total number $C_{total}$ of individual core regions, the core assignments to a specific channel from one section of multicore fiber to the next may follow this pattern:

core $m \rightarrow$ core $mod(m+\Delta m, M_{equiv})$,
    with $m=1, \ldots, C_{total}$, where $\Delta m$ is an integer value (negative, positive, or zero).

Viewing FIG. 32 from left to right, a first MCF section 300 is spliced to a second MCF section 310 at a splice location 305, with second MCF section 310 spliced to a third MCF section 320 at a splice location 315, and so on. For the purposes of explanation, an optical signal A (occupying a spatial location denoted as "channel A") is shown as first propagating along core region C1 of first MCF section 300, exiting along core region C1 of first MCF section 300 at an output endface 301. Other signals likewise propagate through the other core regions in first MCF section 300, forming a set of four spatially-separated channels, the signal in each channel propagating along a different core with MCF 300.

A marker M is shown at endface 301 as positioned adjacent to first core region C1 to identify the destination of this particular core as "first" core region C1. Each following section of multicore fiber has a similar marker M or other type of identifier positioned in proximity to its core region C1, which is used in common practice to ensure the core assignment remains consistent from one span to the next such that the channels remain distinct and identified along the span and can be properly matched with receiving equipment at the output of the span.

As described above in association with the discussion of the additive component alignment technique, marker M may be used by the selection component to identify a best azimuthal alignment option from the set of $M_{equiv}$ choices. In the FIG. 32 (as well as FIGS. 31, 33, 34) example of aligning sections of four-core optical fiber, $M_{equiv}$ has a value of 4. In the following discussion of offset clocking, it is initially presumed that all four cores are equidistant from one another, providing a clocking angle of 360°/4, or 90°. The actual offset used may be 90° or any multiple thereof.

Figure 33:
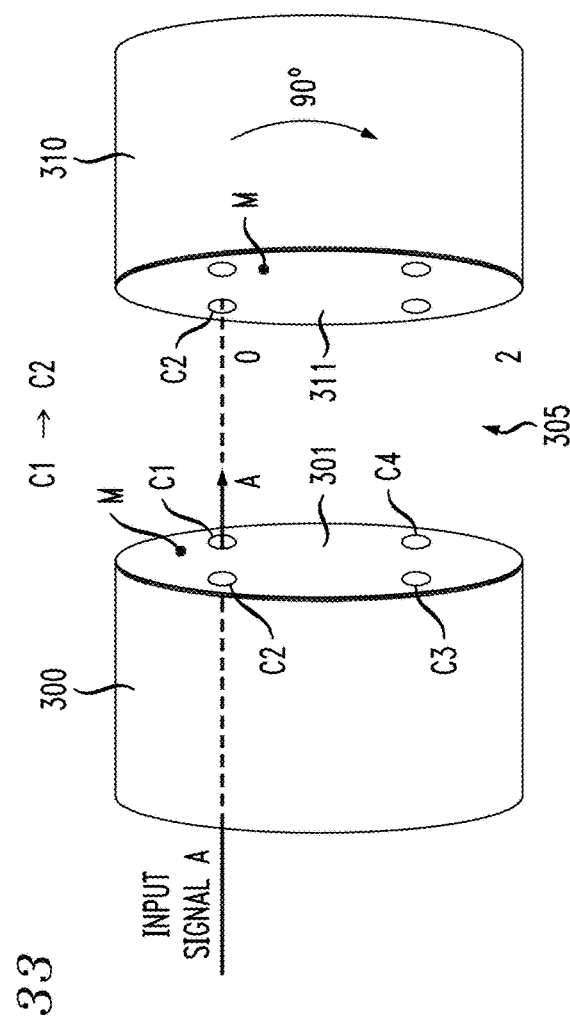
FIG. 33 is an enlarged view of a specific change in core assignment between a pair of multicore optical fibers as shown in FIG. 32.

Presuming that a 90° offset is used as the clocking angle in the arrangement of FIG. 32, second MCF section 310 is shown as rotated 90° with respect to first MCF section 300 so that the propagating signal in channel A is coupled into second core region C2 of second MCF section 310. In particular, an initial alignment process may be performed to determine the azimuthal adjustment necessary to maintain a C1-to-C1 alignment, with the clocking angle combined with this adjustment to provide the desired C1-to-C2 alignment. FIG. 33 clearly illustrates the change in core assignment between output endface 301 of first MCF section 300 and an input endface 311 of second MCF section 310.

Returning to the description of FIG. 32, the progression of offset clocking at following splice locations 315, 325, and 335 is shown. At splice location 315, channel A is shown as exiting second MCF section 310 at core region C2, with third MCF section 320 rotated 90° (again, in combination with an initially-established C1-C1 alignment using any suitable alignment system, including the additive component system described above) so that channel A is thereafter coupled into core region C3. Another 90° clocking rotation is used to re-orient a fourth MCF section 330, with the process then continuing with an additional rotation of 90° supplementing the an initial azimuthal alignment adjustment at each splice location. In this particular example, the number of rotations is such that propagating signal A is once again assigned to core region C1 as it propagates through a final MCF section 340. The return to the initial core assignment is not a requirement of the offset clocking, since the knowledge of the total amount of rotation (accumulated clocking angle, being the sum of the clocking angles at all splices or connections) performed between the input and output is sufficient to know the core assignments within the last section of MCF. If core m was assigned to the spatial channel A at the beginning of the transmission link (before the very first splice), then after $N_{splices}$ splices, core m+Δm is assigned to spatial channel A, with the definition $$\Delta m_{total} = \mod\left(\sum_{k=1}^{N_{splices}} \Delta m_k, M_{equiv}\right)$$

and assuming that at splice k, the clocking angle is $\Delta m_k \cdot 360°/M_{equiv}$. More generally, if core m was assigned to the n-th spatial channel at the beginning of the transmission link, then after $N_{splices}$ splices, core m+Δm is assigned to the n-th spatial channel.

The use of offset clocking thus allows each propagating signal to pass through different core regions as it progresses along the transmission span from the input section of MCF to a final section of MCF in a manner that mitigates core-specific attenuation (or other optical properties mentioned above such as polarization mode dispersion, chromatic dispersion, optical nonlinearity, signal crosstalk, latency, etc.) experienced in one channel with respect to the other channels. As mentioned above, it is not required that offset clocking be implemented at each splice location along a transmission path, since the benefit of reducing accumulated, unwanted effects in these optical properties may be present even if only a single (or relatively few) changes in core assignment are implemented. Nor is it necessary that each spatial channel comprises the full set of cores used by the long-haul transmission system.

Furthermore, some sections may have additional cores (e.g., a fifth core in the center of the four-core fiber of FIG. 34) that are not connected to cores in other sections. In other words, it is sufficient if all sections share a common set of cores that gives rise to the number $M_{equiv}$ of equivalent core alignments. However, it is to be presumed that an optimum mitigation is provided by using the offset clocking technique at as many splice locations as possible between the input and the output, and if possible, associating each individual core with a given spatial channel for at least one section of MCF along the concatenated arrangement of several lengths of fiber. The latter result of each core region associated with a given spatial channel at some point in time may only be possible for certain core topologies. For example, with reference to the eight-core MCF as shown in FIG. 18, this two-column structure has only two possible alignment arrangements (and, therefore, $M_{equiv}$=2). In this case, offset clocking provides multiples of 180°, and changes in core assignments may only be provided between the "outer pairs" of cores and the "inner pairs" of cores. In other cases, the integer value used for Δm is a factor in determining the number of possible core assignments that may be associated with a specific spatial channel. Referring to the four-core illustration of FIG. 32 for example, if Δm=2, a clocking angle of 180° would be used, resulting in only changes between C1 and C3, and C2 and C4.

When used with the additive component alignment process of the present invention, this additional rotation of a newly-added section of MCF may be combined with an identified best azimuthal alignment angle for re-orienting the position of the new fiber with respect to the previous fiber. That is, once the value of the optimum azimuthal angle $\vartheta_{best}^{(j,I)}$ is determined, an additional clocking angle rotation is added to angle $\vartheta_{best}^{(j,I)}$ to achieve the actual rotation angle to be used.

For cases in which the geometrical position of one or more cores is offset from a rotationally symmetric position (i.e., integer multiples of $360°/M_{equiv}$ on a circle), offset clocking will inevitably result in variability of splice loss at the joining of two sections of MCF. Determination of the optimum clocking angle to average out these differences between the spatial channels that are provided by the cores includes both core optical loss (i.e., attenuation accumulated over the individual lengths that may vary between different splice locations) and core-to-core splice loss (i.e., attenuation accumulated over all splices).

For example, an "adjusted" clocking angle may be found by identifying a next-best peak of the remaining accuracy peaks (of the group of $M_{equiv}$ peaks) in the cross-correlation associated with the accuracy component of the additive component alignment technique (see FIG. 15). This next-best peak is considered to have a better core-to-core alignment than the other remaining choices and, therefore, may be used in this case as the clocking angle. Minimizing channel-to-channel variations of accumulated attenuation may require other splicing angles than minimizing the all-channels average of the accumulated attenuation. For instance, if the splicing angle $\vartheta_{best}^{(j,l)}$ minimizes the average splice loss but results in different splice losses of the different channels, then a change of the splicing angle such that the core with the highest splice experiences a slightly lower splice loss, and the channel with the lowest splice loss experiences a slightly high splice loss, would reduce the overall variation in attenuation between the channels.

Figure 34:
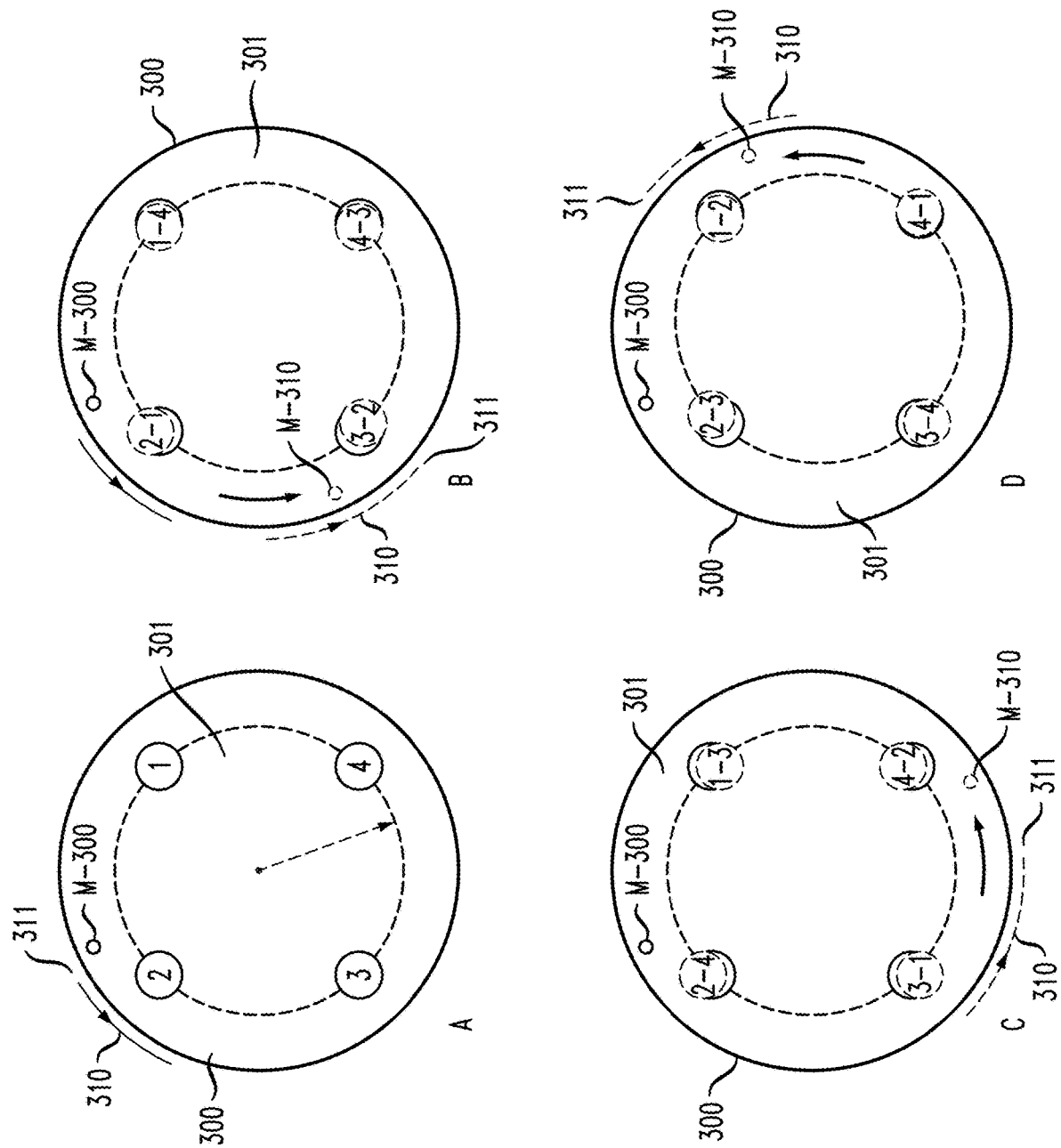
FIG. 34 illustrates a set of views of overlapped multicore fibers at a selected splice location, showing differences in core-to-core alignment as a function of changes in core assignment in accordance with an offset clocking embodiment of the present invention.

FIG. 34 illustrates the introduction of the above-described type of geometrical variability in core locations and its impact on the use of offset clocking. A plurality of diagrams is used to illustrates the variability of core overlap in the presence of non-uniform separation between the cores, each diagram depicting an overlap of output face 301 of MCF 300 with input face 311 of MCF 310. Diagram A depicts a "zero offset clocking" configuration, where the identified core regions maintain their original channel assignments. Presuming MCFs 300 and 310 are similar in form, even in the presence of different angular separations the cores will align upon completion of an alignment process (such as the additive component process discussed above).

Diagram B shows a result of utilizing offset clocking in changing core assignments for the set of four individual spatial channels. Like the examples of FIGS. 31 and 32, diagram B illustrates a change in core assignments created by rotating MCF 310 an additional 90° after completing an alignment process. The presence of geometrical variations in core location is evident as a difference in overlap and therefore splice loss between the individual pairings. It is clear that the losses are not the same for each core assignment (i.e., channel pairing between MCF 300 and MCF 310). For this illustrative example, a poor overlap is shown between core region 1 of MCF 310 and core region 2 of MCF 300; a similar degree of poor overlap is shown for the pair of core region 3 of MCF 310 with core region 2 of MCF 300. Again, these instances of non-overlap result in splice loss for the particular spatial channel associated with the core pairing.

Diagrams C and D illustrate the differences in core overlap and splice loss for the other remaining offset clocking rotations to step through a complete set of core assignments for the collected group. These variations in splice loss from one spatial channel to another as they progress through a series of different core assignments are thus considered to average out along a transmission span that includes several offset clocking rotations between spliced-together sections of MCF.

Other optical parameters that may be used to determine the optimum clocking angle are polarization mode dispersion, optical nonlinearity, chromatic dispersion, signal crosstalk, latency and the like, where these parameters are known to degrade channel performance over multiple concatenated spans and impact the manufacturing yield of MCF or spliced-together spans.

As mentioned above, if a specific application requires that each spatial channel ends with the same core assignment as it began with (or any other predetermined relation between input and output cores), this can either be included as a constraint in the computation of the optimum clocking angles, or a bridge MCF can be spliced or connectorized at the end to undo the accumulated clocking angles from all splices along the total distance.

Figure 35:
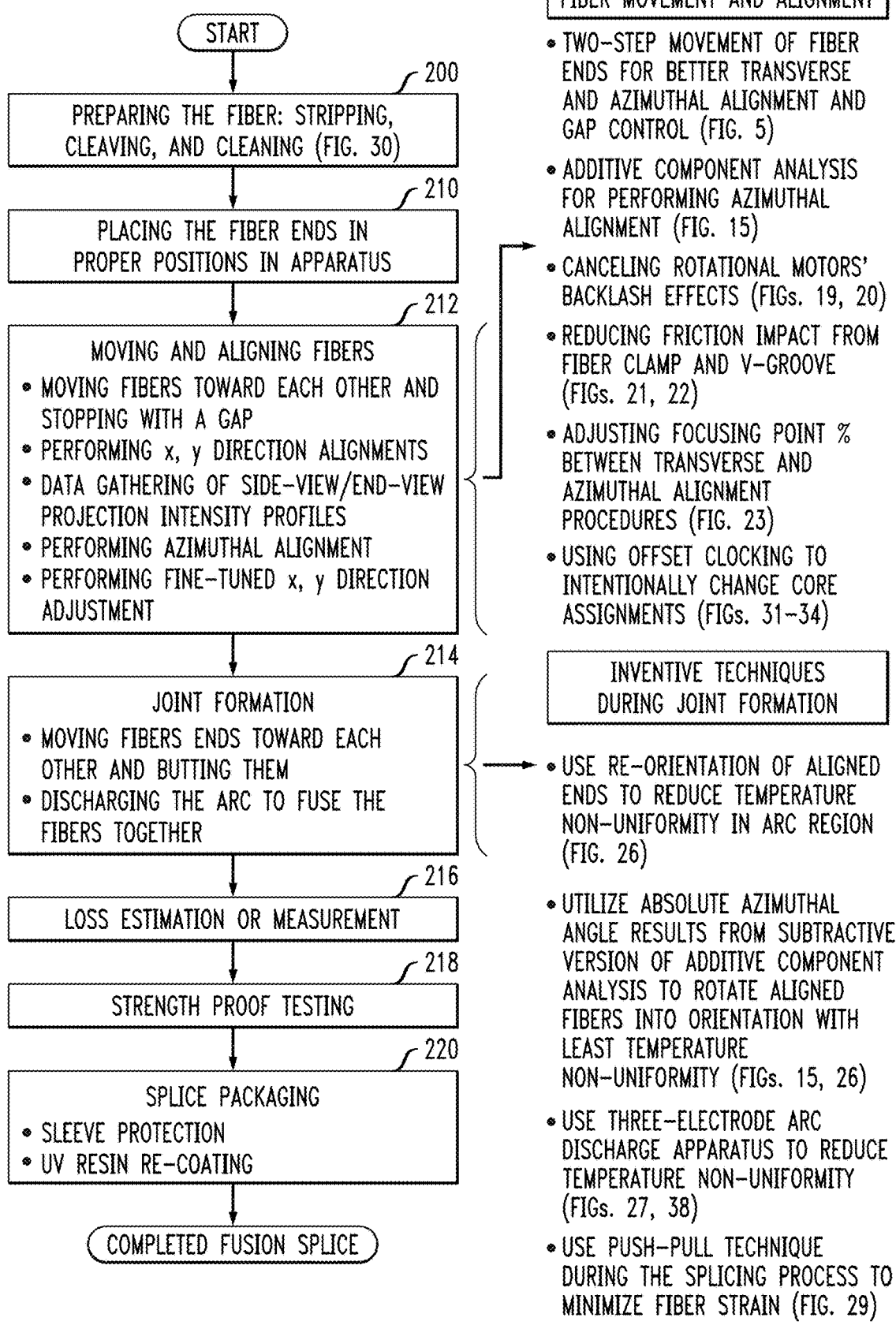
FIG. 35 is a flow chart summarizing the various techniques and apparatus modifications as discussed throughout the specification.

FIG. 35 is a flow chart summarizing the various techniques as discussed above that may be used to improve alignment between optical fibers (or between an optical fiber and a connector). It is to be understood that the flow chart is somewhat abbreviated in its presentation and various methodologies may be used in the performance of one or more of the illustrated steps. Step 200 is shown as associated with performing the initial preparation steps required to present pristine fiber endfaces for aligning and splicing. This step may include a study of the cleave angle, as discussed above in association with FIG. 30. Following fiber preparation, the fibers are loaded into the apparatus used to perform aligning and splicing, as depicted in step 210. Following this, the apparatus is activated to perform alignment between the two fibers (or a fiber and connector).

The activation of the apparatus is shown as step 212, and may include one or more of the alignment procedures and/or apparatus adjustments discussed above. In particular, alignment step 212 may include one or more of the identified inventive features, including: performing transverse and azimuthal alignment at the initial set-up points (discussed above in association with FIG. 5); compensating for motor backlash (discussed above in association with FIGS. 19 and 20); reducing frictional forces from the apparatus itself (discussed above in association with FIGS. 21 and 22); adjusting the imaging camera focus between x,y alignment and rotational alignment (FIG. 23); as well as gathering side-view and/or end-view data (FIGS. 6 and 7) in order to perform the inventive additive component azimuthal alignment process (see FIG. 15, for example). If desired, the offset clocking technique may be implemented to intentionally change core assignments (FIGS. 31-34).

Once the optimum alignment is achieved, the pair of fibers is then spliced together (unless a single fiber is being connectorized). A fusion splice operation for this purpose is shown in step 214. Presuming an arc discharge process is used to perform the fusion splicing, an electrode arrangement that improves the temperature uniformity in the splice region may be utilizes (such as discussed above in association with FIGS. 27 and 28). Additionally or alternatively, a "push/pull" technique may be used to minimize the strain on the fusing region itself (as discussed above in association with FIG. 29).

Upon completion of the joint formation step, various conventional processing steps may be included. The flow chart of FIG. 35 includes steps such as performing a measurement of optical power throughput (or loss) through the fused fibers (step 216) and strength proof testing of the physical splice itself (step 218). Presuming the spliced fibers pass qualification testing, the splice is packaged, protected and coated using conventional processes, as shown for the final step 220.

The various alignment procedures discussed above have been described and illustrated in the situation of aligning one fiber to another. However, it is to be understood that the various alignment techniques and procedures are just as relevant for the case of aligning a fiber to a connector component, such as a fiber in a ferrule (or any other suitable means of terminating the fiber) during an assembly process. In either case, the various features in the transverse geometry of the fiber need to be aligned with similar features in the other element, whether the "other element" is a fiber or a connector component. This understanding is also carried into any claims appended hereto that are directed to the alignment aspects of the present invention, where various steps that identify "a pair of optical fibers" are considered as applying just the same to "an optical fiber and an associated connector." In contrast to the alignment aspects of the present invention, those aspects specifically directed to "splicing" together fibers (e.g., fusion splicing) are by their nature limited to the situations where a pair of fiber ends are to be joined together.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, of if they include equivalent structural elements with insubstantial differences from the literal language of the claims.

What is claimed is:

1. An apparatus for providing azimuthal alignment of a pair of rotationally non-invariant optical fibers, comprising:
    an illumination source for directing light toward the pair of rotationally non-invariant optical fibers;
    a lensing system disposed beyond the illuminated pair of rotationally non-invariant optical fibers for focusing the light passing through the pair of rotationally non-invariant optical fibers onto a defined camera plane;
    a camera system located along the defined camera plane for capturing and storing intensity profiles of the illuminated pair of rotationally non-invariant optical fibers;
    a controlled movement system coupled to the pair of optical fibers for rotating each fiber through incrementally different angles, with the camera system capturing intensity profiles at each different angle and creating a first set of image data associated with the first optical fiber of the pair of rotationally non-invariant optical fibers and a second set of image data associated with the second optical fiber of the pair of rotationally non-invariant optical fibers; and
    a processing module configured to perform an additive component analysis of the stored first and second sets of image data, the analysis based on an accuracy component of image data associated with critical features requiring alignment and a selection component of image data associated with secondary features, the accuracy component generating a set of possible alignment configurations for the critical features and the selection component used to identify an optimum alignment configuration from the set of possible alignment configurations, the optimum alignment configuration defined as an optimal azimuthal angle through which a selected fiber of the pair of rotationally non-invariant optical fibers is rotated with respect to a remaining fiber of the pair of rotationally non-invariant optical fibers to achieve azimuthal alignment of all critical features, wherein the controlled movement system is used to rotate the selected fiber by the optimal azimuthal angle, obtaining azimuthal alignment of the pair of rotationally non-invariant optical fibers.

2. The apparatus as defined in claim 1 wherein the lensing system and the camera system are positioned to capture side-view projection intensity profiles to create the first and second sets of image data.

3. The apparatus as defined in claim 2 wherein the controlled movement system is further configured to translate the longitudinal positioning of the pair of rotationally non-invariant optical fibers with respect to the illumination source, the lensing system, and the camera system such that the camera system captures side-view projection intensity profiles at a plurality of spaced-apart longitudinal locations along at least one optical fiber of the pair of rotationally non-invariant optical fibers.

4. The apparatus as defined in claim 3 wherein the processing module is further configured to numerically combine a plurality of intensity profiles associated with a single optical fiber into a representative set of stored image data.

5. The apparatus as defined in claim 4 wherein the processing module is configured to utilize a least-squares fit for the numerical combination.

6. The apparatus as defined in claim 4 wherein the processing module is configured to utilize a linear regression for the numerical combination.

7. The apparatus as defined in claim 1 wherein the camera system is configured to capture end-view projection intensity profiles to create the first and second sets of stored image data.

8. The apparatus as defined in claim 7, further comprising a prism turning mirror disposed between the opposing fiber endfaces to capture end-view projection intensity profiles for re-directing illumination exiting the opposing fiber endfaces through the lensing system and into the camera system.

9. The apparatus as defined in claim 1 wherein the additive component analysis performed by the processing module utilizes an accuracy component created by performing a cross-correlation of the first set of stored image data with the second set of stored image data followed by separating the cross-correlation result into accuracy and selection components to generate the set of possible alignment configurations.

10. The apparatus as defined in claim 9 wherein the additive component analysis performed by the processing module utilizes a selection component created by the performed cross-correlation of the first and second sets of stored image data to generate a peak value used to identify the optimum alignment configuration from the set of possible alignment configurations.

11. The apparatus as defined in claim 1 wherein the additive component analysis performed by the processing module is separately applied to the first set of stored image data to generate a first value for azimuthal angle rotation, and to the second set of stored image data to generate a second value for azimuthal angle rotation, the processing module subtracting one angle value from the other to determine a final azimuthal angle correction for obtaining azimuthal alignment.

12. The apparatus as defined in claim 1 wherein the camera system includes
a focus adjustment module configured to operating in a low focus percentage mode during performance of a transverse alignment between the pair of rotationally non-invariant optical fibers and to operate in a high focus percentage mode during performance of azimuthal alignment.

13. The apparatus as defined in claim 1 wherein the processing module is further configured to generate detailed image data within a defined transverse position of an intensity profile in a manner that identifies regions of curvature, the processing module thereafter performing a mathematical straightening of the regions of curvature prior to creating a final set of stored image data.

14. The apparatus as defined in claim 1 wherein the processing module is further configured to identify a proper relative polarity between the first optical fiber and the second optical fiber of the pair of rotationally non-invariant optical fibers by flipping the longitudinal orientation of one fiber of the first and second optical fibers and re-determining the optimum alignment configuration, with a proper relative polarization defined for the lower of the values of angular orientation associated with the original and the re-determined optimum alignment configurations.

15. An apparatus for evaluating properties of a rotationally non-invariant optical fiber, the apparatus comprising:
an illumination source for directing light toward the rotationally non-invariant optical fiber;
a lensing system disposed beyond the rotationally non-invariant optical fiber for focusing the light passing therethrough onto a defined camera plane;
a camera system located along the defined camera plane for capturing and storing intensity profiles of the illuminated rotationally non-invariant optical fiber;
a controlled movement system coupled to the rotationally non-invariant optical fiber for rotating the rotationally non-invariant optical fiber through incrementally different angles, with the camera system capturing an intensity profile at each different angle and creating a first set of image data associated with the rotationally non-invariant optical fiber, the controlled movement system then causing the rotationally non-invariant optical fiber to change its longitudinal position with respect to the camera system such that a second set of image data is created at a second longitudinal position during a second rotation of the optical fiber; and
a processing module configured to perform an additive component analysis of the stored first and second sets of image data, the analysis comprising an accuracy component of critical features and a selection component of secondary features, the accuracy component comparing locations of critical features between the two longitudinal positions.

16. The apparatus as defined in claim 15 wherein the apparatus is used to evaluate the absolute polarity of the rotationally non-invariant optical fiber, the absolute polarity determined by the processing module upon evaluating the relative positions of the highest peak of the selection component and a closest peak of the accuracy component, where if the closest peak lags the selection component peak a positive polarity is defined and if the closest peak leads the selection component peak a negative polarity is defined.

17. The apparatus as defined in claim 15 wherein the critical features include at least one core and the apparatus is used to evaluate a twist rate of the at least one core by comparing the first set of stored image data to the second set of stored image data to determine an angular change in location of the least one core as a twist angle, and defining the twist rate as the twist angle divided by a quantity related to the separation between the first and second longitudinal positions.

18. An apparatus configured to provide azimuthal alignment of a pair of rotationally non-invariant optical fibers, comprising:
an illumination source for directing light toward the pair of rotationally non-invariant optical fibers;
a lensing system disposed beyond the illuminated pair of rotationally non-invariant optical fibers for focusing the light passing through the pair of rotationally non-invariant optical fibers onto a defined camera plane;
a camera system located along the defined camera plane for capturing and storing intensity profiles of the illuminated pair of rotationally non-invariant optical fibers;
a controlled movement system coupled to the pair of optical fibers for rotating each fiber through changes in angular orientation, with the camera system capturing intensity profiles at a set of selected angles and creating a first set of image data associated with the first optical fiber of the pair of rotationally non-invariant optical fibers and a second set of image data associated with the second optical fiber of the pair of rotationally non-invariant optical fibers; and
a processing module configured to perform an additive component analysis of the stored first and second sets of image data by performing the steps of:
(i) separating collected image data into a first component including the defined set of critical features and a second component of remaining image data;
(ii) identifying a set of $M_{equiv}$ nominally indistinguishable and equivalent angular corrections for aligning the set of critical features;
(iii) identifying an optimum angular adjustment for aligning the remaining image data; and
(iv) selecting an angular correction from the set of $M_{equiv}$ angular corrections having an angular value closest to the optimum angular adjustment identified in step (ii) and defining the selected angular correction as a proper angular correction; and
(v) signaling the controlled movement system to re-orienting the pair of rotationally non-invariant optical fibers using the proper angular correction to obtain azimuthal alignment therebetween.

* * * * *